(12) United States Patent
Ohmori

(10) Patent No.: US 7,779,450 B2
(45) Date of Patent: Aug. 17, 2010

(54) INFORMATION PROCESSING SYSTEM, INFORMATION PROCESSING APPARATUS AND METHOD, PROGRAM, AND RECORDING MEDIUM

(75) Inventor: Mutsuhiro Ohmori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1130 days.

(21) Appl. No.: 11/043,358

(22) Filed: Jan. 27, 2005

(65) Prior Publication Data

US 2005/0210282 A1 Sep. 22, 2005

(30) Foreign Application Priority Data

Feb. 10, 2004 (JP) .............................. 2004-033722

(51) Int. Cl.
*G06F 7/04* (2006.01)
(52) U.S. Cl. .............................................. 726/2; 726/4
(58) Field of Classification Search ................ 713/1, 713/2, 188, 194; 380/200, 201, 255, 277; 726/2, 4, 5, 9; 455/41
See application file for complete search history.

(56) References Cited

U.S. PATENT DOCUMENTS

| 5,796,829 | A | * | 8/1998 | Newby et al. .................. 705/54 |
| 5,914,701 | A | | 6/1999 | Gersheneld et al. |
| 6,236,981 | B1 | * | 5/2001 | Hill ................................ 705/67 |
| 6,336,031 | B1 | * | 1/2002 | Schyndel .................... 455/41.2 |
| 6,772,350 | B1 | * | 8/2004 | Belani et al. .................... 726/2 |
| 7,231,025 | B2 | * | 6/2007 | Labaton ...................... 379/188 |
| 7,286,118 | B2 | * | 10/2007 | Van Berkel .................. 345/173 |
| 2002/0125993 | A1 | * | 9/2002 | Gutta et al. .................. 340/5.52 |
| 2003/0037005 | A1 | * | 2/2003 | Nakaoka et al. ................ 705/52 |
| 2003/0076843 | A1 | * | 4/2003 | Holbrook et al. ............ 370/401 |
| 2004/0122877 | A1 | * | 6/2004 | Nakayama .................. 708/200 |
| 2004/0260669 | A1 | * | 12/2004 | Fernandez ...................... 707/1 |
| 2005/0060063 | A1 | * | 3/2005 | Reichelt et al. ............. 700/244 |

FOREIGN PATENT DOCUMENTS

JP 7-170215 7/1995

(Continued)

OTHER PUBLICATIONS

"Personal Area Networks: Near-field intrabody communication", by T.G. Zimmerman, IBM Systems Journal vol. 35, Nos. 3 and4, 1996, pp. 1-9.*

*Primary Examiner*—Kimyen Vu
*Assistant Examiner*—Joseph Pan
(74) *Attorney, Agent, or Firm*—Oblon, Spivak, McClelland, Maier & Neustadt, L.L.P.

(57) ABSTRACT

The present invention is intended to surely provide optimum information to users. A PK (Personal Key) stores PMDs (Personal Meta Data) that provide the information about each user. Of these PMDs, only those permitted for provision to a service system are transmitted to the service system by means of the quasi electrostatic field communication that is controlled by the range between the body of each user and an antenna. The service system receives the PMDs transmitted from the PK through the quasi electrostatic field communication. Further, on the basis of the received PMDs, the service system gets, from a content database, the content to be provided to each user and displays the obtained content onto an output device, thereby providing the content to each user. The present invention is applicable to a situated information presentation system, for example.

13 Claims, 29 Drawing Sheets

FOREIGN PATENT DOCUMENTS

| | | |
|---|---|---|
| JP | 11-509380 | 8/1999 |
| JP | 2001-222606 | 8/2001 |
| JP | 2002-353874 | 12/2002 |
| JP | 2003-5686 | 1/2003 |
| JP | 2003-242076 | 8/2003 |

* cited by examiner

FIG. 19

| ATTRIBUTE | CONTENTS | ACCESS PERMISSION INFORMATION |
|---|---|---|
| NAME | FOO | CONTROL CODE |
| SPOOFING PREVENTION METHOD | PUBLIC KEY METHOD | CONTROL CODE |
| SERVICE PUBLIC KEY | KEY DATA | CONTROL CODE |
| PK PRIVATE KEY | KEY DATA | CONTROL CODE |
| ACTION | PROGRAM | CONTROL CODE |
| PROGRAM PREFERENCE INFORMATION | SPORTS 10, VARIETY 7, MUSIC 5, OTHERS 3 | CONTROL CODE |
| ... | | |

FIG. 20

| ATTRIBUTE | CONTENTS | ACCESS PERMISSION INFORMATION |
|---|---|---|
| NAME | FOO | CONTROL CODE |
| SPOOFING PREVENTION METHOD | COMMON KEY METHOD | CONTROL CODE |
| COMMON KEY | KEY DATA | CONTROL CODE |
| ACTION | PROGRAM | CONTROL CODE |
| PROGRAM PREFERENCE INFORMATION | SPORTS 10, VARIETY 7, MUSIC 5, OTHERS 3 | CONTROL CODE |
| ... | | |

FIG. 21

| ATTRIBUTE | CONTENTS | ACCESS PERMISSION INFORMATION |
|---|---|---|
| NAME | FOO | CONTROL CODE |
| SPOOFING PREVENTION METHOD | PASSWORD METHOD | CONTROL CODE |
| SERVICE PASSWORD | PASSWORD DATA | CONTROL CODE |
| PK PASSWORD | PASSWORD DATA | CONTROL CODE |
| ACTION | PROGRAM | CONTROL CODE |
| PROGRAM PREFERENCE INFORMATION | SPORTS 10, VARIETY 7, MUSIC 5, OTHERS 3 | CONTROL CODE |
| ... | | |

INFORMATION PROCESSING SYSTEM, INFORMATION PROCESSING APPARATUS AND METHOD, PROGRAM, AND RECORDING MEDIUM

BACKGROUND OF THE INVENTION

The present invention relates to an information processing system, an information processing apparatus and method, a program, and a recording medium. More particularly, the invention relates to an information processing system, an information processing apparatus and method, a program, and a recording medium that are designed to surely provide optimum information to users in a public environment for example.

Recently, researches have been going on into personalizing systems that are intended to personalize the information being shown on a display device arranged in a public environment (or a public place) known as a situated display for users approaching to the display device, thereby providing information suitable for users.

For example, Non-Patent Document 1 ("Personal Mobility Through Situated Displays", Intel Research, Santa Clara, Calif. 95054) shown below proposes a method that, while emphasizing the necessity for personal servers, allows reading of personal information from a personal server and displaying the read personal information onto a situated display, thereby providing the viewing of personal information not on small-sized mobile terminals but on the display devices that are comfortable enough for viewing and operation.

Patent Document 1 (Japanese Patent Laid-Open No. 2003-140632) proposes a method in which, in accordance with the distance between the display device and the user, an image shown on the display device is zoomed in or out, for example. However, because this method zooms in or out an image shown on the display device simply in accordance with the distance between display device and user regardless of who the user is, it cannot be said, to be precise, that the image shown on the display device is personalized in accordance with users.

With currently practiced personalizing systems, users are each given an RF (Radio Frequency) tag and the distance between display and user is detected by RF communication to determine whether the user is in the proximity of the display.

However, because the detection of the distance by the RF communication by use of the RF tag is based on the transfer intensity of induction field, it is difficult to detect the distance between user and display with stability and accuracy.

Namely, because the transfer intensity of induction field is subject to change due to various factors, such as an environment in which wireless radio communication is executed, for example, it has been difficult to accurately detect the range.

Therefore, user's standing position cannot be identified precisely, which makes it inevitable to personalize the image on the display in accordance with only an approximate standing position.

This may personalize an image on the display also when the user simply passes in the proximity of the display without looking at the image.

In addition, when a plurality of displays are arranged, devices for detecting the distances between the user and the devices must be arranged with a space enough for preventing two or more different displays from displaying the same image for one user.

Given that the environment for example in which RF communication is executed does not change, the RF communication based on the RF tag forms a so-called multipath that complicates a mechanism for identifying the position of each user having the RF tag and requires the setting (or calibration) of the device for identifying the user position.

On the other hand, if, with a personalizing system, an image on the display is always personalized in accordance with each user approaching the display, the user may feel that he is always monitored, thereby disturbing his feeling.

For personalizing systems to provide the information suitable for users, it is necessary for users to provide their personal information to the systems. Namely, suppose that a device for providing user-suitable information obtained by personalizing the display on the display device of a personalizing system be called a service system, then the service system receives user-associated information from the RF tag of each user, selects the information suitable for the user from the received information, and displays the selected information, thereby personalizing the display on the display device.

However, with the RF tag, the information associated with the user stored in that RF tag is all provided to the service system, thereby making it difficult to limit the user-associated information to be provided to the service system. This also may make users feel always monitored, disturbing their feelings.

SUMMARY OF THE INVENTION

It is therefore an object of the present invention to surely provide the information that is optimum to users.

According to the first aspect of the present invention, there is provided an information processing system having a first information processing apparatus and a second information processing apparatus, the first information processing apparatus including:

a personal information storage unit for storing personal information associated with a user;

a permission information acquisition unit for acquiring permission information in the personal information, the permission information being permitted for provision to the second information processing apparatus; and a transmission unit for transmitting the permission information to the second information processing apparatus through communication controlled by a range between the body of the user and an antenna;

the second information processing apparatus including:

a reception unit for receiving the permission information from the first information processing apparatus through the communication controlled by a range between the body of the user and the antenna;

an information acquisition unit for acquiring information to be provided to the user from information to be provided outside in accordance with the permission information; and a provision unit for providing the information acquired by the information acquisition unit to the user.

According to the second aspect of the present invention, there is provided an information processing apparatus for executing communication with another apparatus, including:

a personal information storage unit for storing personal information associated with a user;

a permission information acquisition unit for acquiring permission information in the personal information, the permission information being permitted for provision to the another apparatus;

a transmission unit for transmitting the permission information to the another apparatus through communication controlled by a range between the body of the user and an antenna; and a reception unit for receiving, in accordance with the permission information, the permission information from the another apparatus through the communication controlled by a range between the body of the user and the antenna.

According to the third aspect of the present invention, there is provided an information processing method for executing communication with another apparatus, including the steps of:

acquiring permission information in the personal information stored in a personal information storage unit, the permission information being permitted for provision to the another apparatus;

transmitting the permission information to the another apparatus through communication controlled by a range between the body of the user and an antenna; and receiving, in accordance with the permission information, the permission information from the another apparatus through the communication controlled by a range between the body of the user and the antenna.

According to the fourth aspect of the present invention, there is provided a program for making a computer for executing communication with another apparatus execute the steps of:

acquiring permission information in the personal information stored in a personal information storage unit, the permission information being permitted for provision to the another apparatus;

transmitting the permission information to the another apparatus through communication controlled by a range between the body of the user and an antenna; and receiving, in accordance with the permission information, the permission information from the another apparatus through the communication controlled by a range between the body of the user and the antenna.

According to the fifth aspect of the present invention, there is provided a recording medium recording a program to be executed by a computer for executing communication with another apparatus, the program including the steps of:

acquiring permission information in the personal information stored in a personal information storage unit, the permission information being permitted for provision to the another apparatus;

transmitting the permission information to the another apparatus through communication controlled by a range between the body of the user and an antenna; and receiving, in accordance with the permission information, the permission information from the another apparatus through the communication controlled by a range between the body of the user and the antenna.

According to the sixth aspect of the present invention, there is provided an information processing apparatus for executing communication with another apparatus, including:

a reception unit for receiving permission information in personal information associated with a user transmitted from the another apparatus through communication controlled by a range between the body of the user having the another apparatus and an antenna, the permission information being permitted for provision to the information processing apparatus;

an information acquisition unit for acquiring information to be provided to the user in accordance with the permission information, the information being selected from information to be provided outside; and a provision unit for providing the information acquired by the information acquisition unit to the user.

According to the seventh aspect of the present invention, there is provided an information processing method for executing communication with another apparatus, including the steps of:

receiving permission information in personal information associated with a user transmitted from the another apparatus through communication controlled by a range between the body of the user having the another apparatus and an antenna, the permission information being permitted for provision to the information processing apparatus;

acquiring information to be provided to the user in accordance with the permission information, the information being selected from information to be provided outside; and providing the information acquired by the information acquisition step to the user.

According to the eighth aspect of the present invention, there is provided a program for making a computer for executing communication with another apparatus execute the steps of:

receiving permission information in personal information associated with a user transmitted from the another apparatus through communication controlled by a range between the body of the user having the another apparatus and an antenna, the permission information being permitted for provision to the information processing apparatus;

acquiring information to be provided to the user in accordance with the permission information, the information being selected from information to be provided outside; and providing the information acquired by the information acquisition step to the user.

According to the ninth aspect of the present invention, there is provided a recording medium recording a program to be executed by a computer for executing communication with another apparatus, the program including the steps of:

receiving permission information in personal information associated with a user transmitted from the another apparatus through communication controlled by a range between the body of the user having the another apparatus and an antenna, the permission information being permitted for provision to the information processing apparatus;

acquiring information to be provided to the user in accordance with the permission information, the information being selected from information to be provided outside; and providing the information acquired by the information acquisition step to the user.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 19 shows exemplary content of PMD;

FIG. 20 shows another exemplary content of PMD;

FIG. 21 shows still another exemplary content of PMD;

DETAILED DESCRIPTION OF THE PREFERRED EMBODIMENTS

The following describes embodiments of the present invention. The correlation between the invention described herein and the embodiments of the invention is as follows. The description herein is intended to make confirmation that the embodiments for supporting the present invention described herein are described herein. Consequently, if there is an embodiment which is included in the embodiments of the present invention but not described herein as corresponding to the invention, it does not mean that such an embodiment does not correspond to the present invention. Conversely, if an embodiment is described herein as corresponding to the invention, it does not mean that such an embodiment does not correspond to other inventions than the present invention.

Further, the description herein does not mean the entire invention described herein. In other words, this description does not exclude any invention that is the invention herein but not claimed herein, namely, the invention that will be divisionally applied or appear or added by amendment in the future.

Figure 27:
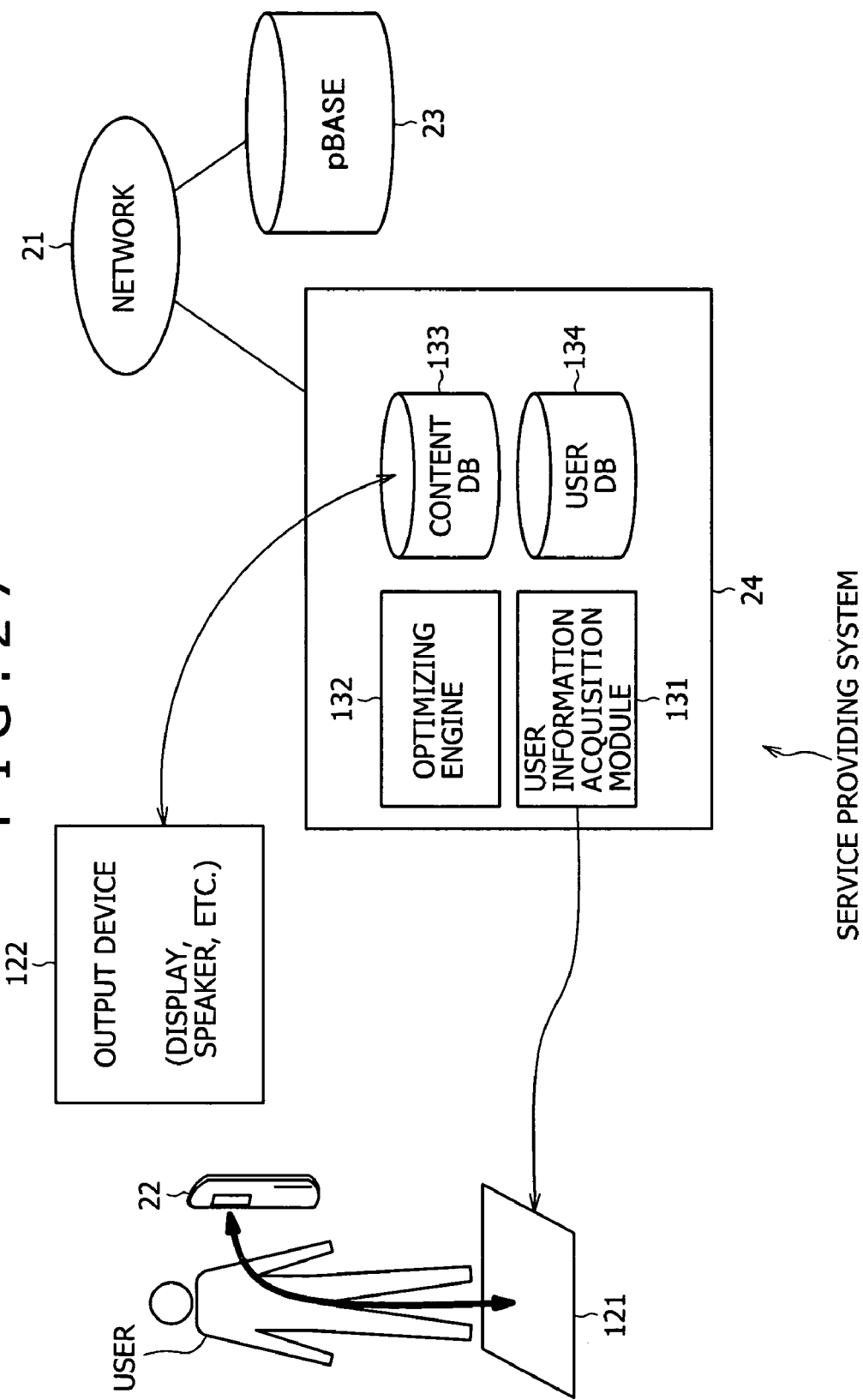
FIG. 27 is a schematic diagram illustrating an exemplary configuration of a service providing system practiced as one embodiment of the invention.

A first embodiment includes an information processing system (a service providing system shown in FIG. 27 for example) having a first information processing apparatus and a second information processing apparatus (a PK 22 and a service system 24 shown in FIG. 27 for example). The system including: personal information storage unit (a storage block 38 shown in FIG. 8 for example) for storing personal information associated with a user; permission information acquisition unit (process of step S701 shown in FIG. 30 for example) for acquiring permission information in the personal information, the permission information being permitted for provision to the second information processing apparatus; and transmission unit (process of step S702 shown in FIG. 30 for example) for transmitting the permission information to the second information processing apparatus through communication controlled by a range between the body of the user and an antenna (an antenna 121 shown in FIG. 27 for example); the second information processing apparatus including: reception unit (process of step S681 shown in FIG. 29 for example) for receiving the permission information from the first information processing apparatus through the communication controlled by a range between the body of the user and the antenna; information acquisition unit (process of step S683 shown in FIG. 29 for example) for acquiring information to be provided to the user from information to be provided outside in accordance with the permission information; and provision unit (process of step S684 shown in FIG. 29) for providing the information acquired by the information acquisition unit to the user.

A second embodiment provides an information processing apparatus (the PK 22 shown in FIG. 27) for executing communication with another apparatus (the service system 24 shown in FIG. 27 for example), including: personal information storage unit (the storage block 38 shown in FIG. 8 for example) for storing personal information associated with a user; permission information acquisition unit (process of step S701 shown in FIG. 30 for example) for acquiring permission information in the personal information, the permission information being permitted for provision to another apparatus; transmission unit (process of step S702 shown in FIG. 30 for example) for transmitting the permission information to another apparatus through communication controlled by a range between the body of the user and an antenna (an antenna 121 shown in FIG. 27 for example); and reception unit (process of step S703 shown in FIG. 30) for receiving, in accordance with the permission information, the permission information from another apparatus through the communication controlled by a range between the body of the user and the antenna.

Figure 30:
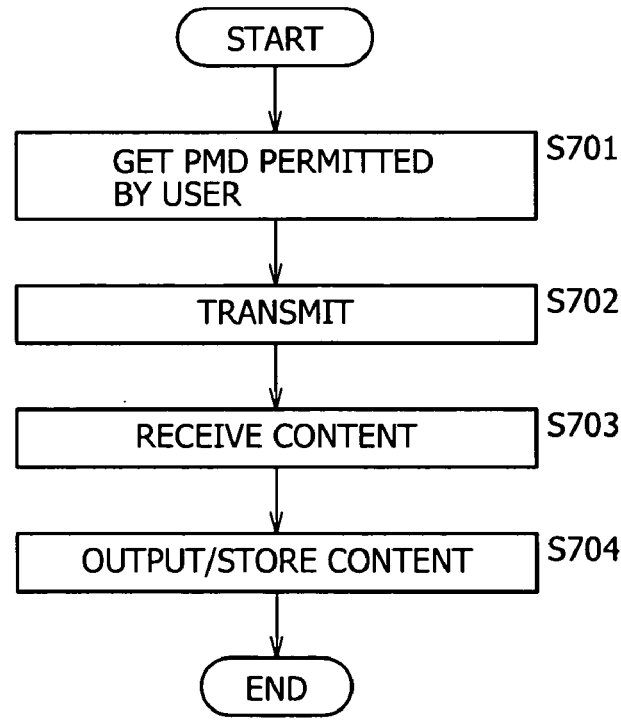
FIG. 30 is a flowchart indicative of processing by the service system that forms the service providing system.

The information processing apparatus can further include an output unit (process of step S704 shown in FIG. 30 for example).

The information processing apparatus can further include an authentication unit (processes in steps S663 to S665 shown in FIG. 28 for example) for executing authentication with another apparatus, wherein, if the authentication is successful, the permission information is transmitted to another apparatus.

A third embodiment includes the steps of: acquiring permission information in the personal information stored in a personal information storage unit, the permission information being permitted for provision to another apparatus (step S701 shown in FIG. 30 for example); transmitting the permission information to another apparatus through communication controlled by a range between the body of the user and an antenna (step S702 shown in FIG. 30 for example); and receiving, in accordance with the permission information, the permission information from another apparatus through the communication controlled by a range between the body of the user and the antenna (step S703 shown in FIG. 30 for example).

Other embodiments can provide programs including the steps of: acquiring permission information in the personal information stored in a personal information storage unit, the permission information being permitted for provision to another apparatus (step S701 shown in FIG. 30 for example); transmitting the permission information to another apparatus through communication controlled by a range between the body of the user and an antenna (step S702 shown in FIG. 30 for example); and receiving, in accordance with the permission information, the permission information from another apparatus through the communication controlled by a range between the body of the user and the antenna (step S703 shown in FIG. 30 for example).

Another embodiment may be an information processing apparatus (the service system 24 shown in FIG. 27 for example), for executing communication with another apparatus (the PK 22 shown in FIG. 27 for example), including: reception unit (process of step S681 shown in FIG. 29 for example) for receiving permission information in personal information associated with a user transmitted from another apparatus through communication controlled by a range between the body of the user having another apparatus and an antenna (the antenna 121 shown in FIG. 27 for example), the permission information being permitted for provision to the information processing apparatus; information acquisition unit (process of step S683 shown in FIG. 29 for example) for acquiring information to be provided to the user in accordance with the permission information, the information being selected from information to be provided outside; and provision unit (process of step S684 shown in FIG. 29 for example) for providing the information acquired by the information acquisition unit to the user.

The information processing apparatus can also include a user position acquisition unit (process of step S682 shown in FIG. 29 for example) for acquiring a user position at which the user stands; wherein the information acquisition unit acquires the information to be provided to the user also in accordance with the user position.

The information processing apparatus can also include an authentication unit (processes of steps S643 to S645 shown in FIG. 28 for example) for executing authentication with another apparatus; wherein, if the authentication is successful, the information acquired by the information acquisition unit is provided to the user.

Figure 29:
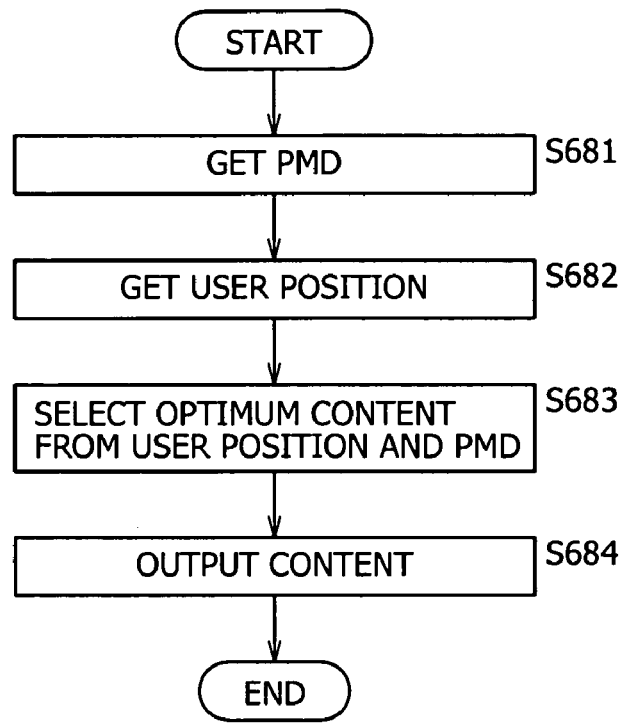
FIG. 29 is a flowchart indicative of processing by the PK that forms the service providing system.

A further embodiment provides an information processing method including the steps of: receiving permission information in personal information associated with a user transmitted from another apparatus through communication controlled by a range between the body of the user having another apparatus and an antenna, the permission information being permitted for provision to the information processing apparatus (step S681 shown in FIG. 29 for example); acquiring information to be provided to the user in accordance with the permission information, the information being selected from information to be provided outside (step S683 shown in FIG. 29 for example); and providing the information acquired by the information acquisition step to the user (step S684 shown in FIG. 29 for example).

Another embodiment may include programs which execute the steps of: receiving permission information in personal information associated with a user transmitted from another apparatus through communication controlled by a range between the body of the user having another apparatus and an antenna, the permission information being permitted for provision to the information processing apparatus (step S681 shown in FIG. 29 for example); acquiring information to be provided to the user in accordance with the permission information, the information being selected from information to be provided outside (step S683 shown in FIG. 29 for example); and providing the information acquired by the information acquisition step to the user (step S684 shown in FIG. 29 for example).

The following describes embodiments of the invention.

Each embodiment of the invention is able to use personal network communication and a PK (Personal Key) system. Therefore, personal network communication and the PK system will be described first.

Personal network communication is a human-intervenient communication and a stable communication that is executed in the vicinity of the human body (a human-body vicinity communication). The personal network communication with which the human body intervenes includes a communication controlled by the distance between human body and antenna, which is quasi electrostatic field communication, for example.

Quasi electrostatic field communication is a communication in which a closed electrostatic information space having the physical properties (evanescence) not remotely propagating but established only in a closed area is formed in the vicinity of the human body. According to this communication, the human body provides a weak electrostatic antenna and communication can be made within limited spaces from several centimeters to several meters around the human body.

The principle of operation of quasi electrostatic communication is as follows.

If an electric current is passed to a dipole antenna, for example, an electric field generated by the dipole antenna is expressed in equations (1) according to Maxwell's laws.

$$E_r = \frac{A\cos\omega t \cdot \cos\theta}{2\pi\varepsilon r^3} \cdot (1 + jkr) \cdot \exp(-jkr) \quad (1)$$

$$E_\theta = \frac{A\cos\omega t \cdot \sin\theta}{2\pi\varepsilon r^3} \cdot (1 + jkr + (jkr)^2) \cdot \exp(-jkr)$$

In equations (1), $E_r$ represents the electric field component in radius r direction, $E_\theta$ represents the electric field component in angle $\theta$ direction. Further, $\cos\omega t$ represents the electric charge oscillation in angular frequency $\omega$ and t represents time. A represents a coefficient representing the output (amplitude) (power) of electric field defined by the electric charge quantity of 2 vibrant charges and the distance between these 2 electric charges. Further, $\theta$ represents the angle around the center of the dipole antenna and r represents the distance (in meters) from the center of the dipole antenna. $\in$ represents dielectric constant and k represents wave number (in 1/meter). j indicates that the following value is an imaginary number.

In electric fields $E_r$ and $E_\theta$ in equations (1), radiation fields $E_{1r}$ and $E_{1\theta}$, components in linearly reverse proportion to distance (radius) r, are expressed in equations (2) below.

$$E_{1r} = 0 \quad (2)$$

$$E_{1\theta} = \frac{A\cos\omega t \cdot \sin\theta}{2\pi\varepsilon r^3} \cdot (jkr)^2 \cdot \exp(-jkr)$$

In electric fields $E_r$ and $E_\theta$ expressed in equations (1), induction fields $E_{2r}$ and $E_{2\theta}$, components in reverse proportion to the square of range r, are expressed in equations (3) below.

$$E_{2r} = \frac{A\cos\omega t \cdot \cos\theta}{2\pi\varepsilon r^3} \cdot (jkr) \cdot \exp(-jkr) \quad (3)$$

$$E_{2\theta} = \frac{A\cos\omega t \cdot \sin\theta}{4\pi\varepsilon r^3} \cdot (jkr) \cdot \exp(-jkr)$$

Further, in electric fields $E_r$ and $E_\theta$ expressed in equations (1), $E_{3r}$ and $E_{3\theta}$, components in reverse proportion to the cube of range r, are expressed in equations (4) below.

$$E_{3r} = \frac{A\cos\omega t \cdot \cos\theta}{2\pi\varepsilon r^3} \cdot \exp(-jkr) \quad (4)$$

$$E_{3\theta} = \frac{A\cos\omega t \cdot \sin\theta}{4\pi\varepsilon r^3} \cdot \exp(-jkr)$$

Components $E_{3r}$ and $E_{3\theta}$ expressed in equations (4) are quasi electrostatic fields.

Figure 1:
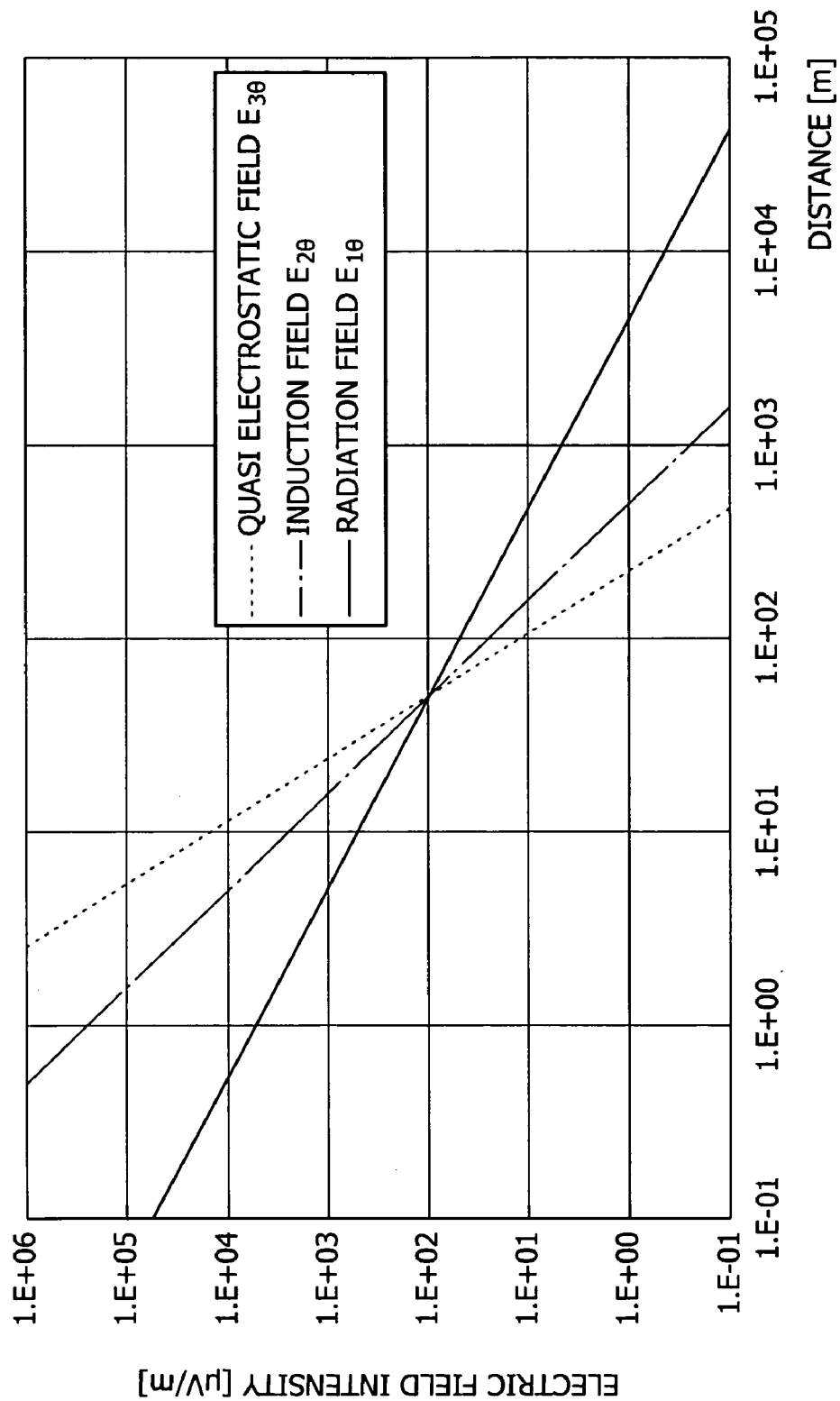
FIG. 1 is a graph indicative of a relationship between distance and field intensities.

Now, referring to FIG. 1, there is shown a relationship between field intensity and range r of radiation fields $E_{1r}$ and $E_{1\theta}$, induction fields $E_{2r}$ and $E_{2\theta}$, and quasi electrostatic fields $E_{3r}$ and $E_{3\theta}$ obtained by applying Maxwell's laws to the dipole antenna.

It should be noted that, in FIG. 1, frequency $f(=\omega/(2\eta))$ is 1 MHz.

Referring to FIG. 1, there exists an intensity boundary distance at which the field intensities of radiation field, induction field, and quasi electrostatic field are equal to each other. Beyond this intensity boundary distance, the radiation field becomes dominant; in the proximity of the intensity boundary range, the quasi electrostatic field becomes dominant.

According to Maxwell's laws, r that satisfies equation (5) below becomes the intensity boundary distance.

$$k \cdot r = 1 \quad (5)$$

Wave number k in equation (5) is expressed in equation (6) below with light speed=c ($c=3\times10^8$ m/s) and frequency=f ($=\omega/(2\rho)$).

$$k = \frac{2\pi f}{c} \quad (6)$$

From equation (5) and equation (6), intensity boundary range r is expressed in equation (7) below.

$$r = \frac{c}{2\pi f} \quad (7)$$

Figure 2:
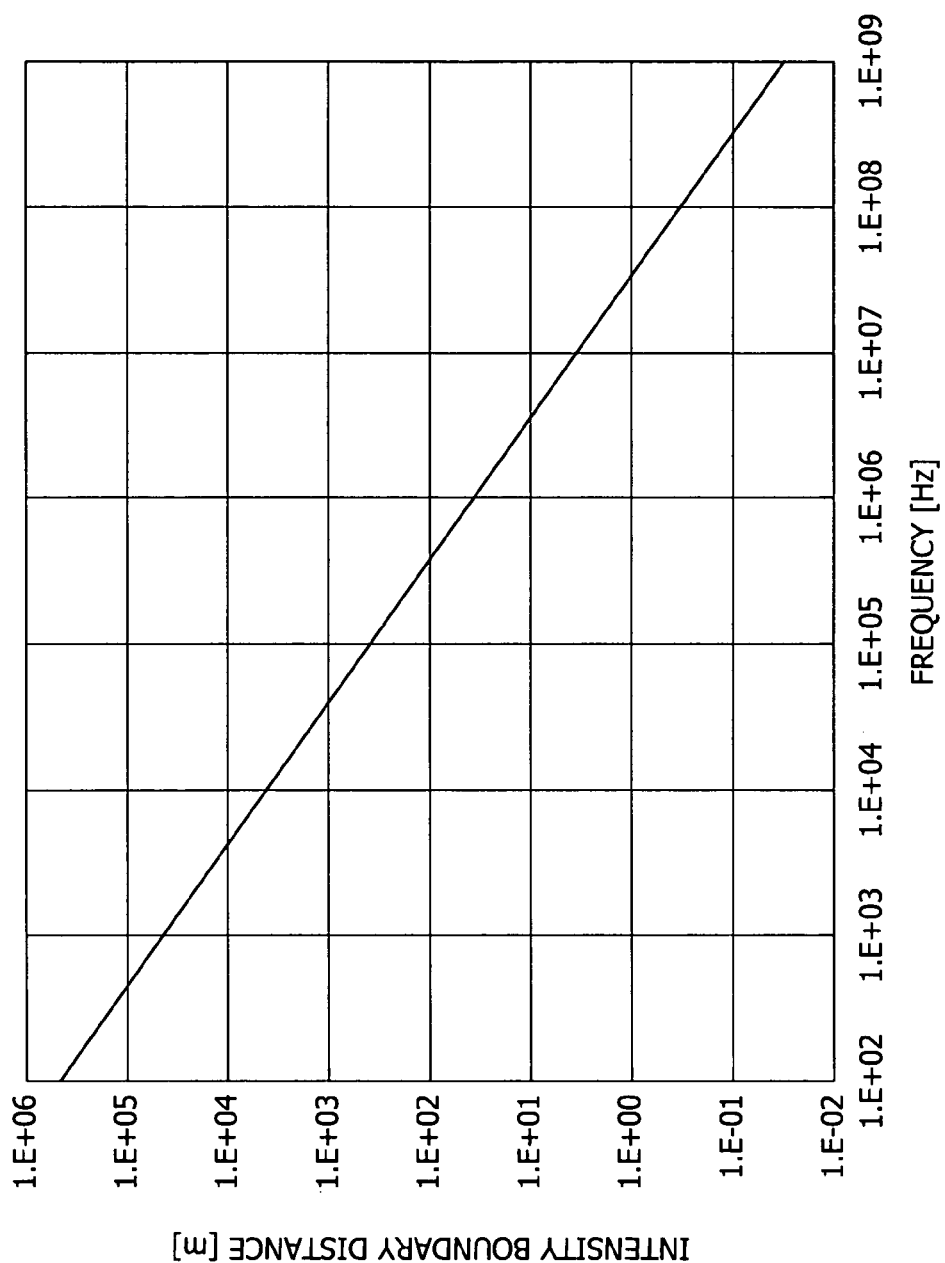
FIG. 2 is a graph indicative of a relationship between frequency and intensity boundary distance.

Referring to FIG. 2, there is shown a relationship between intensity boundary range r and frequency f expressed in equation (7).

Intensity boundary range r is uniquely obtained for frequency f.

Figure 3:
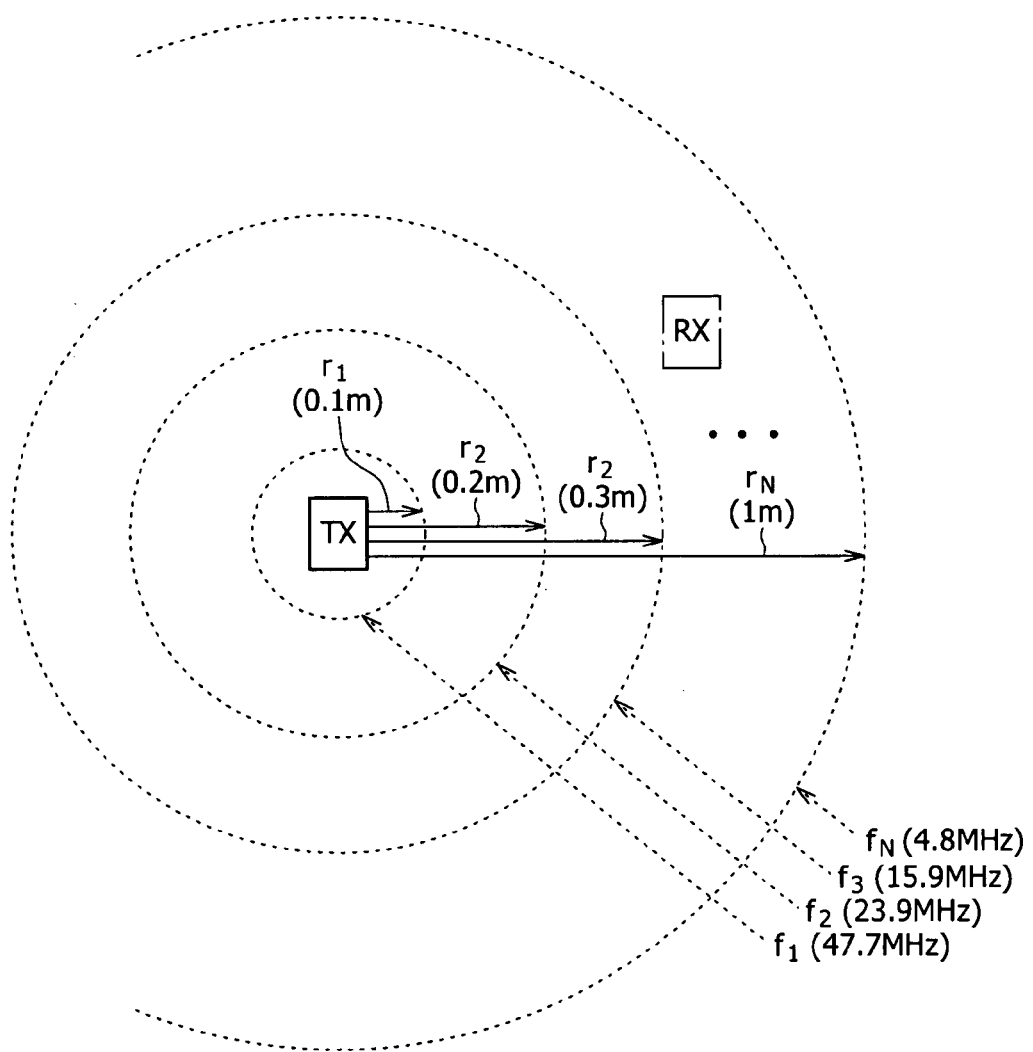
FIG. 3 is a schematic diagram illustrating a range in which quasi electrostatic fields are formed.

Therefore, if N intensity boundary distances $r_1, r_2, \ldots, r_N$ are set from transmission terminal TX as shown in FIG. 3, a space can be formed in which N quasi electrostatic fields (indicated by dashed lines in the figure) oscillating at frequencies $f_1, f_2, \ldots, f_N$ that satisfy equation (7) for intensity boundary ranges $r_1, r_2, \ldots r_N$, where, if $r_1 < r_2 < \ldots < r_N$, then $f_1 > f_2 > \ldots > f_N$.

Now, the distance between transmission terminal TX and reception terminal RX for executing quasi electrostatic field communication can be obtained from the relationship between intensity boundary range $r_n$ and frequency $f_n$ that satisfies equation (7) for intensity boundary range $r_n$ (n=1, 2, ..., N).

Namely, for example, suppose that 2 electric fields oscillating at 2 different frequencies be formed with a same output (power) at transmission terminal TX and reception terminal RX capable of receiving electric field intensities higher than predetermined level TH move in these 2 electric fields. Then, reception terminal RX is able to communicate with transmission terminal TX within a range (distance) in which reception terminal RX is able to receive electric field intensities higher than predetermined level TH in the electric fields formed by transmission terminal TX.

Figure 4:
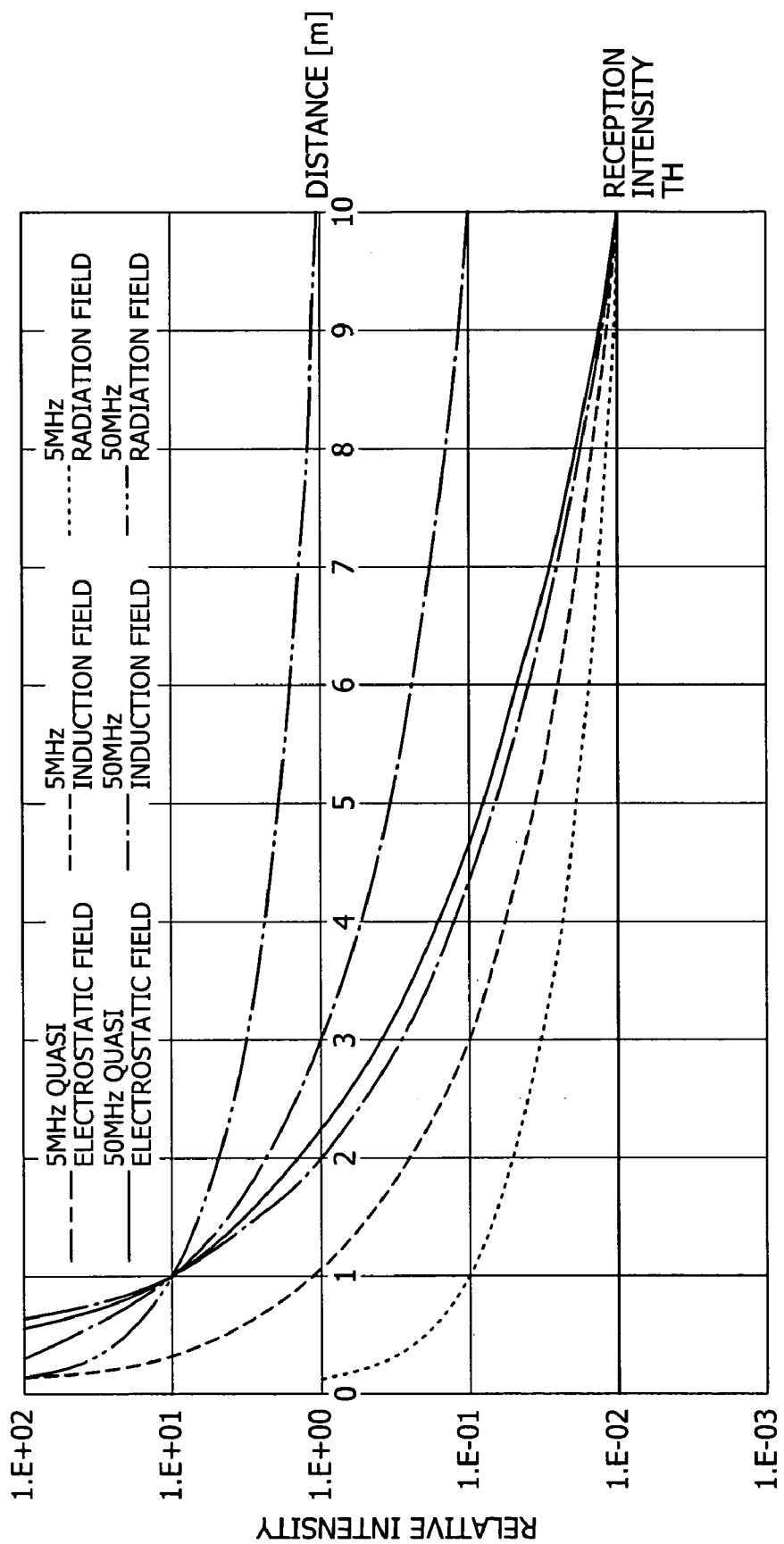
FIG. 4 is a graph indicative of a relationship between distance and field intensities.

Referring to FIG. 4, there is shown a relationship between electric field intensity and range r of the radiation field, induction field, and quasi electrostatic field of the two electric fields formed by transmission terminal TX with the frequencies of the two electric fields set to 5 MHz and 50 MHz respectively for example.

Referring to FIG. 4, in the electric fields of 5 MHz frequency, the quasi electrostatic field is dominant within a distance (10 meters in FIG. 4) in which an electric field intensity higher than predetermined level TH ($10^{-2}$ in FIG. 4) that can be received by reception terminal RX.

On the other hand, in the electric fields of 50 MHz frequency, the quasi electrostatic field is dominant up to a distance of 1 meter in which an electric field intensity over predetermined level TH that can be received by reception terminal RX; beyond 1 meter, however, the radiation field is dominant.

Figure 5:
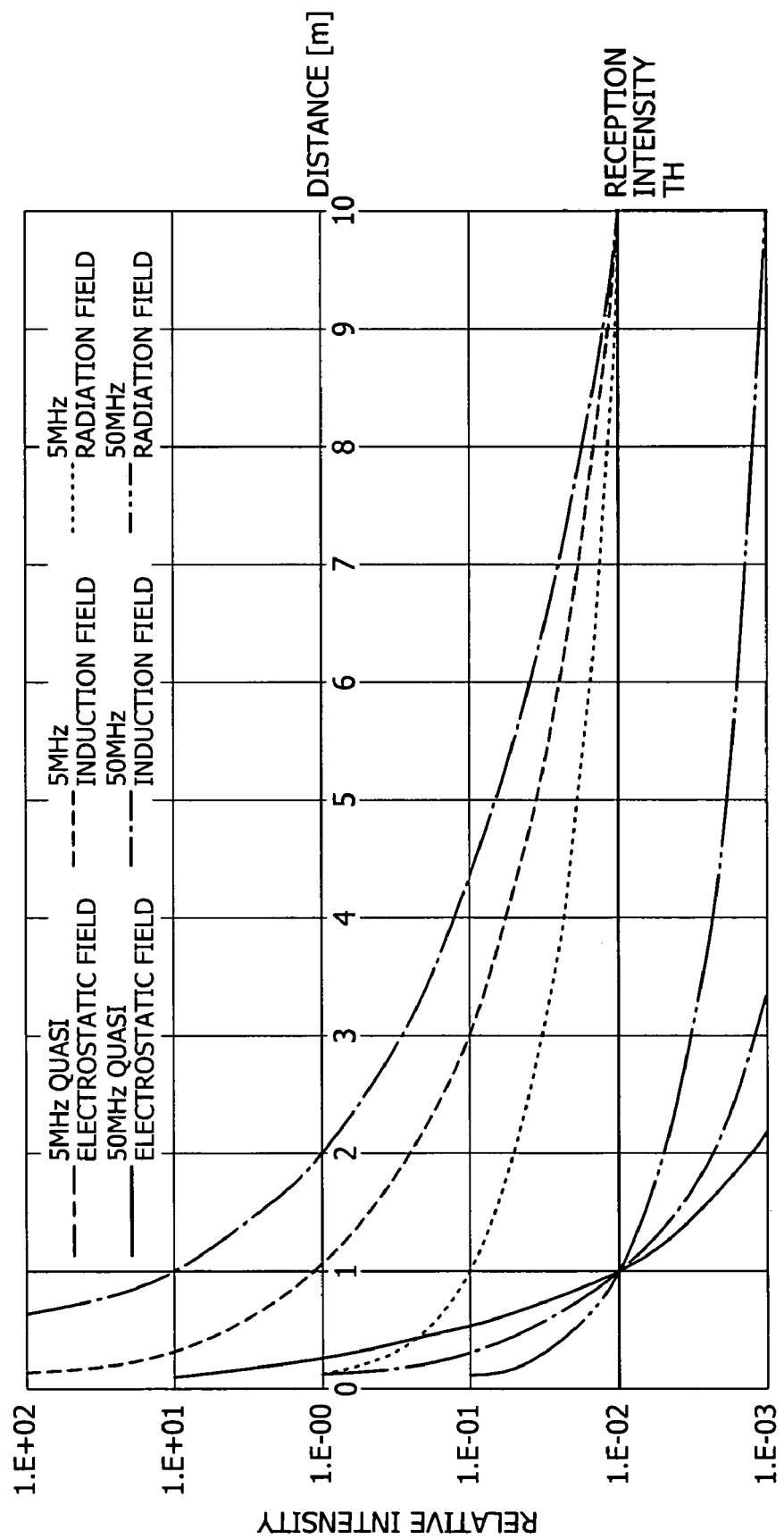
FIG. 5 is a graph indicative of another relationship between distance and field intensities.

Therefore, if, at transmission terminal TX, the output of the electric fields of 50 MHz is adjusted so as to make the quasi electrostatic field dominant only within a distance in which an electric field intensity over predetermined level TH that can be received by reception terminal RX is gained, as with the electric fields of 5 MHz frequency shown in FIG. 4, the relationship between the electric field intensity and range r shown in FIG. 4 becomes as shown in FIG. 5.

The above-mentioned electric field output adjustment at transmission terminal TX makes the quasi electrostatic field dominant within any electric field having an electric field intensity over predetermined level TH that can be received by reception terminal RX in any of frequencies 5 MHz and 50 MHz.

Therefore, adjusting, at transmission terminal TX, the output of an electric field having frequency $f_n$ so as to make the electric field intensity of an electric field having frequency $f_n$ satisfying equation (7) for intensity boundary range $r_n$ at a position of intensity boundary range $r_n$ from transmission terminal TX (namely, from the antenna thereof) reach predetermined level TH that can be received by reception terminal RX can surely form a space in which the quasi electrostatic field that oscillates with frequency $f_n$ becomes dominant as a space in which transmission terminal TX and reception terminal RX can communicate with each other.

Further, in this case, the distance between transmission terminal TX and reception terminal RX can be detected on the basis of the frequency of the quasi electrostatic field received by reception terminal RX.

Now, at transmission terminal RX, with the output of an electric field having frequency $f_n$ used as a coefficient for the above-mentioned adjustment, output adjustment coefficient $A_n$ is introduced to replace coefficient A of equations (1) to (4) by output adjustment coefficient $A_n$. In this case, absolute value $E_n$ of the electric field intensity of the electric field having frequency $f_n$ at intensity boundary range $r_n$ is expressed in equation (8) below.

$$E_n = \left| \frac{A_n \sin^2\theta + 4\cos^2\theta}{4\pi\varepsilon} \cdot \left(\frac{2\pi f_n}{c}\right)^3 \cdot \exp(-j) \right| \quad (8)$$

It should be noted that output adjustment coefficient $A_n$ in equation (8) may be set to a value that makes absolute value $E_n$ of the electric field intensity reach predetermined level TH at intensity boundary range $r_n$.

Since the electric field intensity of the quasi electrostatic field is in reverse proportion to the cube of range r, a space in which the quasi electrostatic field having frequency $f_n$ becomes dominant can be clearly formed in the scope of intensity boundary range $r_n$ as compared with the radiation field and the induction field.

Consequently, if the output of an electric field having frequency $f_n$ is adjusted at transmission terminal TX by use of output adjustment coefficient $A_n$, the distance between transmission terminal TX and reception terminal RX can be accurately detected depending on whether reception terminal RX can receive a signal of quasi electrostatic field having frequency $f_n$.

Figure 6:
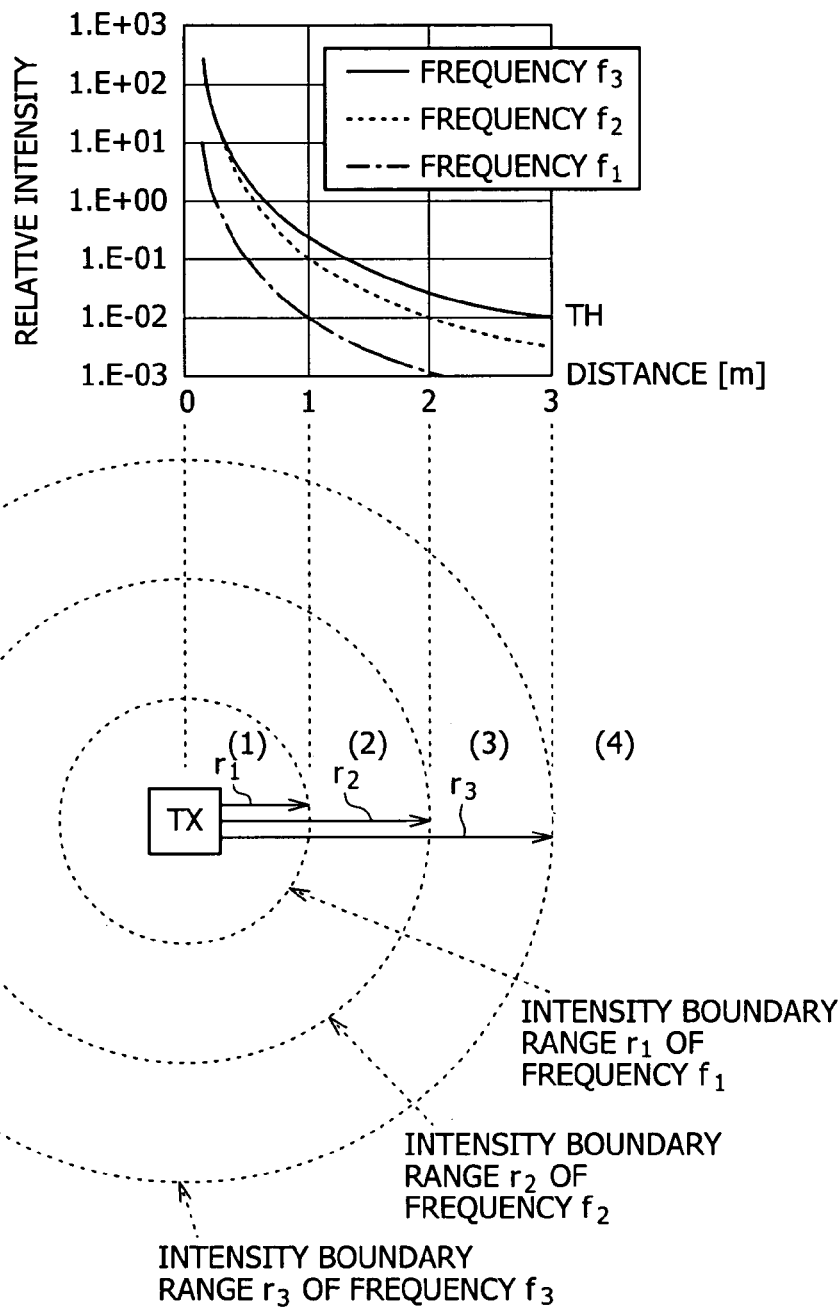
FIG. 6 is a schematic diagram illustrating a relationship between reception state and distance.

To be more specific, suppose, as shown in FIG. 6, that transmission terminal TX output electric fields having 3 frequencies $f_1$, $f_2$, and $f_3$ with the outputs thereof adjusted, then, if reception terminal RX can receive all quasi electrostatic fields of frequencies $f_1$ to $f_3$, range r between transmission terminal TX and reception terminal RX can be detected smaller than intensity boundary range $r_1$ corresponding to frequency $f_2$.

If reception terminal RX can receive only both the quasi electrostatic fields of frequencies $f_2$ and $f_3$, range r between transmission terminal TX and reception terminal RX can be detected greater than intensity boundary range $r_1$ corresponding to frequency $f_1$ and smaller than intensity boundary range $r_2$ corresponding to frequency $f_2$.

If reception terminal RX can be received only the quasi electrostatic field having frequency $f_3$, range r between transmission terminal TX and reception terminal RX can be detected greater than intensity boundary range $r_2$ corresponding to frequency $f_2$ and smaller than intensity boundary range $r_3$ corresponding to frequency $f_3$.

If reception terminal RX can receive none of the quasi electrostatic field having frequencies $f_1$ to $f_3$, range r between transmission terminal TX and reception terminal RX can be detected greater than intensity boundary range $r_3$ corresponding to frequency $f_3$.

The communication executed in the above-mentioned spaces in which the quasi electrostatic field is dominant by detecting the change in its electric field intensity is called quasi electrostatic field communication.

As described above, a space in which the quasi electrostatic field is dominant is clearly formed as a space within intensity boundary range $r_n$ corresponding to frequency $f_n$ of that electric field from transmission terminal TX (namely, the antenna thereof) outputting the electric field, so that the quasi electrostatic field communication provides reliable and stable communication in any space in which the quasi electrostatic field is dominant.

Meanwhile, for the human body to generate a radiation field or induction field, a current must be passed through the human body. However, because the impedance of the human body is high, it is difficult to efficiently pass a current through the human body.

On the other hand, the human body is easily charged electrostatically, as is often felt in daily life. When the surface of the human body is electrostatically charged, a quasi electrostatic field is generated. The human body is electrostatically charged by very small charge transfer and the change in the charge instantaneously propagates over the human body, thereby forming an equipotential surface of quasi electrostatic field in approximately isotropically from the human body. In a space in which the quasi electrostatic field is dominant, the effects of the radiation field and the induction field are minimized, so that the human body efficiently functions as an antenna.

As described above, the communication executed in a space in which the quasi electrostatic field is dominant formed on the surface of the human body, by the detection of the change in the intensity of the electric field, is called the quasi electrostatic field communication as one of human-body vicinity communications.

Therefore, if the user carries transmission terminal TX, for example, a space in which the quasi electrostatic field of the electric fields outputted by the transmission terminal TX is dominant (hereafter, this space will be appropriately referred to as a quasi electrostatic field space) is formed in a scope of the intensity boundary range corresponding to the frequency of the quasi electrostatic field from the user's body surface. Between reception terminal RX and transmission terminal TX carried by the user, quasi electrostatic field communication can be made through the user's body only when the antenna of reception terminal RX is located within the quasi electrostatic field space formed on the user's body surface, namely, only when the antenna of reception terminal RX is located within a scope of the intensity boundary range from the body surface.

Hence, the quasi electrostatic field communication as one of the human-body vicinity communications is said to be a type of communication that is controlled (in its communication ability) in accordance with the range between the user's body and the antenna of reception terminal RX.

According to the quasi electrostatic field communication as one of human-body vicinity communications, the quasi electrostatic field communication is enabled by properly setting the electric field output (or power) and the frequency of the transmission terminal TX, only when the body of the user carrying transmission terminal TX is in the vicinity of reception terminal RX (or the antenna thereof), namely, for example, only when the user's body comes close to a range of several centimeters to several tens of centimeters from the antenna, or only when the user's body comes so close as to almost touch the antenna, or only when the user's body touches the antenna.

Therefore, unlike the communication between IC card and card reader/writer, for example, the user carrying transmission terminal TX can communicate with reception terminal RX without holding transmission terminal TX over reception terminal RX.

To be more specific, if the user carries his IC card in his cloth's pocket, for example, the user first must take the IC card from the pocket and then hold it over the card reader/writer, thus performing an explicit action for making communication between the IC card and the reader/writer.

In contrast, the quasi electrostatic field communication allows the user carrying transmission terminal TX execute communication between transmission terminal TX and reception terminal RX simply by getting close to reception terminal (or the antenna thereof) without performing an explicit action for making communication therebetween.

It should be noted that the same as above holds if transmission terminal TX and reception terminal RX are exchanged, namely, if the user carries reception terminal RX instead of transmission terminal TX.

The following describes a PK (Personal Key) system practiced as one embodiment of the invention.

Figure 7:
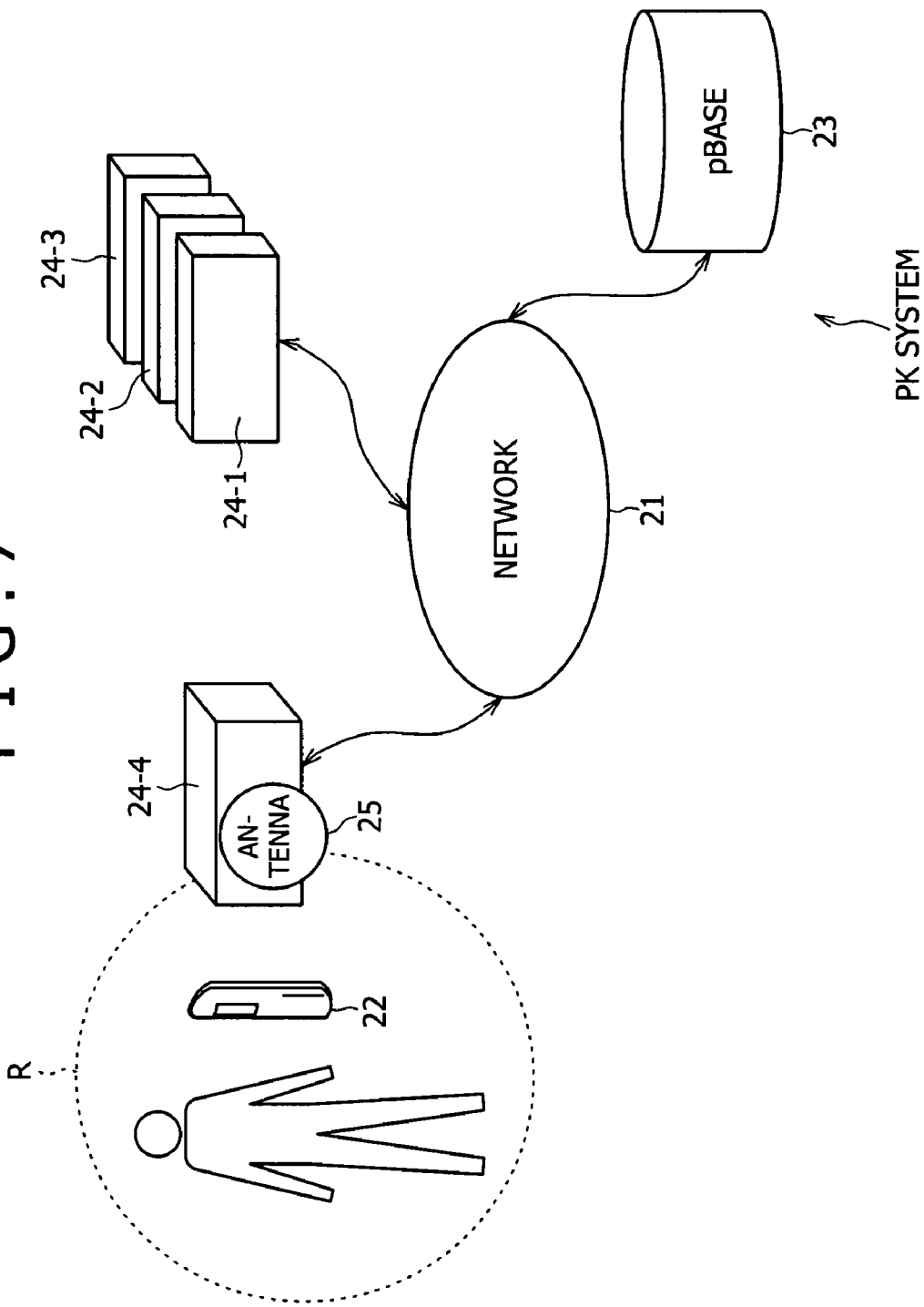
FIG. 7 is a schematic diagram illustrating an exemplary configuration of a Personal Key (PK) system.

Referring to FIG. 7, there is shown an exemplary configuration of the PK system.

A network 21 is a wired or wireless network, such as the Internet, LAN (Local Area Network), or others. Referring to FIG. 7, the network 21 is connected with a pBase 23 and a service system 24 (in FIG. 7, 4 service systems 24-1, 24-2, 24-3, and 24-4).

A PK (Personal Key) 22, constituted by a portable, small-sized computer, stores personal information of the user thereof. Referring to FIG. 7, the user carries the PK 22 in the cloth's pocket, for example.

The personal information herein denotes not only the information for identifying user's personal information such as his name and address, for example, but also various other information such as preference, authentication, points, and information given by others. In what follows, the personal information will also be referred to as PMD (Personal Meta Data).

The PK 22 communicates with its service system 24 in area R around the service system 24. Also, the PK 22 is able to communicate with information equipment, not shown, in vicinity.

It should be noted that wireless communications such as RF (Radio Frequency) communication, quasi electrostatic field communication, and optical communication, and wired communications can be executed between the PK 22 and the service system 24. In this example, it is supposed that the quasi electrostatic field communication as one of human-body vicinity communications be executed. Therefore, the PK 22 and the service system 24 have the same communication functions as those of transmission terminal TX and reception terminal RX as described above with reference to FIGS. 3 and 6. In this example, area R shown in FIG. 7 is an area in the vicinity of the user's body surface.

The PK 22 has an encryption function for encrypting information by an encryption key. When communicating with the service system 24 and when communicating with the pBase 23 via the service system 24, for example to be described later, the PK 22 encrypts information and transmits the encrypted information. The same holds with the pBase 23 and the service system 24 with which the PK 22 communicates.

The pBase 23, constituted by a computer, stores the user's PMD of the PK 22. Also, the pBase 23 is connected to the network 21 to communicate with the service system 24 and the PK 22 via the service system 24.

It should be noted that pBase 23 may be constituted by a home server (not shown) of the home of the user of the PK 22, for example. Also, the pBase 23 may be constituted by a server on the Internet, for example. In this case, the PMD of other users may also be stored in the pBase 23.

The service system 24, constituted by a computer, for example, is able to communicate with the pBase 23 via the network 21. Also, the service system 24 has an antenna 25 for quasi electrostatic field communication to execute this communication with the PK 22 via the antenna 25 and the user's body. By executing the quasi electrostatic field communication with the PK 22, the service system 24 provides the users with services such as information provision and payment settlement, for example. Also, by executing the quasi electrostatic field communication with the PK 22, the service system 24 relays the communication executed between the PK 22 and the pBase 23 via the network 21. Namely, in this case, the service system 24 functions as an access point for the communication between the PK 22 and the pBase 23.

It should be noted that the antenna 25 may be arranged in the vicinity of the service system 24 or remotely therefrom.

The service system 24 is able to provide services as a content server for providing Web pages and music, for example, a credit card processing server for credit card settlement, and a communication server for controlling the communication such as chatting.

Referring to FIG. 7, 4 service systems 24-1 to 24-4 are shown as the service system 24, but the number of service systems is not limited to 4.

The service system 24 is not limited to a server; the service system 24 may be a personal computer, a console terminal, and one of various consumer electronics equipment (CE equipment).

The service system 24 may not be connected to the network 21.

Further, service system 24-$i$ ($i$=1, 2, 3, 4 in FIG. 7), if another service system 24-$j$ ($j$=1, 2, 3, 4; $j \neq i$) is communicating with the PK 22 in a quasi electrostatic field communication manner, is able to communicate with another service system 24-$j$ via the network 21 to provide services to the user of the PK 22.

Figure 8:
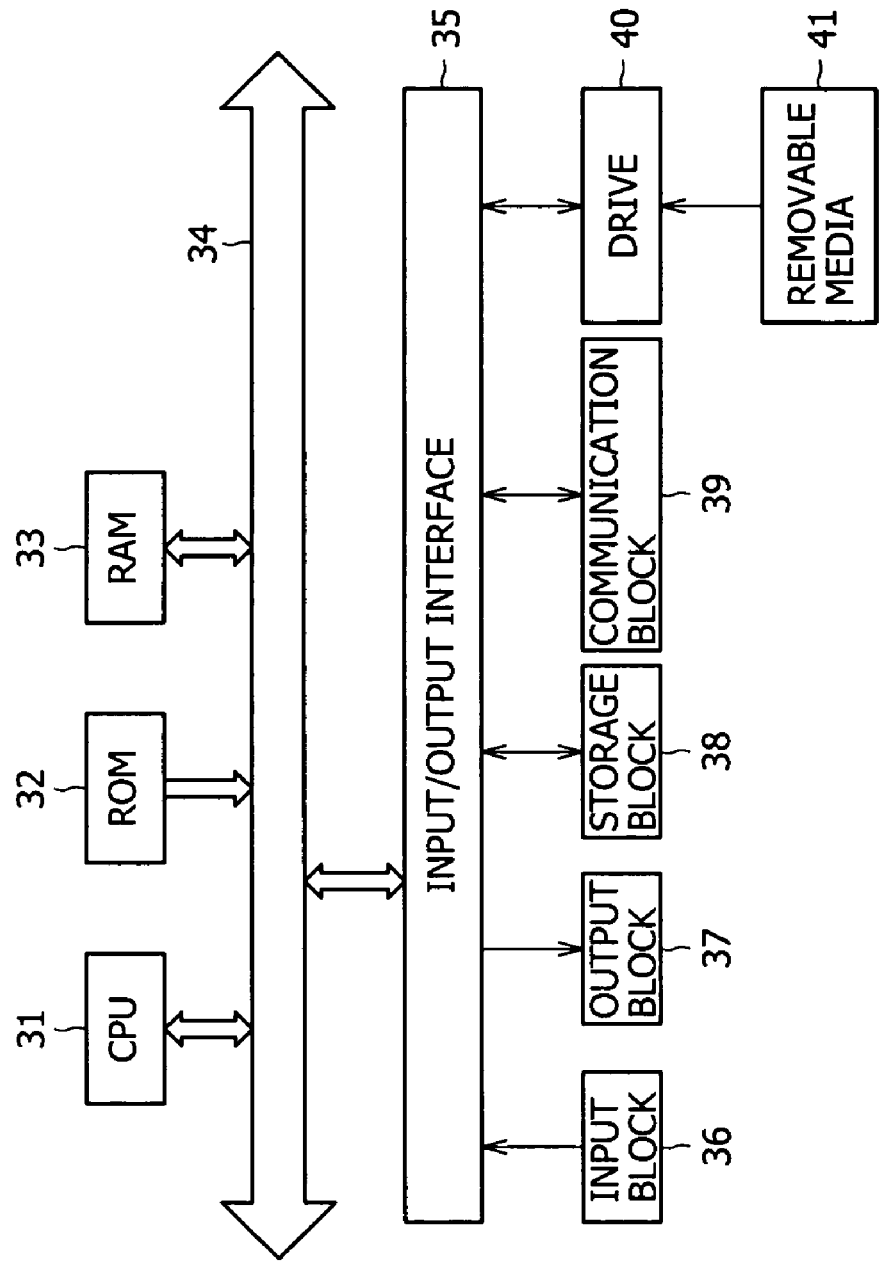
FIG. 8 is a block diagram illustrating an exemplary hardware configuration of a PK.

Referring to FIG. 8, there is shown a block diagram of an exemplary hardware configuration of the PK 22 shown in FIG. 7.

A CPU (Central Processing Unit) 31 executes various processing operations as instructed by a program stored in a ROM (Read Only Memory) 32 or a program loaded from a storage block 38 into a RAM 33. The RAM 33 also properly stores data that is required for the CPU 31 to execute various processing operations.

The CPU 31, the ROM 32, and the RAM 33 are interconnected via a bus 34. The bus 34 is also connected with an input/output interface 35.

The input/output interface 35 is connected with an input block 36 having switches, buttons, a touch-sensitive panel, and a microphone, for example and an output block 37 having a dot-matrix display device, a speaker, and a vibration motor, for example to provide the user with information in the form of image, voice, and braille or vibration. Also, the input/output interface 35 is connected with the storage block 38 based on hard disk drive or EEPROM (Electrically Erasable and Programmable Read Only Memory), for example and a communication block 39 having at least the functions of executing the quasi electrostatic field communication (the functions of transmission terminal TX and reception terminal RX shown in FIGS. 3 and 6). It should be noted that the communication block 39 may also have the functions for executing RF communication (electromagnetic wave communication), optical communication, and communication via the network 21, for example.

The input/output interface 35 is connected with a drive 40 as required. A removable media 41, for example is loaded on the drive 40. The removable media 41 stores programs to be executed by the CPU 31 for various processing operations to be described later. The programs stored in the removable media 41 are read and installed in the storage block 38 as required.

Figure 9:
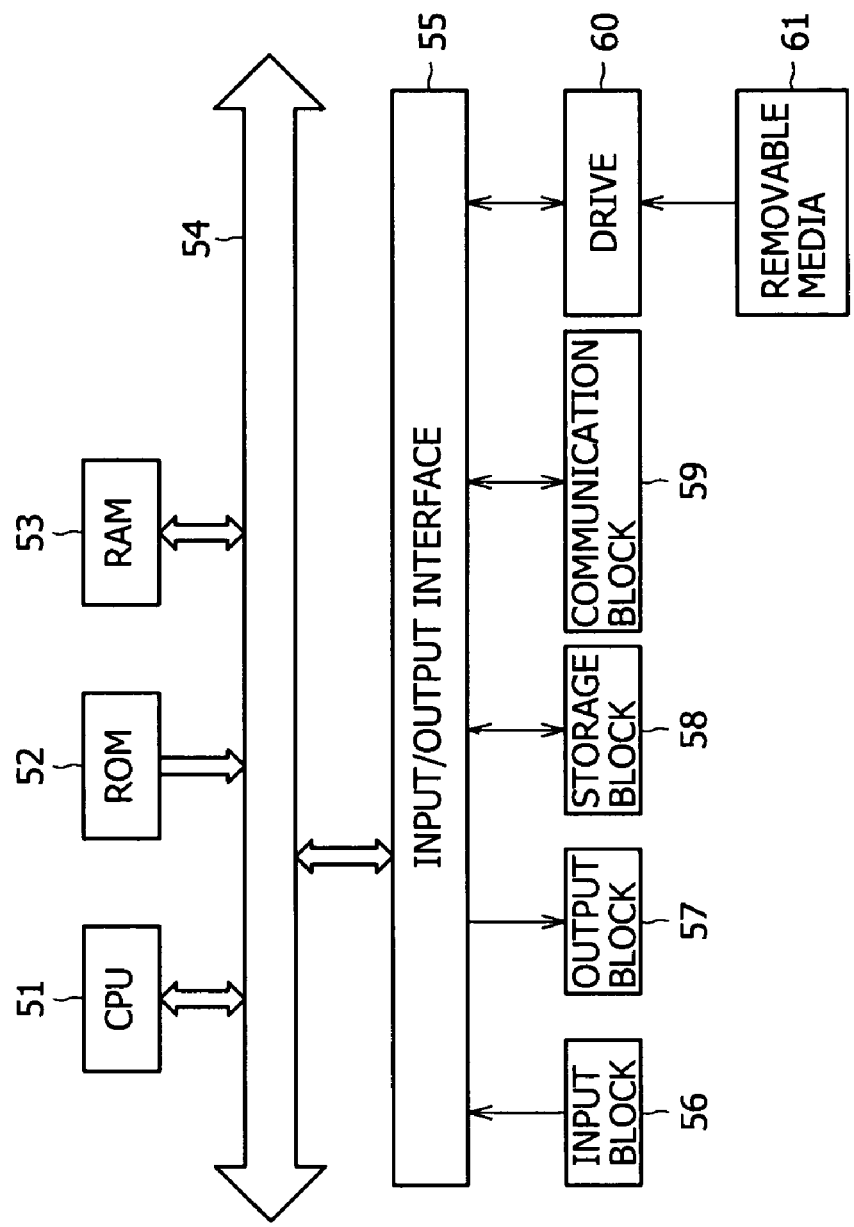
FIG. 9 is a block diagram illustrating an exemplary hardware configuration of a pBase.

Referring to FIG. 9, there is shown a block diagram of an exemplary hardware configuration of the pBase 23 shown in FIG. 7.

The pBase 23 is configured in the same manner as the PK 22 shown in FIG. 8. Namely, components shown in FIG. 9, a CPU 51 to a removable media 61, correspond to the components shown in FIG. 8, the CPU 31 to the removable media 41. The corresponding components function in the same manner as shown in FIG. 8 and therefore their detail description will be skipped. Exceptionally, a communication block 59 at least has a function of executing the communication through the network 21, rather than the quasi electrostatic field communication.

The service system 24 has the same configuration as shown in FIG. 9 and therefore this figure applies. Exceptionally, the communication block 59 of the service system 24 has at least functions for executing the quasi electrostatic field communication and the communication that is executed through the network 21.

Figure 10:
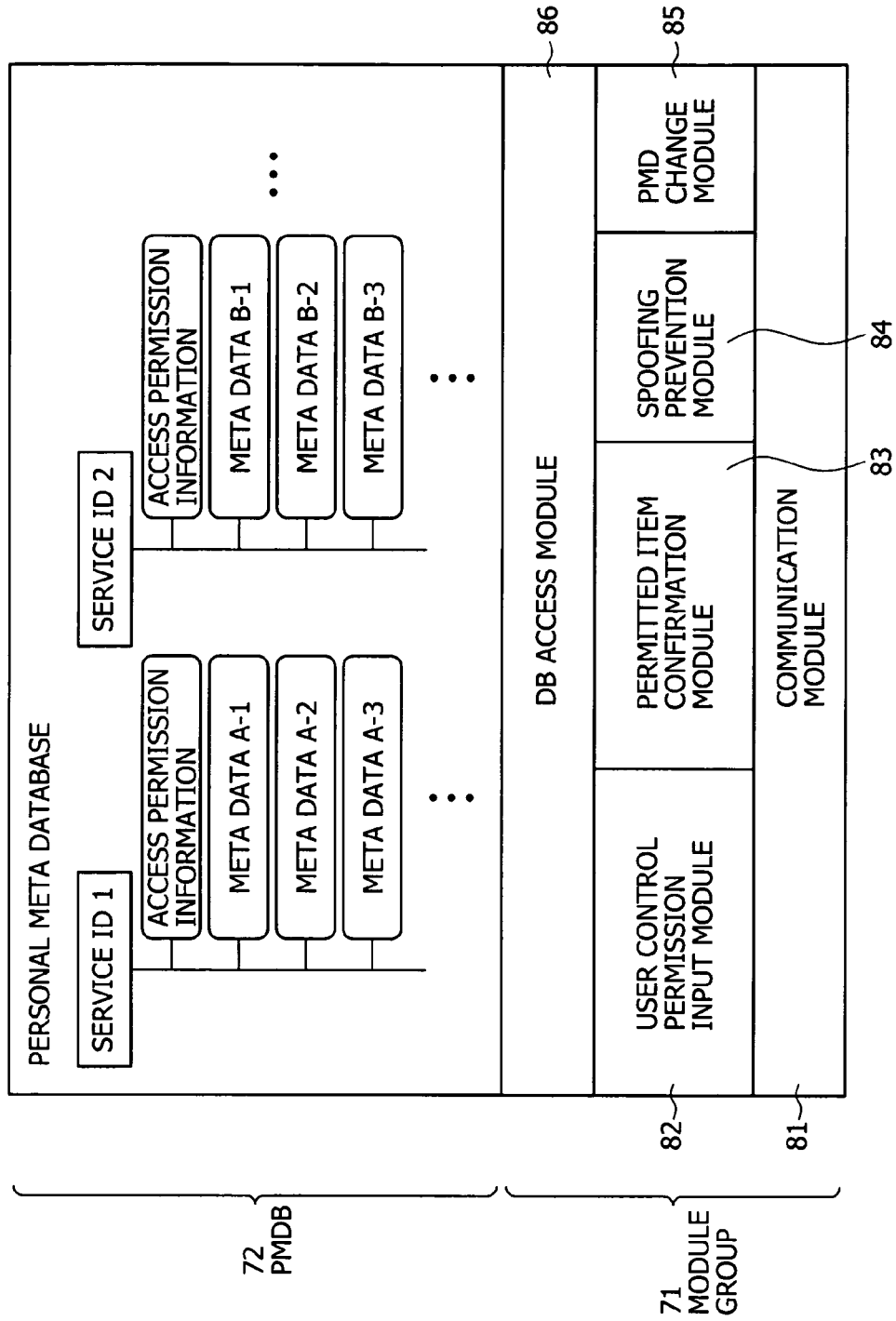
FIG. 10 is a schematic diagram illustrating contents of storage block of the PK.

Referring to FIG. 10, there is shown the contents of the storage block 38 of the PK 22.

The storage block 38 of the PK 22 at least stores a module group 71 which is a plurality of programs and a PMDB 72.

The module group 71 has a communication module 81, a user control permission input module 82, a permitted item confirmation module 83, a spoofing prevention module 84, a PMD change module 85, and a DB access module 86, which are programs (or modules) to be executed by the CPU 31 of the PK 22 for getting the provision of services from the service system 24, for example.

The communication module 81 controls the communication block 39 shown in FIG. 8 to execute communication. The user control permission input module 82 accepts a user instruction for permitting access to the PMD. The permitted item confirmation module 83 determines whether or not access is permitted to the PMD that is requested by the service system 24 for access. The spoofing prevention module 84 prevents the spoofing of the service system 24. The PMD change module 85 which performs spoofing prevention processing controls the change of PMD. The DB access module 86 accesses the PMDB 72 on the basis of commands (or requests) by the user control permission input module 82 through the PMD change module 85 so as to read or change PMD.

The PMDB 72 is a database formed by PMDs. The PMDB 72 has directories corresponding to service IDs that are IDs (Identifications) unique to the service system 24 (or services provided by the service system 24), PMDs being stored in each directory.

Referring to FIG. 10, directory corresponding to service ID1, directory corresponding to service ID2, and so on are formed.

The directory corresponding to service ID1 contains access permission information, meta data A-1, meta data A-2, meta data A-3, and so on as PMDs.

The access permission information is the information indicative of whether or not access to the information stored in that directory by the service system 24 is permitted. This information is set by the user. Meta data A-1, meta data A-2, meta data A-3, and so on are the meta data that are used in the service system 24 corresponding to service ID1. For example, if the service system corresponding to service ID1 is a content server that provides content such as movies and TV programs, the meta data indicative of movies and programs viewed by the user is stored as meta data A-1, meta data A-2, meta data A-3, and so on.

In addition, a user ID for the service system 24 to identify the PK 22 (user), the authentication information about the password or encryption key necessary for spoofing prevention processing to be described later, and user preference information based on programs viewed by the user are stored as a PMD.

As with the directory corresponding to service ID1, the directory corresponding to service ID2 also stores PMDs such as access permission information, meta data B-1, meta data B-2, meta data B-3, and so on.

If the PK 22 uses a new service system 24, a directory corresponding to the service ID of the new service system 24 is generated in the PMDB 72 and necessary PMDs are stored in the generated directory.

Figure 11:
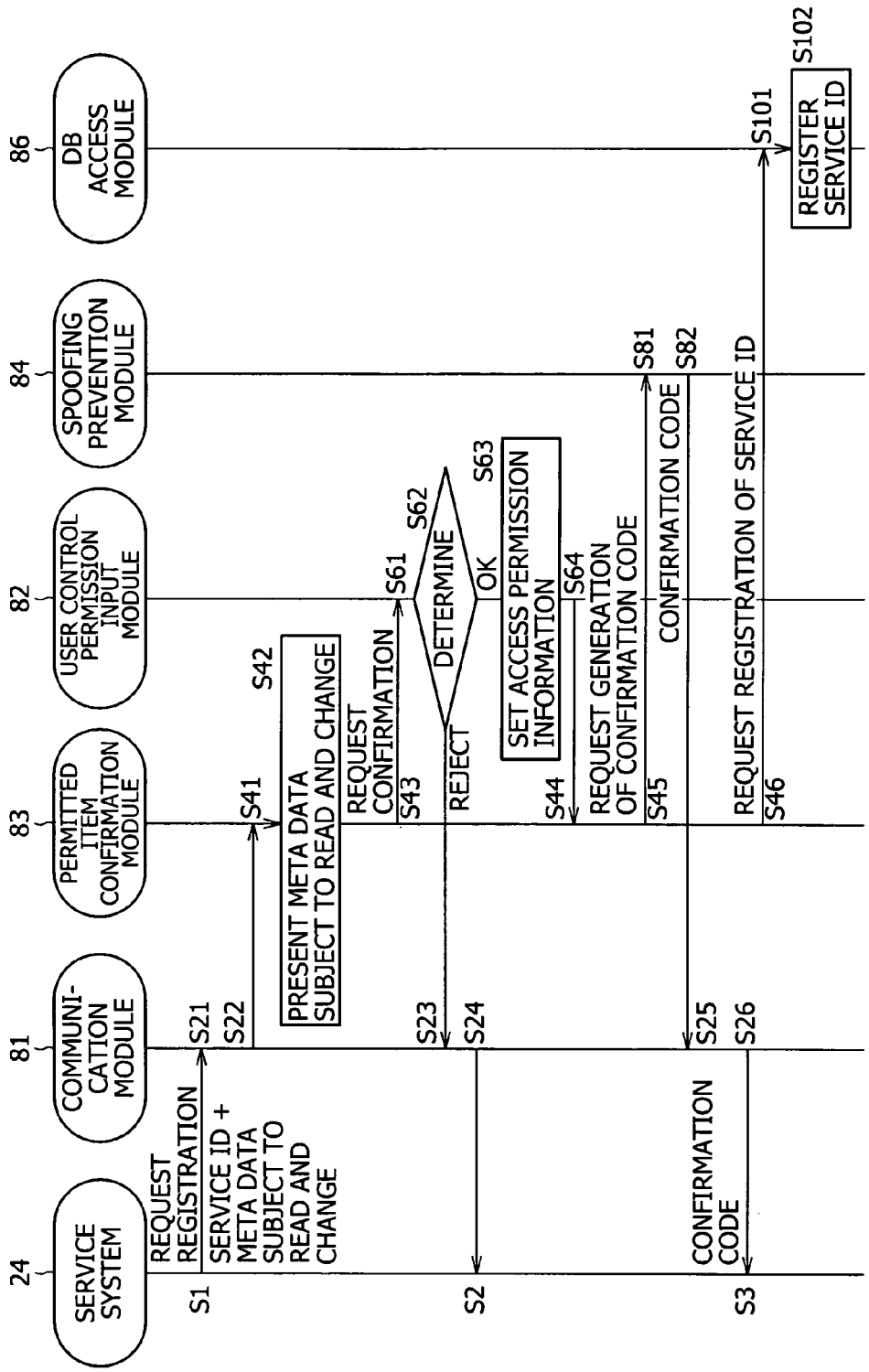
FIG. 11 is an arrow diagram indicative of processing to be executed when registering a service ID corresponding to a new service system.

Referring to FIG. 11, there is shown an arrow chart (or a flowchart) indicative of processing that is executed by the PK 22 and the service system 24 when a directory corresponding to the service ID of a new service system 24 is generated in the PMDB 72 of the PK 22, namely, processing to be executed when registering (or initially registering) the service ID corresponding to the new service system 24 with the PK 22.

It should be noted that, as described above, quasi electrostatic field communication is executed between the PK 22 and the service system 24. Therefore, the communication between the PK 22 and the service system 24 is executed when the user carrying the PK 22 is in the vicinity of the service system 24, namely, when the antenna 25 (FIG. 7) of the service system 24 is found in the space formed around the user body surface in which the quasi electrostatic field is dominant, conversely, when at least a part of the user's body is found in the space in which the quasi electrostatic field formed on the antenna 25 of the service system 24 is dominant.

First, in step S1, the service system 24 transmits to the PK 22 the information such as service request, service ID, and meta data to be read and changed in that service system 24. In step S21, this information is received by the communication module 81 of the PK 22.

The above-mentioned meta data to be read and changed by the service system 24 (the meta data subject to read and change) include both the meta data that is only referenced by the service system 24 and the meta data that is changed by the service system 24.

Next, in step S22, the communication module 81 of the PK 22 forwards the information received from the service system 24 to the permitted item confirmation module 83. In step S41, the permitted item confirmation module 83 receives the information from the communication module 81 of the PK 22, upon which the procedure goes to step S42.

In step S42, the permitted item confirmation module 83 presents the meta data subject to read and change to the user on the basis of the information received from the communication module 81. Namely, for example, the contents of the meta data subject to read and change are displayed in text or graphic onto the dot matrix display device or read aloud from the speaker.

In step S43, the permitted item confirmation module 83 outputs a confirmation request to the user control permission input module 82. In step S61, the user control permission input module 82 receives this confirmation request. In step S62, the user control permission input module 82 determines whether or not the user has rejected the access to the meta data subject to read and change presented to the user in step S42. If the access is found rejected, the user control permission input module 82 outputs a rejection signal to the communication module 81. In this case, the communication module 81 receives the rejection signal from the user control permission input module 82 in step S23. In step S24, the communication module 81 transmits the received signal to the service system 24.

In step S2, the service system 24 receives the rejection signal from the communication module 81, upon which the PK 22 and the service system 24 end this processing. In this case, the registration of the service ID corresponding to the service system 24 is not executed in the PK 22.

On the other hand, if the access to the meta data subject to read and change presented in step S42 is found not rejected by the user, then the user control permission input module 82 sets in step S63 the information such as "read and change permitted" or "read alone permitted", for example to the meta data subject to read and change. These pieces of information are stored in the PMDB 72 as access permission information (FIG. 10).

It should be noted that the setting of the information such as "read and change permitted" or "read alone permitted" is executed as specified by the user.

In step S64, the user control permission input module 82 notifies the permitted item confirmation module 83 of the setting of access permission information. In step S44, the permitted item confirmation module 83 receives this notification. In step S45, the permitted item confirmation module 83 transmits a confirmation code generation request to the spoofing prevention module 84. In step S81, the spoofing prevention module 84 receives this generation request.

Receiving the confirmation code generation request, the spoofing prevention module 84 goes from step S81 to step S82 to generate a confirmation code.

The confirmation code is a code representative of a spoofing prevention method to be used in next communication between the PK 22 and the service system 24. Namely, the confirmation code represents a method for checking mutually between the PK 22 and the service system 24 if an unauthorized user or a third party that taps the communication between the PK 22 and service system 24 masquerades the PK 22 or the service system 24.

For a spoofing prevention method, the authentication by password (password method), the authentication by the information encrypted by public key (public key method), or the authentication by the information encrypted by common key (common key method) may be used, for example. The PK 22 and the service system 24 or the user of the PK 22 are able to select an optimum spoofing prevention method by considering, the communication between the PK 22 and the service system 24, for example, the required level of security, the frequency and degree of spoofing checking, the required level of the security and ease of encryption key administration method, and the amount of computation required for encryption and decryption, for example. The spoofing prevention module 84 generates a confirmation code corresponding to the selected spoofing prevention method. It should be noted that spoofing prevention processing will be described later with reference to FIGS. 12 and 13.

In step S82, having generated the confirmation code, the spoofing prevention module 84 outputs the generated confirmation code to the communication module 81. In step S25, the communication module 81 receives the confirmation code. In step S26, the communication module 81 transmits the confirmation code received in step S25 to the service system 24. In step S3, the service system 24 receives the confirmation code from the communication module 81 and stores the received confirmation code, upon which this processing ends.

It should be noted that the communication module 81 of the PK 22 also transmits a user ID for the service system 24 to identify the PK 22 (or the user thereof) to the service system 24, in addition to the confirmation code. The service system 24 stores the confirmation code from the communication module 81 by relating the confirmation code with the user ID received from the communication module 81.

The user ID may be of any form as long as the service system 24 is able to identify the PK 22 (or the user thereof). Also, the user ID of the PK 22 may differ from one service system to another or, if one service system provides a plurality of services, one service from another.

On the other hand, after transmitting the confirmation code generation request to the spoofing prevention module 84 in step S45, the permitted item confirmation module 83 goes to step S46 to output a service ID registration request to the DB access module 86 along with the service ID received from the service system 24 in step S41. In step S101, the DB access module 86 receives the service ID registration request and the service ID from the permitted item confirmation module 83. In step S102, the DB access module 86 executes service ID registration processing to be described later with reference to FIG. 14, upon which the processing ends.

When the service ID registration processing has been executed by the DB access module 86, a directory with which the service ID from the service system 24 is registered, namely, the directory corresponding to that service ID is generated.

When the service ID corresponding to the service system 24 has been registered with the PK 22 as described above, the meta data subject to read and change, which is the PMD requested by the service system 24 for reading or changing is presented to the user. On the basis of a user specification, the meta data for "read and change permitted" or "read alone permitted" is set, so that the user is able to limit the PMD to be provided to the service system 24 (or the PMD to be referenced by the service system 24) and the PMD that can be changed by the service system 24.

Consequently, the above-mentioned configuration is able to prevent any PMD that the user does not want to publicize from being provided to the service system 24 without user's knowledge. This allows the user to receive the provision of services with security.

Next, as described above with reference to FIG. 11, the PK 22, when communicating with the service system 24 for the first time, registers the service ID of the service system 24 and generates a confirmation code. The service system 24, also when communicating with the PK 22 for the first time, stores the confirmation code generated by the PK 22 and the user ID of the PK 22 in a related manner.

When communicating with the service system 24 to receive the provision of services from the service system 24 after the registration of the service ID of the service system 24, the PK 22 is able to execute the spoofing prevention processing on the basis of the confirmation code generated at the registration of that service ID.

Likewise, when communicating with the PK 22 to provide services to the user of the PK 22 after storing the user ID of the PK 22 and the confirmation code in a related manner, the service system 24 is able to execute the spoofing prevention processing on the basis of the confirmation code related with the user ID of that PK 22.

Figure 12:
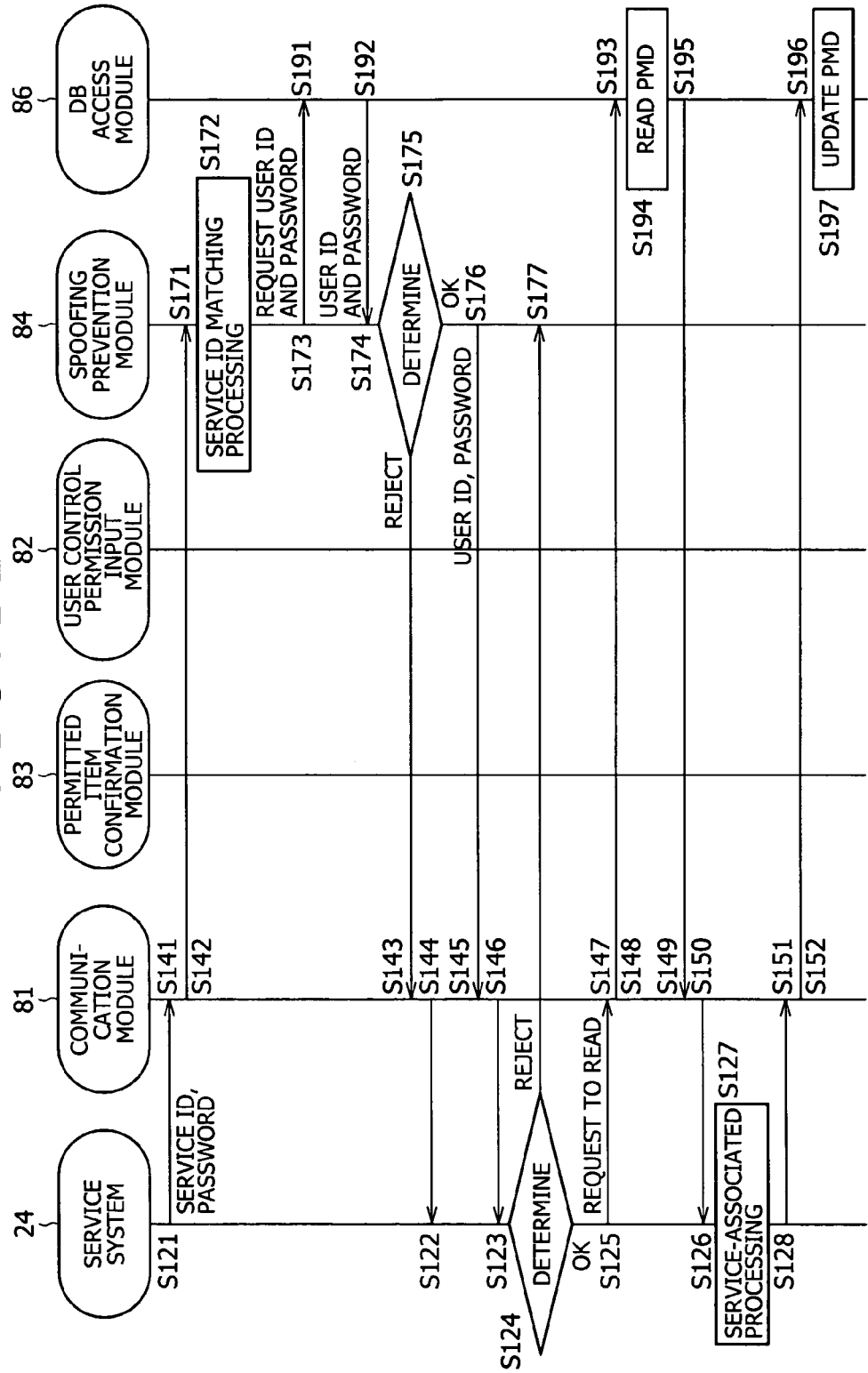
FIG. 12 is an arrow diagram indicative of processing for preventing spoofing that uses the authentication based on password.
Figure 13:
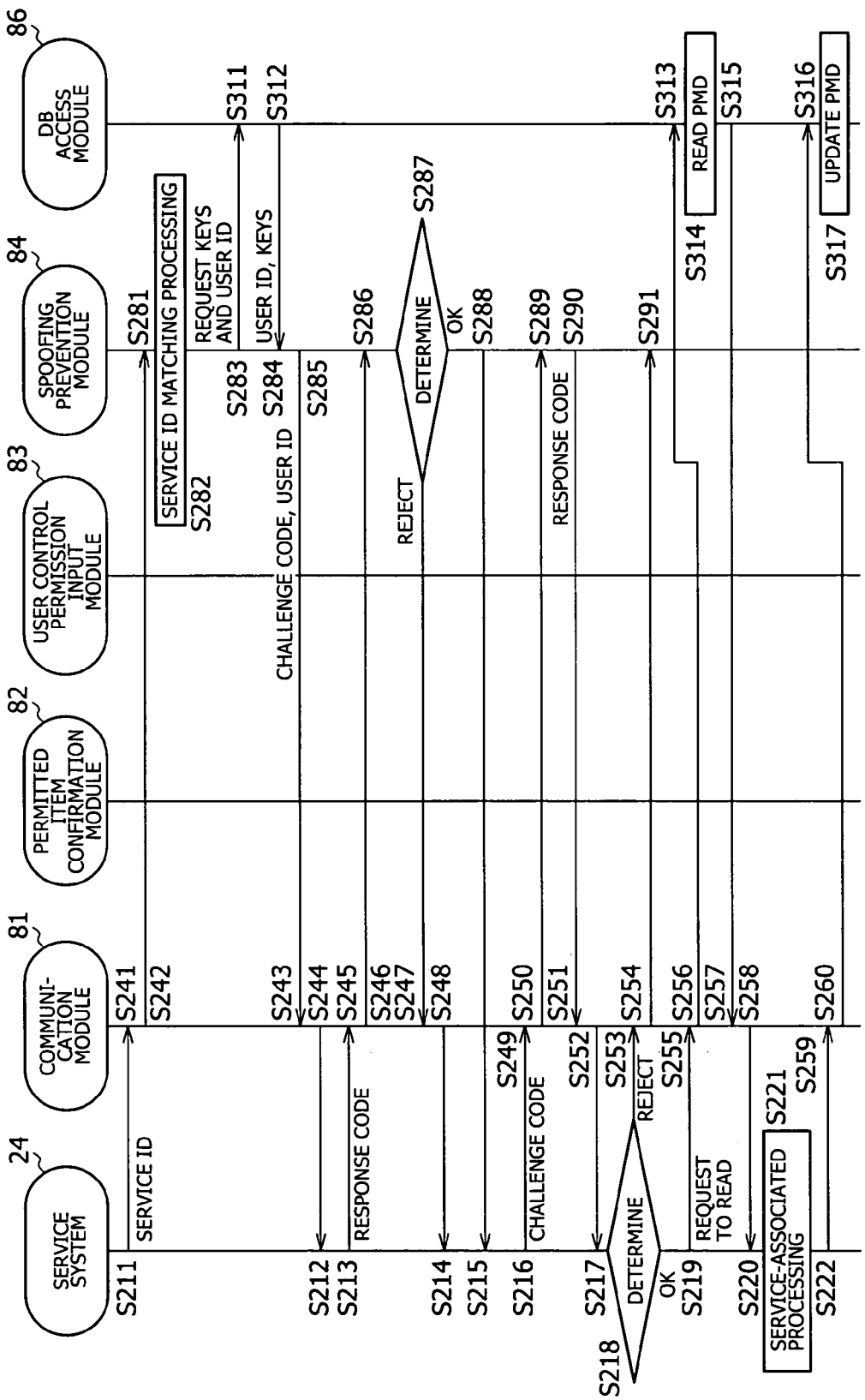
FIG. 13 is an arrow diagram indicative of processing for preventing spoofing that uses the authentication based on public key cryptography.

The following describes the spoofing prevention processing to be executed when the PK 22 and the service system 24 communicate with each other, with reference to the arrow charts shown in FIGS. 12 and 13.

Referring to FIG. 12, there is shown the arrow chart indicative of processing to be executed by the PK 22 and the service system 24 including the spoofing prevention processing based on the authentication by password.

In the spoofing prevention method shown in FIG. 12, the PK 22 checks if the service system 24 is spoofing or not. Next, the service system 24 checks if the PK 22 is spoofing or not. When both the PK 22 and the service system 24 are found not spoofing, the reading or changing of PMD is executed.

A password for use in the authentication process shown in FIG. 12 is a predetermined code, for example. At the registration of the service ID of the service system 24, the PK 22 generates a password for authenticating the service system 24 (a service password) and a password for authenticating the PK 22 (a PK password) as the passwords corresponding to that service ID and stores these generated passwords into the PMDB 72. Further, at the time of service ID registration, the PK 22 transmits the service password and the PK password from the PMDB 72 to the service system 24. Then, the service system 24 relates the user ID of the PK 22 with the service password and the PK passwords and stores the related information.

First, in step S121, the service system 24 transmits the service ID of the service system 24 and the service password related with the user ID of the PK 22 to the PK 22. In step S141, the communication module 81 receives the service ID and the service password from the service system 24.

In step S121, the service system 24 has already received the user ID of the PK 22 therefrom, so that the service system 24 transmits the service password related with that user ID to the PK 22.

In step S142, the communication module 81 of the PK 22 forwards the service ID and the service password received from the service system 24 in step S141 to the spoofing prevention module 84. In step S171, the spoofing prevention module 84 receives these ID and password and goes to step S172.

In step S172, the spoofing prevention module 84 executes service ID matching processing to be described later with reference to FIG. 15. In step S173, the spoofing prevention module 84 notifies the DB access module 86 of the service password and PK password stored in the PMDB 72 as related with the service ID supplied from the service system 24 and a request for user ID. In step S191, the DB access module 86 receives the request from the spoofing prevention module 84 and goes to step S192.

In step S192, the DB access module 86 reads the service password and PK password and the user ID requested by the spoofing prevention module 84 from the PMDB 72 and outputs these pieces of information to the spoofing prevention module 84.

In step S174, the spoofing prevention module 84 receives the service password and PK password and the user ID from the DB access module 86. In step S175, the spoofing prevention module 84 compares the service password from the service system 24 with the service password stored in the PMDB 72 (the service password received in step S174) to determine whether there is a match between these passwords.

If no match is found between the service password from the service system 24 and the service password stored in the PMDB 72 in step S175, then the spoofing prevention module 84 determines that the service system 24 is possibly spoofing, thereby outputting a rejection signal to the communication module 81 to reject the communication.

In step S143, the communication module 81 receives the rejection signal from the spoofing prevention module 84 and goes to step S144 to transmit the received rejection signal to the service system 24. In step S122, the service system 24 receives the rejection signal from the communication module 81.

The PK 22 rejects the access by the service system 24 after the transmission of the rejection signal to the service system 24. Namely, the PK 22 rejects the communication with the service system 24.

On the other hand, if a match is found in the comparison in step S175, then the spoofing prevention module 84 recognizes in step S176 that the service system 24 is not spoofing, thereby outputting the user ID and the PK password related with the service ID of the service system 24 stored in the PMDB 72 (the PK password received in step S174) to the communication module 81.

In step S145, the communication module 81 receives the user ID and the PK password from the spoofing prevention module 84 and goes to step S146 to transmit the user ID and the PK password to the service system 24.

In step S123, the service system 24 receives the user ID and the PK password from the PK 22 (or the communication module 81 thereof). In step S124, the service system 24 compares the PK password related with the user ID from the PK 22 with the PK password from the PK 22 (the PK password received in step S123) to determine whether there is a match between these PK passwords.

If a mismatch is found between the PK passwords in step S124, then the service system 24 determines that the PK 22 is possibly spoofing and transmits a rejection signal indicative of the rejection of the communication with the PK 22 thereto. In step S177, the spoofing prevention module 84 of the PK 22 receives the rejection signal from the service system 24 via the communication module 81.

After transmitting the rejection signal to the PK 22 as described above, the service system 24 rejects the access by the PK 22. Namely, the service system 24 rejects the communication with the PK 22.

On the other hand, if a match is found between the PK passwords in step S124, then the service system 24 determines the that PK 22 is not spoofing and goes to step S125 to transmit a request to the PK 22 for the reading of PMD.

In step S147, the communication module 81 receives the read request from the service system 24 and goes to step S148 to output the received read request to the DB access module 86.

In step S193, the DB access module 86 receives the read request from the communication module 81 and goes to step S194 to read the requested PMD from the directory corresponding to the service ID of the service system 24 in the PMDB 72.

In step S194, the DB access module 86 checks to see if the requested reading of the PMD is permitted by referencing the access permission information (FIG. 10) of the directory corresponding to the service ID of the service system 24. If the requested reading is permitted, the DB access module 86 reads only the permitted PMD of the requested PMDs from the PMDB 72.

Next, in step S195, the DB access module 86 outputs the PMD read from the PMDB 72 to the communication module 81. In step S149, the communication module 81 receives the PMD and goes to step S150.

In step S150, the communication module 81 transmits the PMD received in step S149 to the service system 24. In step S126, the service system 24 receives the PMD and goes to step S127.

In step S127, the service system 24 executes various processing operations (corresponding to service) on the basis of the PMD received from the PK 22. If the change of the PMD from the PK 22 is found necessary as a result of the service-corresponding processing executed in step S127, the service system 24 goes to step S128 to change the PMD received from the PK 22 and transmit the changed PMD to the PK 22.

In step S151, the communication module 81 receives the PMD from the service system 24 and goes to step S152 to output the received PMD to the DB access module 86.

In step S196, the DB access module 86 receives the PMD from the communication module 81, namely, the PMD changed by the service system 24, and goes to step S197. In step S197, the DB access module 86 checks to see if the change of that PMD is permitted by referencing the access permission information (FIG. 10) of the directory corresponding to the service ID of the service system 24. In addition, in step S197, the DB access module 86 changes (or updates) the PMD of the PMDs in the PMDB 72 that is permitted for change corresponding to the PMD changed by the service system 24 in accordance with the PMD changed by the service system 24, upon which the above-mentioned processing ends.

As described above, the PK 22 checks the service system 24 for spoofing by checking for a match between the service passwords and the service system 24 checks the PK 22 for spoofing by checking for a match between the PK passwords, thereby providing secure provision of services.

It should be noted that, in the above-mentioned example, the PK 22 checks for a match between the service passwords and then the service system 24 checks for a match between the PK passwords. Obviously, it is practicable that the service system 24 checks for a match between the PK passwords before the PK 22 checks for a match between the service passwords.

Now, referring to FIG. 13, there is shown an arrow chart indicative of the processing by the PK 22 and the service system 24 including the spoofing prevention processing by use of the authentication based on the information encrypted by the public key.

In the spoofing prevention processing shown in FIG. 13, the PK 22 checks to see if the service system 24 is not spoofing and then the service system 24 checks to see if the PK 22 is not spoofing. If the both the PK 22 and the service system 24 have found that they are not spoofing each other, then the PMD read or change processing is executed.

It should be noted that the PK 22 and the service system 24 are supposed to have each a function of encrypting and decrypting information on the basis of a public key cryptographic algorithm, such as RSA (Rivest-Shamir-Adeleman) for example.

When the service ID of the service system 24 is registered with the PK 22, it is supposed that the PK 22 have obtained the public key of the service system 24 from the service system 24 for example and stored the obtained public key in the PMDB 72 as related with the service ID of the service system 24. Likewise, the service system 24 is supposed to have obtained the public key of the PK 22 and stored the obtained public key as related with the user ID of the PK 22.

In addition, both the PK 22 and the service system 24 are supposed to have the private keys of their own.

First, in step S211, the service system 24 transmits the service ID of itself to the PK 22. In step S241, the communication module 81 receives the service ID from the service system 24 and goes to step S242 to forward the received service ID to the spoofing prevention module 84.

In step S281, the spoofing prevention module 84 receives the service ID from the service system 24 forwarded by the communication module 81 and goes to step S282 to execute service ID matching processing to be described later with reference to FIG. 15, going to step S283.

In step S283, the spoofing prevention module 84 transmits a request for the user ID, the private key of the PK 22, and the public key corresponding to the service ID of the service system 24 to the DB access module 86. In step S311, the DB access module 86 receives this request.

In step S312, the DB access module 86 reads the user ID, the private key of the PK 22, and the public key corresponding to the service ID of the service system 24 from the PMDB 72 and supplies the user ID and the keys to the spoofing prevention module 84.

In step S284, the spoofing prevention module 84 receives the user ID, the private key of the PK 22, and the public key corresponding to the service ID of the service system 24 (or the public key of the service system 24) from the DB access module 86 and goes to step S285.

In step S285, the spoofing prevention module 84 generates a so-called challenge code for authenticating the service system 24. In addition, in step S285, the spoofing prevention module 84 encrypts the generated challenge code by the public key of the service system 24 and outputs the encrypted challenge code to the communication module 81 along with the user ID.

In step S243, the communication module 81 receives the encrypted challenge code and the user ID from the spoofing prevention module 84 and goes to step S244 to transmit the received encrypted challenge code and the user ID to the service system 24.

In step S212, the service system 24 receives the encrypted challenge code and the user ID from the PK 22 (namely, the communication module 81 thereof) and goes to step S213.

In step S213, the service system 24 decrypts the encrypted challenge code received from the PK 22 by the private key of the service system 24 into the plaintext challenge code. In addition, in step S213, the service system 24 encrypts, as a response code, the challenge code by the public key (the public key of the PK 22) stored as related with the user ID received from the PK 22 in step S212 and transmits the encrypted response code to the PK 22.

In step S245, the communication module 81 receives the encrypted response code from the service system 24 and goes to step S246 to output the received encrypted response code to the spoofing prevention module 84.

In step S286, the spoofing prevention module 84 receives the encrypted response code from the communication module 81 and decrypts the encrypted response code by its private key and goes to step S287.

In step S287, the spoofing prevention module 84 compares the response code with the challenge code generated in step S285 to determine whether there is a match therebetween.

If a mismatch is found between the challenge code and the response code in step S287, then the spoofing prevention module 84 recognizes that the service system 24 is possibly spoofing and transmits a rejection signal indicative of communication to the communication module 81.

In step S247, the communication module 81 receives the rejection signal from the spoofing prevention module 84 and goes to step S248 to transmit the received rejection signal to the service system 24. In step S214, the service system 24 receives the rejection signal from the communication module 81.

After transmitting the rejection signal to the service system 24 as described above, the PK 22 rejects the access by the service system 24. Namely, the PK 22 rejects the communication with the service system 24.

On the other hand, if a match is found between the challenge code and the response code in step S287, the spoofing prevention module 84 transmits an OK code indicative of the confirmation that the service system 24 is not spoofing to the service system 24 via the communication module 81.

In step S215, the service system 24 receives the OK code from the PK 22 and goes to step S216 to generate a challenge code for authenticating the PK 22. In addition, in step S216, the service system 24 encrypts the generated challenge code by the public key (of the PK 22) stored as related with the user ID of the PK 22 and transmits the encrypted challenge code to the PK 22.

In step S249, the communication module 81 of the PK 22 receives the encrypted challenge code from the service system 24 and goes to step S250 to output the received encrypted challenge code to the spoofing prevention module 84.

In step S289, the spoofing prevention module 84 receives the encrypted challenge code from the communication module 81 and goes to step S290. In step S290, the spoofing prevention module 84 decrypts the encrypted challenge code received in step S289 by the private key of the PK 22 obtained in step S284. In addition, in step S290, the spoofing prevention module 84 encrypts, as a response code, the challenge code decrypted by the private key of the PK 22 by the public key (the public key of the service system 24 obtained in step S284) stored as related with the service ID of the service system 24 and outputs the encrypted response code to the communication module 81.

In step S251, the communication module 81 receives the encrypted response code from the spoofing prevention module 84 and goes to step S252 to transmit the received encrypted response code to the service system 24.

In step S217, the service system 24 receives the encrypted response code from the PK 22 (or the communication module 81 thereof) and decrypts the received encrypted response code by its private key and goes to step S218.

In step S218, the service system 24 compares the response code decrypted in step S217 with the challenge code generated in step S216 to determine whether there is a match therebetween.

If a mismatch is found between the challenge code and the response code in step S218, then the service system 24 recognizes that the PK 22 is possibly spoofing and transmits a rejection signal indicative of communication rejection to the PK 22.

In step S253, the communication module 81 of the PK 22 receives the rejection signal from the service system 24 and goes to step S254 to transmit the received rejection signal to the spoofing prevention module 84. In step S291, the spoofing prevention module 84 receives the rejection signal from the communication module 81 and ends the above-mentioned processing.

After transmitting the rejection signal to the PK 22 as described above, the service system 24 rejects the access by the PK 22. Namely, the service system 24 rejects the communication with the PK 22.

On the other hand, if a match is found between the challenge code and the response code in step S218, namely, the mutual authentication is found successful between the PK 22 and the service system 24, then the service system 24 recognizes that the PK 22 is not spoofing and goes to step S219 to transmit a PMD read request to the PK 22.

In step S255, the communication module 81 of the PK 22 receives the read request from the service system 24 and goes to step S256 to output the received request to the DB access module 86.

In step S313, the DB access module 86 receives the read request from the communication module 81 and goes to step S314 to read the requested PMD from the directory corresponding to the service ID of the service system 24.

In step S314, the DB access module 86 checks to see if the reading of the PMD requested by the read request is permitted by referencing the access permission information (FIG. 10) in the directory corresponding to the service ID of the service system 24 and reads only the permitted PMD of the PMDs requested by the read request from the PMDB 72, in the same manner as step S194 shown in FIG. 12.

Next, in step S315, the DB access module 86 outputs the PMD read from the PMDB 72 to the communication module 81. In step S257, the communication module 81 receives this PMD and goes to step S258.

In step S258, the communication module 81 transmits the received PMD to the service system 24. In step S220, the service system 24 receives this PMD and goes to step S221.

In step S221, the service system 24 executes various processing operations as the service processing operation on the basis of the PMD received from the PK 22 in step S220. If changing of the PMD received from the PK 22 is found required as a result of the service-associated processing of step S221, then the service system 24 goes to step S222 to change the PMD received from the PK 22 and transmits the changed PMD to the PK 22.

In step S259, the communication module 81 receives the PMD from the service system 24 and goes to step S260 to output the received PMD to the DB access module 86.

In step S316, the DB access module 86 receives the PMD from the communication module 81, namely, the PMD changed by the service system 24, and goes to step S317 to check to see if the change of this PMD is permitted by referencing the access permission information (FIG. 10) in the directory corresponding to the service ID of the service system 24. In addition, in step S317, the DB access module 86 changes (or updates) the permitted PMD of the PMDs in the PMDB 72 corresponding to the PMD changed by the service system 24 in accordance with the PMD changed by the service system 24 and ends the above-mentioned processing.

As described above, so-called challenge and response authentication between the PK 22 and the service system 24 also allows the secure provision of services.

In the above-mentioned example, the PK 22 first executes the authentication of the service system 24 before the service system 24 authenticates the PK 22. It also practicable that the service system 24 authenticates the PK 22 before the PK 22 authenticates the service system 24.

In the above-mentioned example, the challenge code and the response code are encrypted and decrypted by the public key. It is also practicable that the encryption and decryption of the challenge code and the response code are executed by the common key.

In the example shown in FIG. 12 or 13, the information is transferred as encrypted by the public key for example in the communication between the PK 22 and the service system 24 to be executed after the successful mutual authentication. Namely, the information is transferred in an encrypted manner in the communication in steps S126 and S150 shown in FIG. 12 and the communication in steps S128 and S151 shown in FIG. 12, and the communication in steps S220 and S258 shown in FIG. 13 and the communication in steps S222 and S259 shown in FIG. 13.

Figure 14:
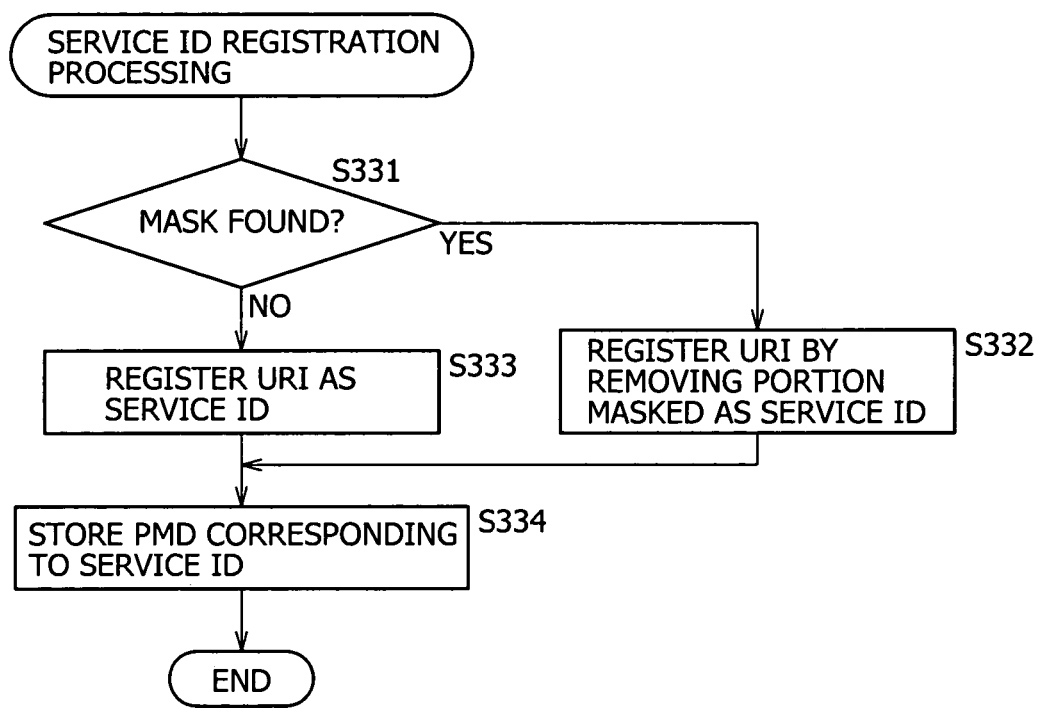
FIG. 14 is a flowchart indicative of service ID registration processing.

The following details the service ID registration processing in step S102 shown in FIG. 11 with reference to FIG. 14.

It is assumed here that a URI (Uniform Resource Identifier) for example be used as the service ID of the service system 24.

First, in step S331, the DB access module 86 determines whether mask information is set.

The mask information denotes information for partially masking each URI, which may be set by the user in advance for example.

Each URI is made up of scheme name, host name, port number, and path name, for example. It should be noted that port number may be omitted in URI.

The URI with port number omitted is written as "http://aaa.bbb.ccc/ddd" for example. In this URI "http://aaa.bbb.ccc/ddd", "http" denotes scheme name, "aaa.bbb.ccc" denotes host name. and "ddd" denotes path name.

For example, if a certain service provider is operating a plurality of service systems 24 and if the reading and changing of the same PMD are permitted for each of the service systems 24, it is troublesome for the PK 22 to separately register the service IDs of these service systems 24. In addition, in this case, it is unnecessary for the PK 22 to make distinction between these service systems 24.

On the other hand, if URI is used as the service ID of the service system 24, the scheme name and the host name (for example, "http://aaa.bbb.ccc") or a part of the scheme name and the host name (for example, "http://aaa.bbb") in the URIs of a plurality of service systems 24 operated by the same service provider are generally the same.

In this case, a plurality of service systems 24 operated by the same service provider can be identified by the scheme name and the host name in URI or a part thereof.

The mask information is set so as to mask the portions that can be identified without making distinction between a plurality of service systems 24 operated by the same service provider, except for the scheme name and the host name in URI or a part thereof.

If the mask information is found set in step S331, then the DB access module 86 goes to step S332 to mask a part of the URI as the service ID received in step S101 shown in FIG. 11 in accordance with the mask information and registers the URI masked by that mask information into the PMDB 72 as the service ID, going to step S334. Namely, the DB access module 86 generates in the PMDB 72 a directory having a directory name that is the URI masked by the mask information.

If no mask information is found set in step S331, then the DB access module 86 goes to step S333 to register the URI that is the service ID received in step S101 shown in FIG. 11 directly into the PMDB 72, going to step S334. Namely, the DB access module 86 generates a directory having a directory name that is the URI as the service ID received in step S101 shown in FIG. 11.

In step S334, the DB access module 86 stores the PMD that is the meta data subject to read and change represented by the information transmitted in step S1 shown in FIG. 11 by the service system 24 into the directory generated in step S332 or S333, thereby ending the service ID registration processing.

Figure 15:
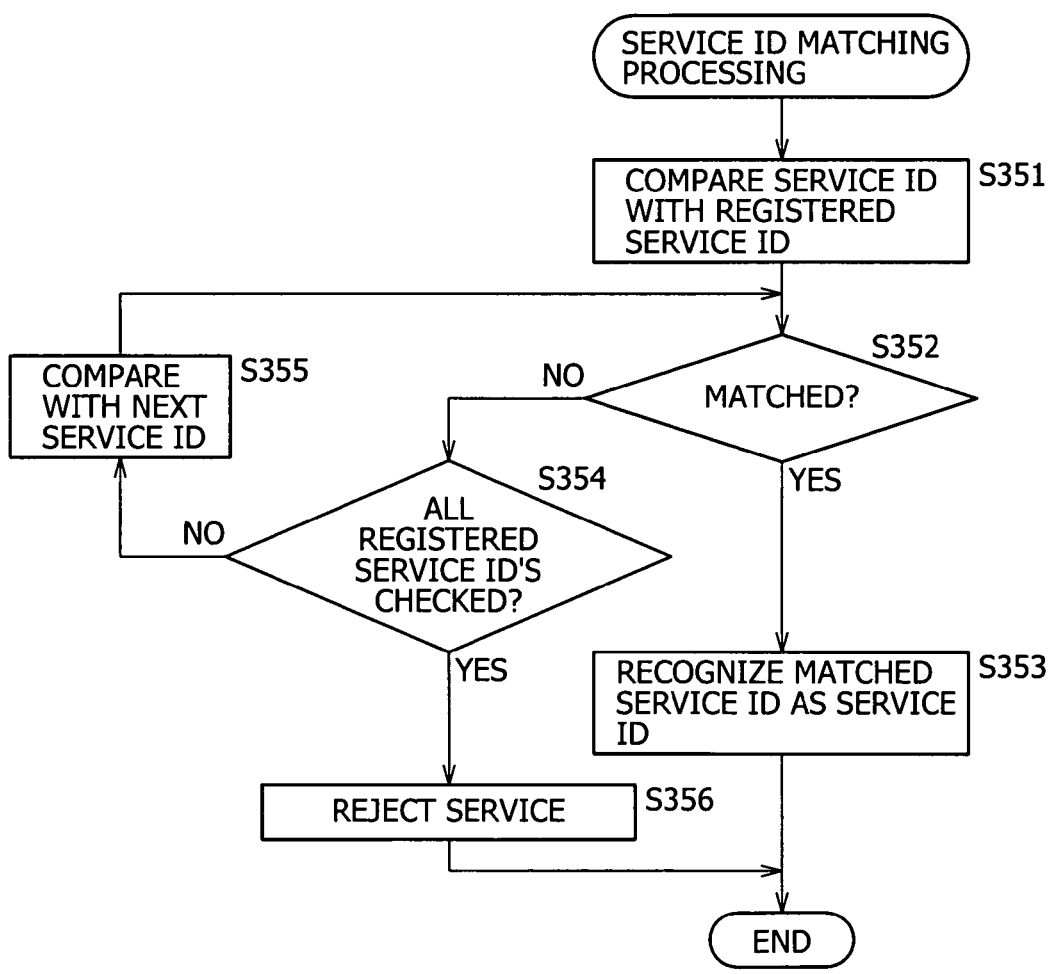
FIG. 15 is a flowchart indicative of service ID matching processing.

The following details, with reference to FIG. 15, the service ID matching processing that is executed by the spoofing prevention module 84 in step S172 shown in FIG. 12 or step S282 shown in FIG. 13.

In step S351, the spoofing prevention module 84 compares a service ID in attention that is the first service ID registered in the PMDB 72 (FIG. 10) with the URI (of the service system 24) that is the service ID received from the service system 24 in step S171 shown in FIG. 12 or step S281 shown in FIG. 13, character by character from the beginning of these service IDs, and goes to step S352.

It should be noted here that the spoofing prevention module 84 gets the service ID registered in the PMDB 72 (FIG. 10) through the DB access module 86.

In step S352, the spoofing prevention module 84 determines from a result of the comparison between the URI of the service system 24 and the service ID in attention whether the URI has a part matching the service ID in attention from the beginning of the URI.

If the URI of the service system 24 is found having a part matching the service ID in attention in step S352, then the spoofing prevention module 84 goes to step S353 to recognize the service ID in attention as the service ID for identifying the service system 24, thereby ending the service ID matching processing.

If the URI of the service system 24 is found having no part matching the service ID in attention in step S352, then the spoofing prevention module 84 goes to step S354 to determine whether all service IDs registered in the PMDB 72 have been matched as the service ID in attention with the URI of the service system 24.

If there still remain service IDs in the PMDB 72 that have not yet been matched as the service ID in attention in step S354, then the spoofing prevention module 84 goes to step S355 to compare one of the service IDs in the PMDB 72 that have not been made the service IDs in attention with the URI of the service system 24. In step S352, the above-mentioned processing is repeated.

On the other hand, if all service IDs registered in the PMDB 72 are found to be service IDs in attention, namely, if there is found in the PMDB 72 no more service ID matching the URI of the service system 24, the spoofing prevention module 84 goes to step S356 to notify the service system 24 of the rejection of the provision of service through the communication module 81, thereby ending the service ID matching processing.

It should be noted that, if the information indicative of the rejection of service provision has been transmitted to the service system 24, upon which the service ID matching processing of step S172 shown in FIG. 12 or step S282 shown in FIG. 13 as described above ends, no subsequent processing will be executed in FIG. 12 or FIG. 13.

Figure 16:
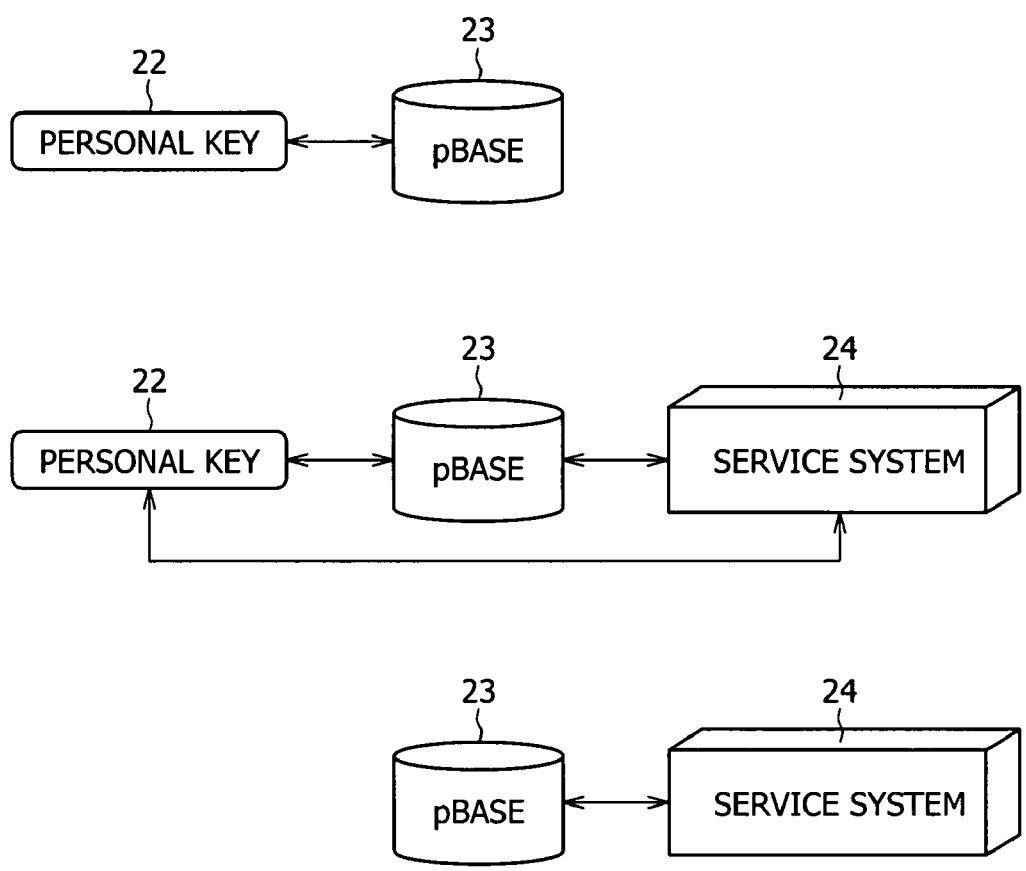
FIG. 16 is a schematic diagram illustrating the passing of Personal Meta Data (PMD) between the PK, pBase, and the service system.

The following describes transfer of PMDs between the PK 22, the pBase 23, and service system 24 with reference to FIG. 16.

As described above, the PK 22 is able to communicate with the pBase 23 through the network 21 with the service system 24 used as an access point.

As shown at top of FIG. 16, communication between the PK 22 and the pBase 23 allows the comparison between the PMD stored in the PK 22 and the PMD stored in the pBase 23 to execute PMD synchronization. If the contents of the PMD of the PK 22 have been updated, this PMD synchronization updates the PMD of the pBase 23 in the same manner. Details of the PMD synchronization will be described later.

In addition, the pBase 23 is able to store PMDs that cannot be stored in the PK 22 any more, for example. In such a case, as shown in the center of FIG. 16, the service system 24 is able to reference the PMDs of the pBase 23 to provide service to the user of the PK 22.

Further, as shown at bottom in FIG. 16, the communication between the pBase 23 and the service system 24 through the network 21 allows the pBase 23 to provide a PMD to the service system 24, thereby receiving the service corresponding to the provided PMD from the service system 24.

Figure 17:
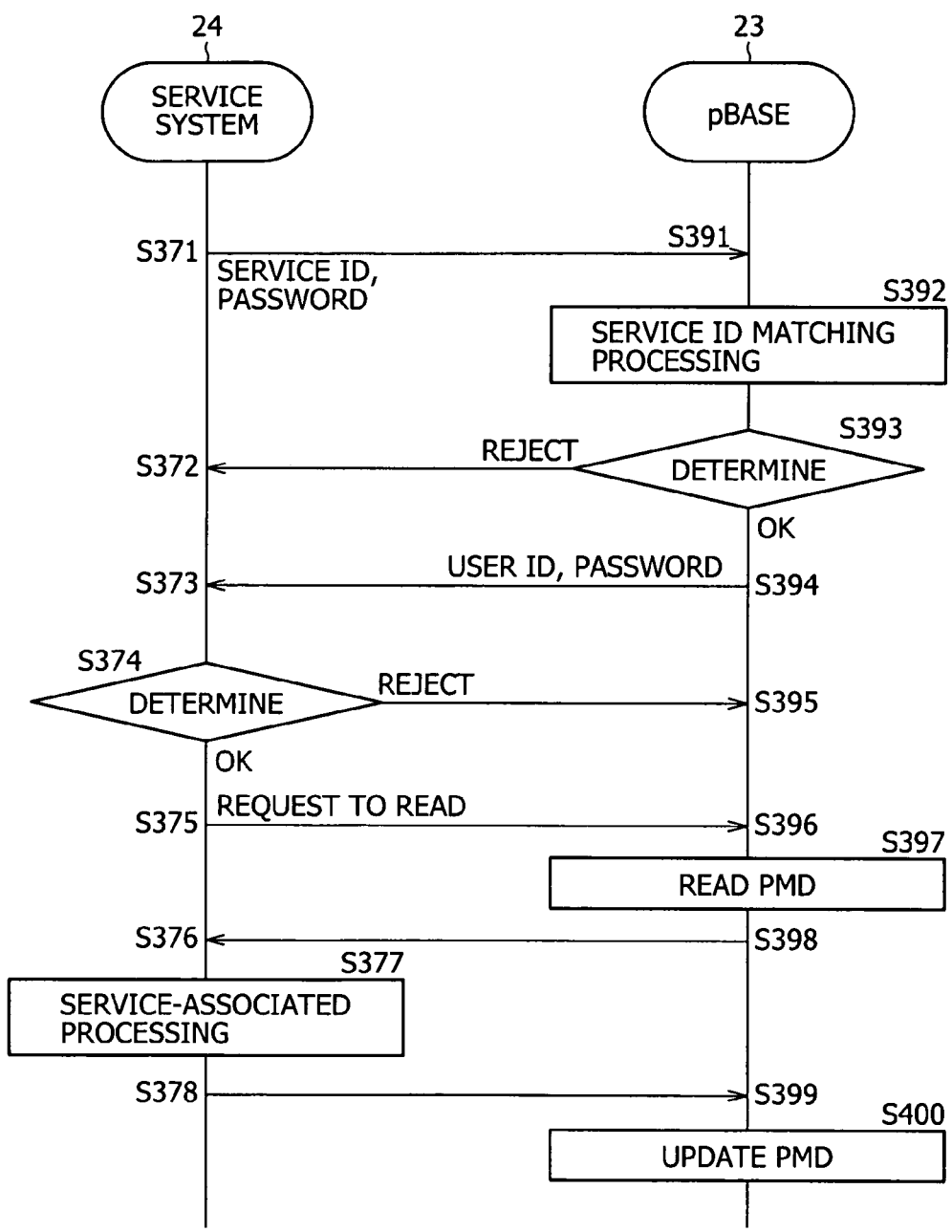
FIG. 17 is an arrow diagram indicative of processing to be executed between the pBase and the service system.
Figure 18:
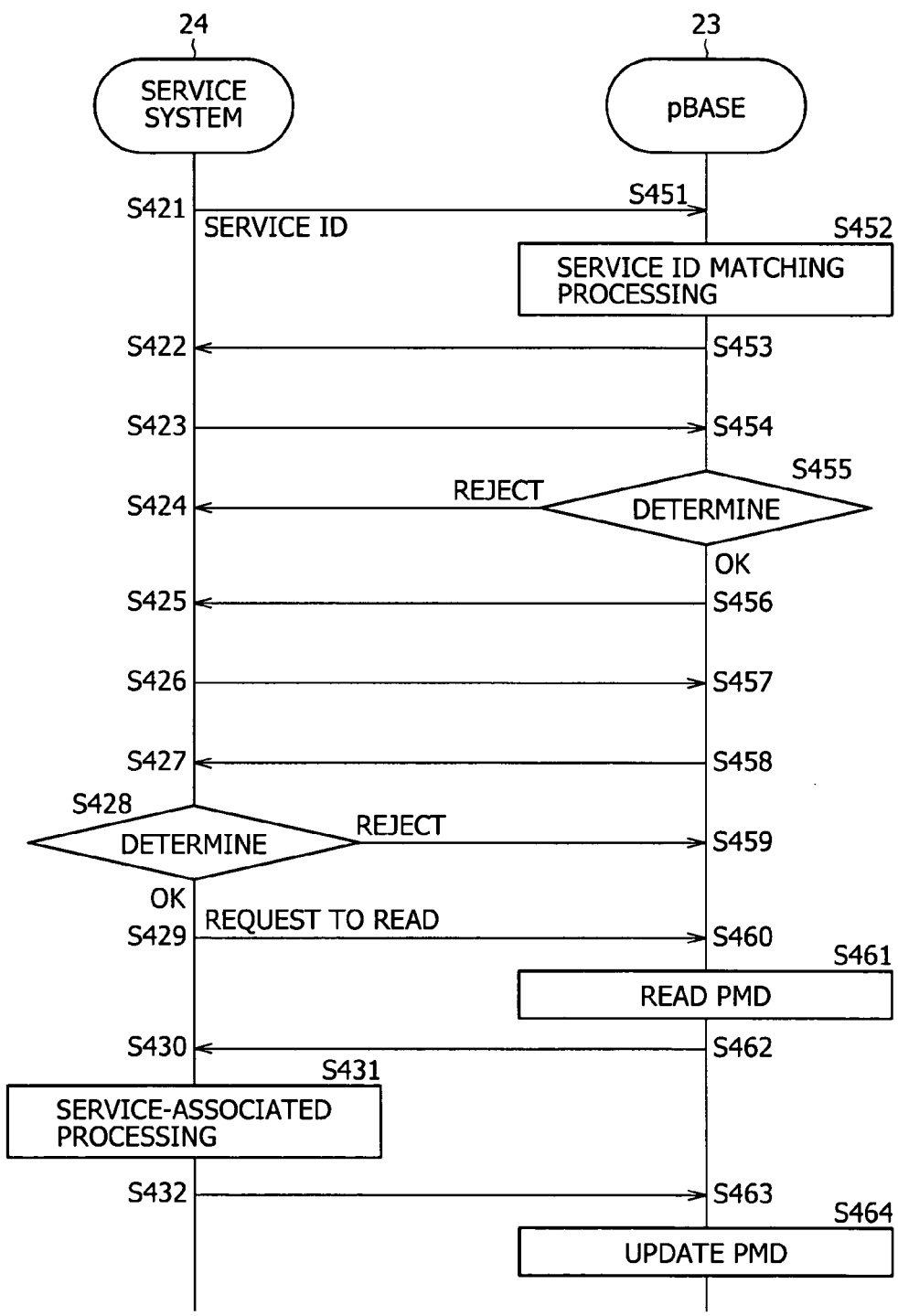
FIG. 18 is an arrow diagram indicative of processing to be executed between the pBase and the service system.

The following describes, with reference to FIGS. 17 and 18, the flow of the processing to be executed between the pBase 23 and the service system 24 shown at bottom of FIG. 16.

Referring to FIG. 17, it is supposed that the same PMDB 72 as stored in the PK 22 (or the user thereof) be stored in the pBase 23 and, as the spoofing prevention processing to be executed with the service system 24, the processing based on the authentication by password as described with reference to FIG. 12 be used.

Also referring to FIG. 17, it is supposed that, as with the PK 22 described with reference to FIG. 12, the pBase 23 store the PK password, the service password, the user ID of the PK 22, and the service ID of the service system 24.

First, in step S371, the service system 24 transmits its own service ID and the service password stored as related with the user ID of the PK 22 to the pBase 23. In step S391, the pBase 23 receives the service ID and the service password from the service system 24.

Because the service system 24 has already received the user ID of the PK 22 from the PK 22 or the pBase 23 in step S371, the service system 24 transmits the service password stored as related with that user ID to the pBase 23.

In step S392, the pBase 23 executes the service ID matching processing described with reference to FIG. 15 by use of the service ID of the service system 24 received in step S391 and goes to step S393.

In step S393, the pBase 23 recognizes the service password and PK password stored as related with the service ID of the service system 24 and compares the service password received from the service system 24 with the service password stored in the pBase 23 to determine whether a match is found.

If a mismatch is found between the service password from the service system 24 and the service password stored in the pBase 23 (the service password stored as related with the service password from the service system 24) in step S393, then the pBase 23 determines that the service system 24 is possibly spoofing and outputs a rejection signal indicative of communication rejection to the service system 24.

In step S372, the service system 24 receives the rejection signal from the pBase 23.

After transmitting the rejection signal to the service system 24 as described above, the pBase 23 rejects the access by the service system 24. Namely, the pBase 23 rejects the communication with the service system 24.

On the other hand, if a match is found in step S393, the pBase 23 goes to step S394 to determine that the service system 24 is not spoofing and transmits the user ID of the PK 22 and the PK password stored as related with the service ID of the service system 24 to the service system 24.

In step S373, the service system 24 receives the user ID and the PK password from the pBase 23 and goes to step S374. In step S374, the service system 24 compares the PK password stored as related with the user ID from the pBase 23 with the PK password from the pBase 23 (the PK password received in step S373) to determine whether there is a match between these PK passwords.

If a mismatch is found between the PK passwords in step S374, the service system 24 determines that the pBase 23 is possibly spoofing and transmits a rejection signal indicative of communication rejection to the pBase 23. In step S395, the pBase 23 receives the rejection signal from the service system 24.

After transmitting the rejection signal to the pBase 23 as described above, the service system 24 rejects the access by the pBase 23. Namely, the service system 24 rejects the communication with the pBase 23.

On the other hand, if a match is found between the PK passwords in step S374, then the service system 24 determines that the pBase 23 is not spoofing and goes to step S375 to transmit a PMD read request to the pBase 23.

In step S396, the pBase 23 receives the PMD read request from the service system 24 and goes to step S397 to read the PMD specified in the received read request.

In step S397, the pBase 23 determines whether the reading of the PMD specified in the read quest is permitted as with the case in step S194 shown in FIG. 12 and reads only the PMD permitted for reading among the PMDs specified in the read request.

In step S398, the pBase 23 transmits the PMD read therefrom to the service system 24. In step S376, the service system 24 receives the PMD from the pBase 23 and goes to step S377.

In step S377, the service system 24 executes various processing operations (service-associated processing) on the basis of the PMD received from the pBase 23 in step S376. If the change of the PMD from the pBase 23 is required as a result of the service-corresponding processing executed in step S377, the service system 24 goes to step S378 to change the PMD received from the pBase 23, transmitting the changed PMD to the pBase 23.

In step S399, the pBase 23 receives the changed PMD from the service system 24 and goes to step S400 to determine whether the change of that PMD is permitted by referencing the access permission information (FIG. 10) in the directory corresponding to the service ID of the service system 24. In addition, in step S400, the pBase 23 changes (or updates) the PMD permitted for change among the PMDs stored in the pBase 23 corresponding to the PMD changed by the service system 24, in accordance with the PMD changed by the service system 24, upon which the above-mentioned processing ends.

As described above, the pBase 23 checks the service system 24 for spoofing on the basis of the comparison of service passwords and the service system 24 checks the pBase 23 for spoofing on the basis of the comparison of PK passwords, ensuring the secure provision of services.

It should be noted that, in the above-mentioned example, the pBase 23 checks the service passwords for a match and then the service system 24 checks the PK passwords for a match; it is also practicable that the service system 24 checks the PK passwords for a match before the pBase 23 checks the service passwords for a match.

The following describes, with reference to FIG. 18, another example of the flow of the processing to be executed between the pBase 23 and the service system 24 shown at bottom of FIG. 16.

As with the example shown in FIG. 17, it is supposed in FIG. 18 that the same PMDB 72 as stored in the PK 22 be stored in the pBase 23.

It is also supposed in FIG. 18 that, as the spoofing prevention processing to be executed with the service system 24, the authentication based on the information encrypted by the public key be used as with the example shown in FIG. 13.

In addition, it is supposed in FIG. 18 that the pBase 23 and the service system 24 each have a function for executing encryption and decryption of information on the basis of a public key cryptographic algorithm and therefore the pBase 23 store the private key corresponding to the public key of the PK 22 and the service system 24 store the private key corresponding to its own public key. Further, it is supposed that the pBase 23 store the public key of the service system 24 as related with the service ID of the service system 24 and the service system 24 store the public key of the PK 22 as related with the user ID of the PK 22.

First, in step S421, the service system 24 transmits its own service ID to the pBase 23. In step S451, the pBase 23 receives the service ID from the service system 24 and goes to step S452 to executes the service ID matching processing described with reference to FIG. 5 by use of the received service ID, going to step S453.

In step S453, the pBase 23 recognizes the user ID and private key of the PK 22 and the public key corresponding to the service ID of the service system 24 to generate a challenge code for authenticating the service system 24. In addition, in step S453, the pBase 23 encrypts the generated challenge code by the public key of the service system 24 and transmits the encrypted challenge code to the service system 24 along with the user ID.

In step S422, the service system 24 receives the encrypted challenge code and the user ID from the pBase 23 and goes to step S423.

In step S423, the service system 24 decrypts the encrypted challenge code from the pBase 23 by its own private key into the plaintext challenge code. In addition, in step S423, the service system 24 encrypts a response code that is the decrypted challenge code by the public key (of the PK 22) corresponding to the user ID received from the pBase 23 in step S422 and transmits the encrypted response code to the pBase 23.

In step S454, the pBase 23 receives the encrypted response code from the service system 24 and goes to step S455 to decrypt the encrypted response code by the private key of the PK 22 into the plaintext response code. In addition, in step S455, the pBase 23 compares the response code with the challenge code generated in step S453 to determine whether there is a match therebetween.

If a mismatch is found in step S455 between the challenge code and the response code, then the pBase 23 determines that the service system 24 is possibly spoofing and transmits a rejection signal indicative of communication rejection to the service system 24. In step S424, the service system 24 receives the rejection signal from the pBase 23.

After transmitting the rejection signal to the service system 24 as described above, the pBase 23 rejects the access by the service system 24. Namely, the pBase 23 rejects the communication with the service system 24.

On the other hand, if a match is found in step S455 between the challenge code and the response code, then the pBase 23 goes to step S456 to transmit an OK code to the service system 24, indicating that the service system 24 is not spoofing.

In step S425, the service system 24 receives the OK code from the pBase 23 and goes to step S426 to generate a challenge code for authenticating the pBase 23. In addition, in step S426, the service system 24 encrypts the generated challenge code by the public key (of the PK 22) stored as related with the user ID of the PK 22 and transmits the encrypted challenge code to the pBase 23.

In step S457, the pBase 23 receives the encrypted challenge code from the service system 24 and goes to step S458 to decrypts the received encrypted challenge code by the private key of the PK 22 into the plaintext challenge code. In addition, in step S458, the pBase 23 encrypts the response code that is the decrypted challenge code by the public key (of the service system 24) stored as related with the service ID of the service system 24 and transmits the encrypted response code to the service system 24.

In step S427, the service system 24 receives the encrypted response code from the pBase 23 and decrypts the received encrypted response code by its own private key, going to step S428.

In step S428, the service system 24 compares the response code decrypted in step S427 with the challenge code generated in step S426 to determine whether there is a match.

If a mismatch is found between the challenge code and the response code in step S428, the service system 24 determines that the pBase 23 is possibly spoofing and transmits a rejection signal indicative of communication rejection to the pBase 23.

In step S459, the pBase 23 receives the rejection signal from the service system 24 and ends the above-mentioned processing.

After transmitting the rejection signal to the pBase 23, the service system 24 rejects the access by the pBase 23. Namely, the service system 24 rejects the communication with the pBase 23.

On the other hand, if a match is found between the challenge code and the response code in step S428, namely, if mutual authentication between the pBase 23 and the service system 24 is found successful, the service system 24 determines that the pBase 23 is not spoofing and goes to step S429 to transmit a PMD read request to the pBase 23.

In step S460, the pBase 23 receives the PMD read request from the service system 24 and goes to step S461 to read the PMD specified in the received PMD read request.

In step S461, the pBase 23 determines whether the reading of the PMD specified in the read quest is permitted as with the case in step S194 shown in FIG. 12 and reads only the PMD permitted for reading among the PMDs specified in the read request.

In step S462, the pBase 23 transmits the PMD read therefrom to the service system 24. In step S430, the service system 24 receives the PMD from the pBase 23 and goes to step S431.

In step S431, the service system 24 executes various processing operations (service-associated processing) on the basis of the PMD received from the pBase 23 in step S430. If the change of the PMD from the pBase 23 is required as a result of the service-corresponding processing executed in step S431, the service system 24 goes to step S432 to change the PMD received from the pBase 23, transmitting the changed PMD to the pBase 23.

In step S463, the pBase 23 receives the changed PMD from the service system 24 and goes to step S464 to determine whether the change of that PMD is permitted by referencing the access permission information (FIG. 10) in the directory corresponding to the service ID of the service system 24. In addition, in step S464, the pBase 23 changes (or updates) the PMD permitted for change among the PMDs stored in the pBase 23 corresponding to the PMD changed by the service system 24, in accordance with the PMD changed by the service system 24, upon which the above-mentioned processing ends.

As described above, so-called challenge and response authentication between the pBase 23 and the service system 24 also allows the secure provision of services.

In the above-mentioned example, the pBase 23 first executes the authentication of the service system 24 before the service system 24 authenticates the pBase 23. It also practicable that the service system 24 authenticates the pBase 23 before the pBase 23 authenticates the service system 24.

In the above-mentioned example, the challenge code and the response code are encrypted and decrypted by the public key. It is also practicable that the encryption and decryption of the challenge code and the response code are executed by the common key.

In the example shown in FIG. 17 or 18, the information is transferred as encrypted by the public key for example in the communication between the pBase 23 and the service system 24 to be executed after the successful mutual authentication. Namely, the information is transferred in an encrypted manner in the communication in steps S376 and S398 shown in FIG. 17 and the communication in steps S378 and S399 shown in FIG. 17, and the communication in steps S430 and S462 shown in FIG. 18 and the communication in steps S432 and S463 shown in FIG. 18.

Now, referring to FIGS. 19 to 21, there are shown exemplary contents of PMD.

Each PMD is a set of meta data related with service IDs and includes property for identifying that PMD and contents (or attributes) of the property.

Referring to FIG. 19, "name", "spoofing prevention method", "service public key", "PK private key", "action", and "program preference information" are arranged as meta data attributes.

If the PMD (namely, meta data) shown in FIG. 19 is related with service ID1 for example, attribute "name" is indicative of the user ID provided to the service system 24 corresponding to service ID1, its attribute value being "foo" in FIG. 19.

Referring to FIG. 19, attribute "spoofing prevention method" is indicative of the spoofing prevention method that is executed with the service system 24 corresponding to service ID1, its attribute value being "public key method".

If the processing shown in FIG. 11 is executed between the PK 22 and the service system 24 corresponding to service ID1 and a code indicative of "public key method" is generated as a confirmation code in step S82, then the attribute value of attribute "spoofing prevention method" is "public key method" as shown in FIG. 19.

Since the attribute value of attribute "spoofing prevention method" is "public key method" in FIG. 19, attribute "service public key" and "PK private key" indicative of the keys for use in encryption and decryption based on the public key method are arranged in the PMD.

Namely, attribute "service public key" is indicative of the public key of the service system 24 corresponding to service ID1. In FIG. 19, the data of the public key of the service system 24 is written as its attribute.

Attribute "PK private key" is indicative of the private key of the PK 22 and, in FIG. 19, the data of the private key of the PK 22 is written as its attribute value.

Attribute "action" is indicative of a program that is executed when receiving a service from the service system 24 corresponding to service ID1. The execution format file (name) of the program is written as its attribute value.

Attribute "program preference information" is indicative of user's preference for use in receiving service from the service system 24 corresponding to service ID1. In FIG. 19, "sports 10, variety 7, music 5, others 3" are written as its attribute values.

Access permission information controls access to the attribute value of each attribute. For each attribute, a control code consisting of a predetermined number of bits is arranged as access permission information.

When attention is paid to a particular attribute, the first bit of the control code corresponding to the attribute in attention sets the ability or inability of reading of the attribute value of the attribute in attention by the service system 24 corresponding to service ID1, for example. The second bit sets the ability or inability of changing the attribute value of the attribute in attention by the service system 24 corresponding to service ID1, for example. The third bit sets the ability or inability of reading the attribute value of the attribute in attention by other service systems than the service system 24 corresponding to service ID1, for example. The fourth bit sets the ability or disability of changing the attribute value of the attribute in attention by other service systems than the service system 24 corresponding to service ID1, for example.

In addition, the control code may have bit for setting the ability or disability of program execution, for example.

Referring to FIG. 20, "name", "spoofing prevention method", "common key", "action", and "program preference information" are arranged as meta data attributes. Referring to FIG. 21, "name", "spoofing prevention method", "service password", "PK password", "action", and "program preference information" are arranged as meta data attributes.

In FIGS. 20 and 21, the same attribute values as those shown in FIG. 19 are written for attributes "name", "action", and "program preference information". Also, in FIGS. 20 and 21, access permission information (or control code) is the same as that shown in FIG. 19.

In FIG. 20, the attribute value of attribute "spoofing prevention method" is "common key method". If the processing shown in FIG. 11 is executed between the PK 22 and the service system 24 corresponding to service ID1 and a code indicative of "common key method" is generated as a confirmation code in step S82, then the attribute value of attribute "spoofing prevention method" is "common key method" as shown in FIG. 20.

Also, in FIG. 20, since the attribute value of attribute "spoofing prevention method" is "common key method", attribute "common key" indicative of the key for use in encryption and decryption based on common key method is set to the PMD.

Namely, attribute "common key" is indicative of the common key (or private key) for use in encryption and decryption based on common key method and the data of that common key is written as its attribute value in FIG. 20.

On the other hand, referring to FIG. 21, the attribute value of attribute "spoofing prevention method" is "password method". If the processing shown in FIG. 11 is executed between the PK 22 and the service system 24 corresponding service ID1 for example and a code indicative of "password method" is generated as a confirmation code in step S82, then the attribute value of attribute "spoofing prevention method" is "password method" as shown in FIG. 21.

Also, in FIG. 21, since the attribute value of attribute "spoofing prevention method" is "password method", attribute "service password" and "PK password" indicative of the passwords for use in the authentication based on password method are set to the PMD.

In addition, in FIG. 21, the data of the above-mentioned service password is written as the attribute value of attribute "service password" and the data of the above-mentioned PK password is written as the attribute value of attribute "PK password".

Figure 22:
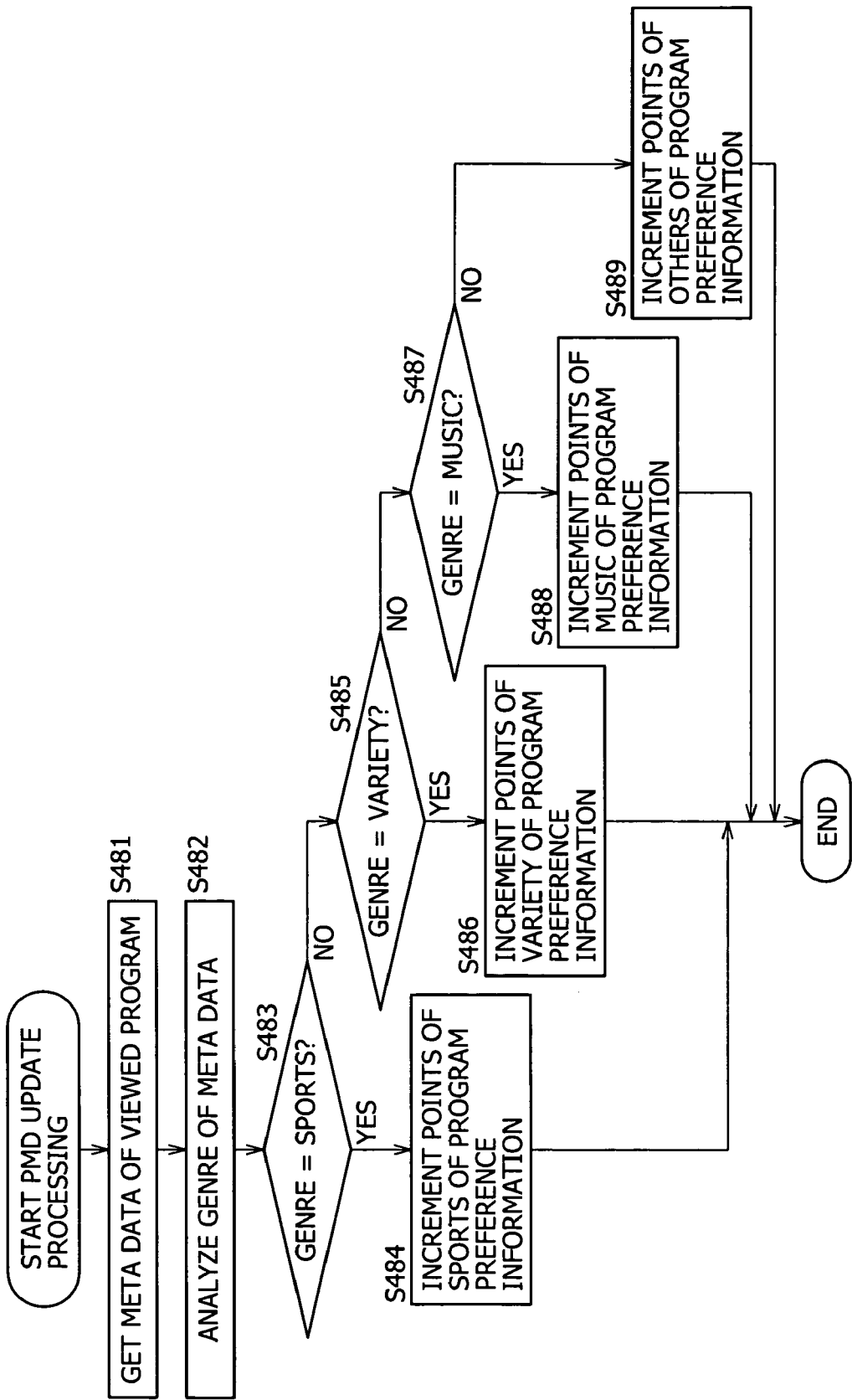
FIG. 22 is a flowchart indicative of PMD update processing.

The following describes PMD update processing with reference to FIG. 22.

The PMD update processing shown in FIG. 22 is executed by the service system 24 as one of the service-corresponding processing operations in step S127 shown in FIG. 12 or step S221 shown in FIG. 13 when a content viewing service is provided by the service system 24, for example.

It is supposed here that the PMD containing "program preference information" as shown in FIGS. 19 to 21, for example, be stored in the PK 22 of the user who has received the content viewing service from the service system 24 and this "program preference information" (or the attribute value thereof) have already been provided from the PK 22 to the service system 24.

In step S481, the service system 24 (namely, the CPU 51 thereof in FIG. 9) gets the meta data of a program (or content) viewed by the user (or provided to the user) and goes to step S482. In step S482, the service system 24 checks the meta data obtained in step S481 for the genre of the program viewed by user and goes to step S483.

In step S483, the service system 24 determines whether or not the genre obtained in step S482 is sports. If the genre is found sports in step S438, the service system 24 goes to step S484 to increment the points of sports in the attribute value of attribute "program preference information" (FIGS. 19 to 21) in the PMD, thereby ending the processing. For example, "sports 10, variety 7, music 5, others 3" in FIGS. 19 to 21 becomes "sports 11, variety 7, music 5, others 3".

If the genre obtained in step S482 is found not sports in step S483, then the service system 24 goes to step S485 to determine whether or not the genre is variety.

If the genre is found variety in step S485, the service system 24 goes to step S486 to increment the points of variety, thereby ending the processing. For example, "sports 10, variety 7, music 5, others 3" in FIGS. 19 to 21 becomes "sports 10, variety 8, music 5, others 3".

On the other hand, if the genre obtained in step S482 is found not variety in step S485, the service system 24 goes to step S487 to determine whether or not the genre is music.

If the genre is found music in step S487, then the service system 24 goes to step S488 to increment the points of music in the attribute value of attribute "program preference information" in the PMD, thereby ending the processing. For example, "sports 10, variety 7, music 5, others 3" in FIGS. 19 to 21 becomes "sports 10, variety 7, music 6, others 3".

If the genre obtained in step S482 is found not music in step S487, then the service system 24 goes to step S489 to increment the points of others in the attribute value of attribute "program preference information" in the PMD, thereby ending the processing. For example, "sports 10, variety 7, music 5, others 3" in FIGS. 19 to 21 becomes "sports 10, variety 7, music 5, others 4".

As described above, the PMD is updated by the service system 24. The updated PMD is transmitted to the PK 22 to update the PMD thereof.

Next, the PK 22 is able to make a particular information device execute processing corresponding to the user of that PK 22 by use of the PMD. Thus, that information device becomes "personalized" for that user.

Figure 23:
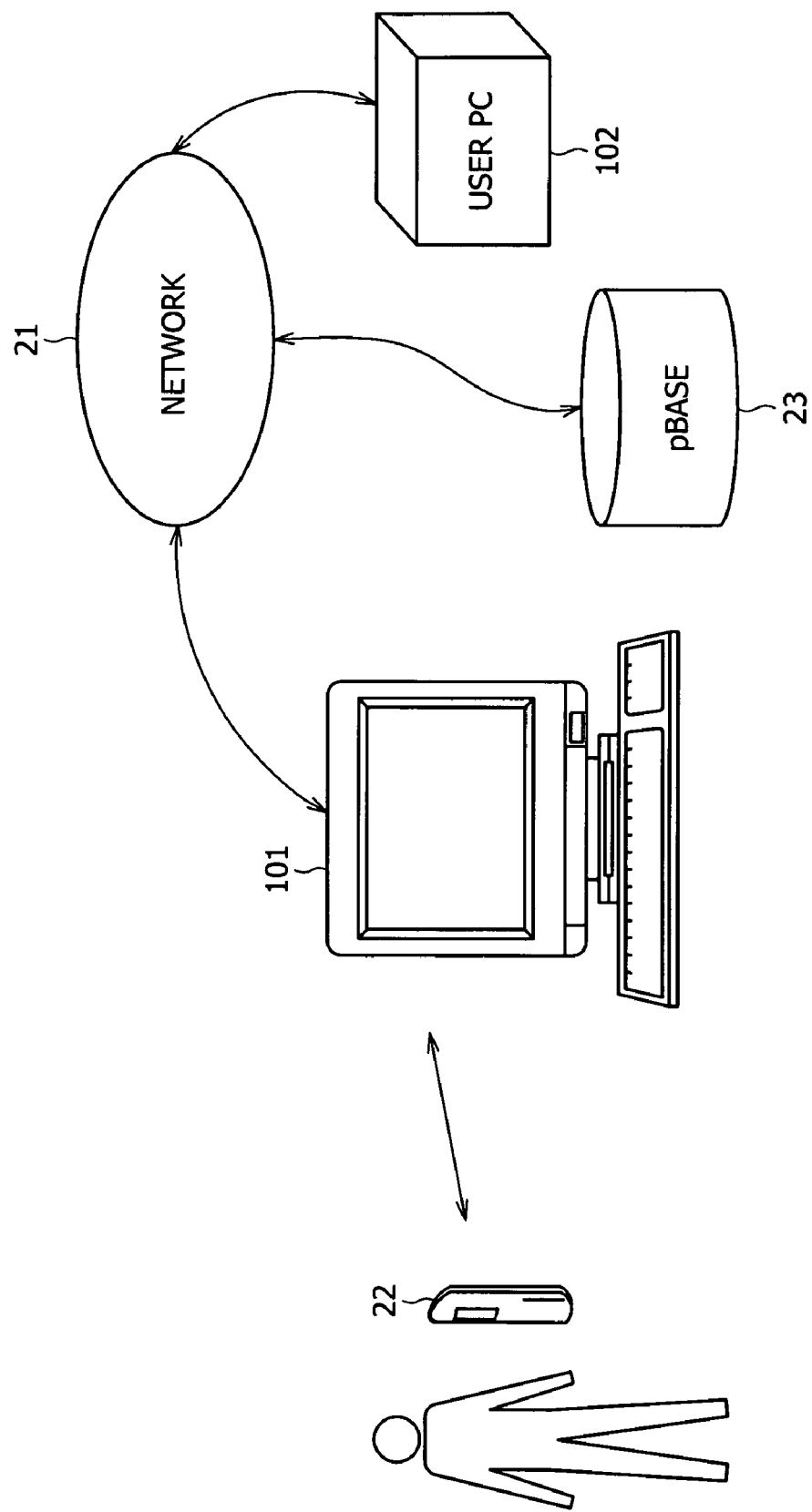
FIG. 23 is a schematic diagram illustrating an exemplary configuration of a PK system for personalizing information equipment.

Referring to FIG. 23, there is shown an exemplary configuration of a PK system that personalizes a PC (Personal Computer), one of information processing devices. With reference to FIG. 23, components similar to those previously described with reference to FIG. 7 are denoted by the same reference numerals.

In FIG. 23, a public PC 101 is a PC installed at a public place, such as an Internet café, library, or a conference room of a company, for example. The public PC 101 is connected to the network 21. It should be noted that the public PC 101 is also the service system 24 shown in FIG. 7 and is able to execute quasi electrostatic field communication.

In FIG. 23, a user PC 102 is a user-dedicated PC (or a PC owned by the user) installed at home or at the office of the user of the PK 22. Like the public PC 101, the user PC 102 is connected to the network 21.

It is general for the user of the user PC 102 installed at home to customize his user PC 102 to an operating environment optimum to the user. On the other hand, the public PC 101 is customized in a different manner from the customization of the user PC 102. Therefore, conventionally, the user cannot use the public PC 101 in the same operating environment as that of the user PC 102 (for example, the desktop display status and the directory configuration of the user PC 102).

The PK system shown in FIG. 23 allows the user to use the public PC 101 in the same operating environment as that of the user PC 102.

Namely, when the user uses the public PC 101, which is the service system, the PK system executes processing for personalizing the public PC 101 in the benefit of the user of the PK 22.

Figure 24:
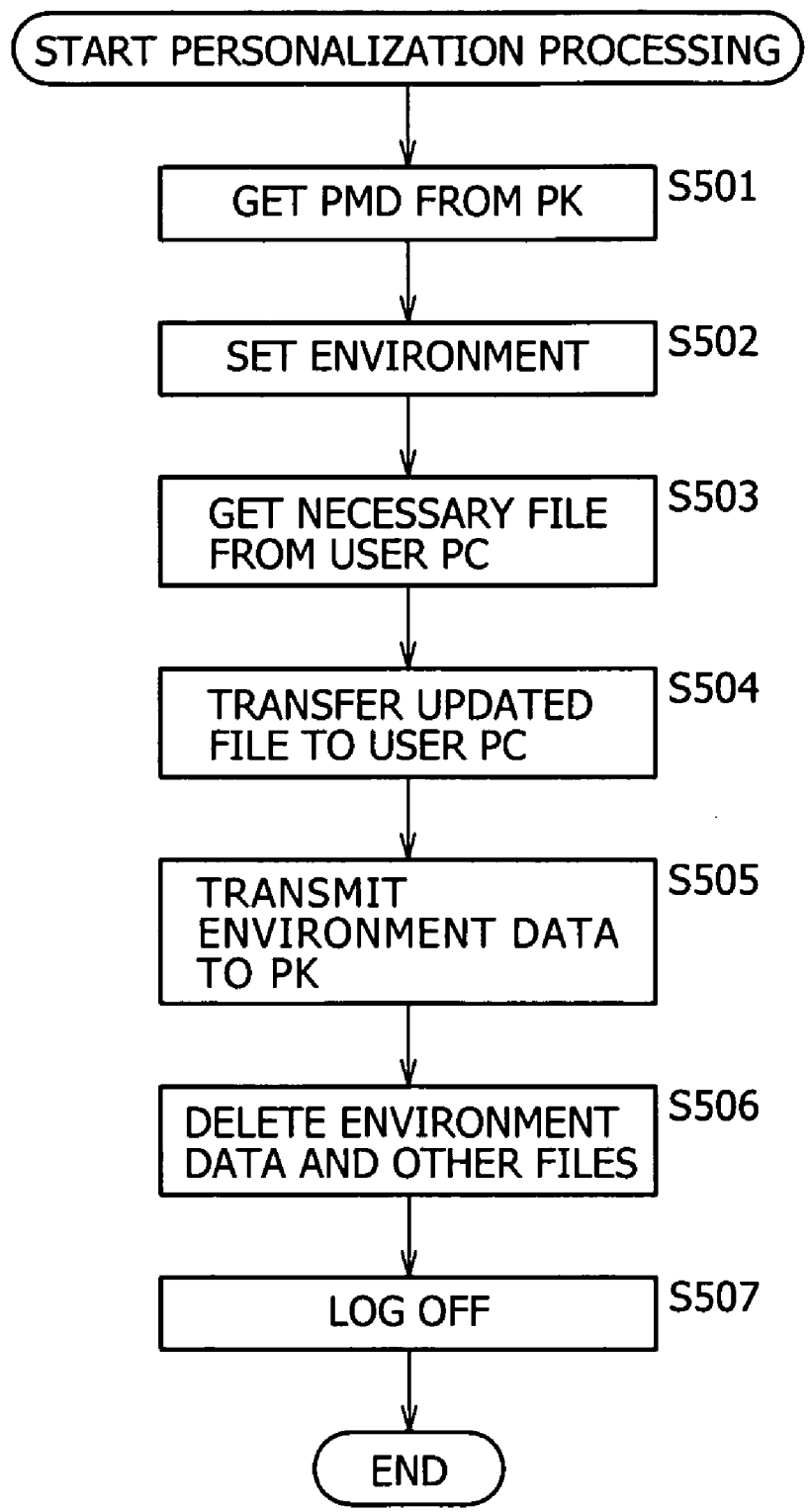
FIG. 24 is a flowchart indicative of personalization processing.

Referring to FIG. 24, there is shown a flowchart indicative of an example of personalization processing to be executed by the public PC 101, which is the service system.

The personalization processing shown in FIG. 24 is executed when the user carrying the PK 22 wants to use the public PC 101.

To be more specific, the PK 22 and the public PC 101 are adapted to execute quasi electrostatic field communication therebetween as described above. The antenna for the public PC 101 to execute quasi electrostatic field communication is arranged in the close proximity of the public PC 101 (for example, on the table on which the public PC 101 is installed, on the floor directly below the public PC 101, or on the housing of the public PC 101). Therefore, when the user approaches the public PC 101 wanting to use it and touches the antenna or gets in the proximity thereof, quasi electrostatic field communication gets ready to be executed between the PK 22 carried by the user and the public PC 101 via the user's body and the antenna of the public PC 101.

When quasi electrostatic field communication gets ready with the PK 22, the public PC 101 obtains the PMD from the PK 22 in step S501. Namely, the public PC 101 requests the PK 22 for the PMD by means of quasi electrostatic field communication and the PK 22 transmits the requested PMD to the public PC 101 by means of quasi electrostatic field communication. Consequently, the public PC 101 can get the PMD from the PK 22.

It is supposed here that the PK 22 store the operating environment data indicative of the operating environment of the user PC 102 as a PMD and the public PC 101 get this PMD in step S501.

In step S501, the public PC 101 gets the PMD that is operating environment data from the PK 22 and goes to step S502 to set the environment of the public PC 101 in accordance with the obtained operating environment data. Namely, this setting personalizes the public PC 101 for the user of the PK 22, so that the user of the PK 22 is able to use the public PC 101 in the same operating environment as that of the user PC 102 owned by that user.

Next, when the user of the PK 22 operates the public PC 101 to request the opening of the data file, for example, created by the user through an application such as wordprocessor, the public PC 101 goes to step S503 to get the data file requested for opening from the user PC 102.

Namely, in step S503, the public PC 101 accesses the user PC via the network 21 to download the data file requested for opening. The public PC 101 opens this file to execute a display operation for example.

Next, when the user of the PK 22 operates the public PC 101 to edit and update the data file obtained in step S503 and requests the closing of the updated data file, the public PC 101 goes to step S504 to forwarding the updated data file to the user PC 102 via the network 21, storing the data file in the user PC 102.

When the user of the PK 22 operates the public PC 101 to request logoff, the public PC 101 goes to step S505 to transmit the operating environment data indicative of the current operating environment thereof to the PK 22 by quasi electrostatic field communication.

It should be noted that, when the user of PK 22 starts operating the public PC 101, the public PC 101 is in the same operating environment as the user PC 102 as described in step S502; but, when the user uses the public PC 101, the public PC 101 may be put in a different operating environment from the initial operating environment. If this happens, because the operating environment of the public PC 101 is different from that to be set by the operating environment data stored in the PK 22, the public PC 101 transmits the operating environment data indicative of the current operating environment thereof to the PK 22 by quasi electrostatic field communication in step S505 so as to update the operating environment data stored in the PK 22.

In this case, the PK 22 receives the environment data from the public PC 101 and updates the operating environment data that is a PMD stored in the PK 22, in accordance with the received operating environment data.

After transmitting the operating environment data to the PK 22 in step S505, the public PC 101 goes to step S506 to delete that operating environment data, the operating environment data obtained in step S501, and the data file downloaded from the user PC 102. This restores the public PC 101 to the status before the personalization processing shown in FIG. 24 was executed. Then, the public PC 101 goes to step S507.

In step S507, the public PC 101 executes a logoff sequence, ending the personalization processing.

As described and according to the personalization processing shown in FIG. 24, the public PC 101 is personalized to the same operating environment as that of the user PC 102, so that the user is able to use the public PC 101 in the same operating environment as with the user PC 102.

The personalization of the public PC 101 requires to execute communication between the PK 22 and the public PC 101; but the user need not intentionally execute an operation for effecting the communication between the PK 22 and the public PC 101, such as taking the PK 22 out of a user's cloth pocket and holding the PK 22 over the antenna of the public PC 101, for example.

Namely, the quasi electrostatic field communication between the PK 22 and the public PC 101 is effected via the user's body and the antenna of the public PC 101 when the user carrying the PK 22 touches the antenna of the public PC 101 or gets in the proximity thereof, as described above.

Therefore, the user carrying the PK 22 only needs to sit before the public PC 101 or to touch the keyboard or mouse of the public PC 101 for the purpose of using the public PC 101. This effects the communication between the PK 22 and the public PC 101, thereby personalizing the public PC 101.

It should be noted that the communication between the PK 22 and the public PC 101 that is a service system and the communication between the public PC 101 and the user PC 102 via the network 21 are executed in a secure manner by use of SSL (Secure Socket Layer), for example.

Next, if a same PMD is stored in the PK 22 of the user and the pBase 23 in the PK system shown in FIG. 23 and the personalization processing shown in FIG. 24 is executed in this state, updating of the PMD stored in the PK 22 with the PMD transmitted by the public PC 101 to the PK 22 in step S505 makes the PMD stored in the PK 22 and the pBase 23 different from each other.

Thus, in order to match the PMD stored in the pBase 23 with the PMD stored in the PK 22, the PMD synchronization processing outlined with reference to FIG. 16 is executed between the PK 22 and the pBase 23.

Figure 25:
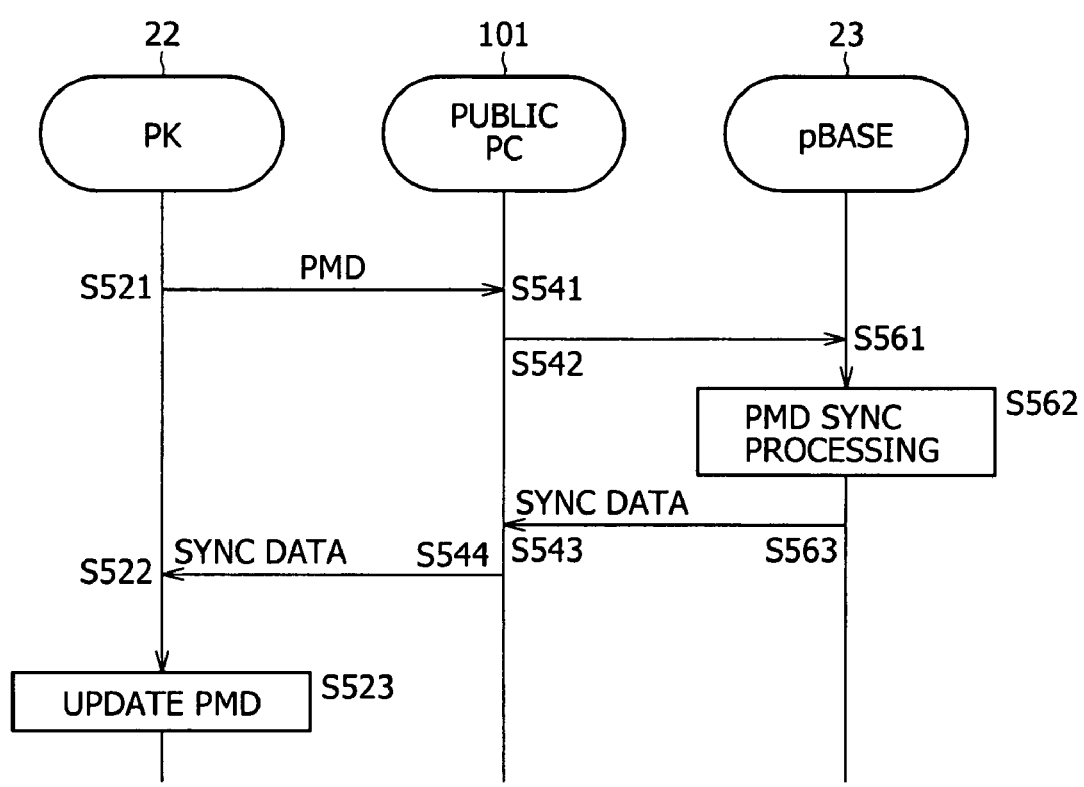
FIG. 25 is a flowchart indicative of processing of PMD synchronization between the PK and the pBase.

FIG. 25 is an arrow chart indicative of the PMD synchronization processing to be executed between the PK 22 and pBase 23.

This PMD synchronization processing is executed when the PK 22 is able to communicate with the pBase 23 via a service system such as the public PC 101 and the network 21.

It is supposed here that quasi electrostatic field communication be enabled between the PK 22 and the public PC 101 that is a service system.

In step S521, the PK 22 transmits the PMD stored therein to the public PC 101. In step S541, the public PC 101 receives the PMD from the PK 22.

The public PC 101 then goes to step S542. In step S542, the public PC 101 transmits the PMD received in step S541 to the pBase 23 via the network 21. In step S561, the pBase 23 receives the PMD from the public PC 101 and goes to step S562.

In step S562, the pBase 23 executes the PMD synchronization processing to be described later with reference to FIG. 26. Consequently, the PMD stored in the pBase 23 is updated and, at the same time, synchronization data for updating the PMD stored in the PK 22 is generated.

The pBase 23 then goes to step S563. In step S563, the pBase 23 transmits the synchronization data generated by the execution of the synchronization processing in step S562 to the public PC 101 via the network 21. In step S543, the public PC 101 receives the synchronization data from the pBase 23 and goes to step S544.

In step S544, the public PC 101 transmits the synchronization data received in step S543 to the PK 22. In step S522, the PK 22 receives the synchronization data from the public PC 101 and goes to step S523.

In step S523, the PK 22 update the PMD stored therein on the basis of the synchronization data received in step S522, thereby ending the synchronization processing.

Figure 26:
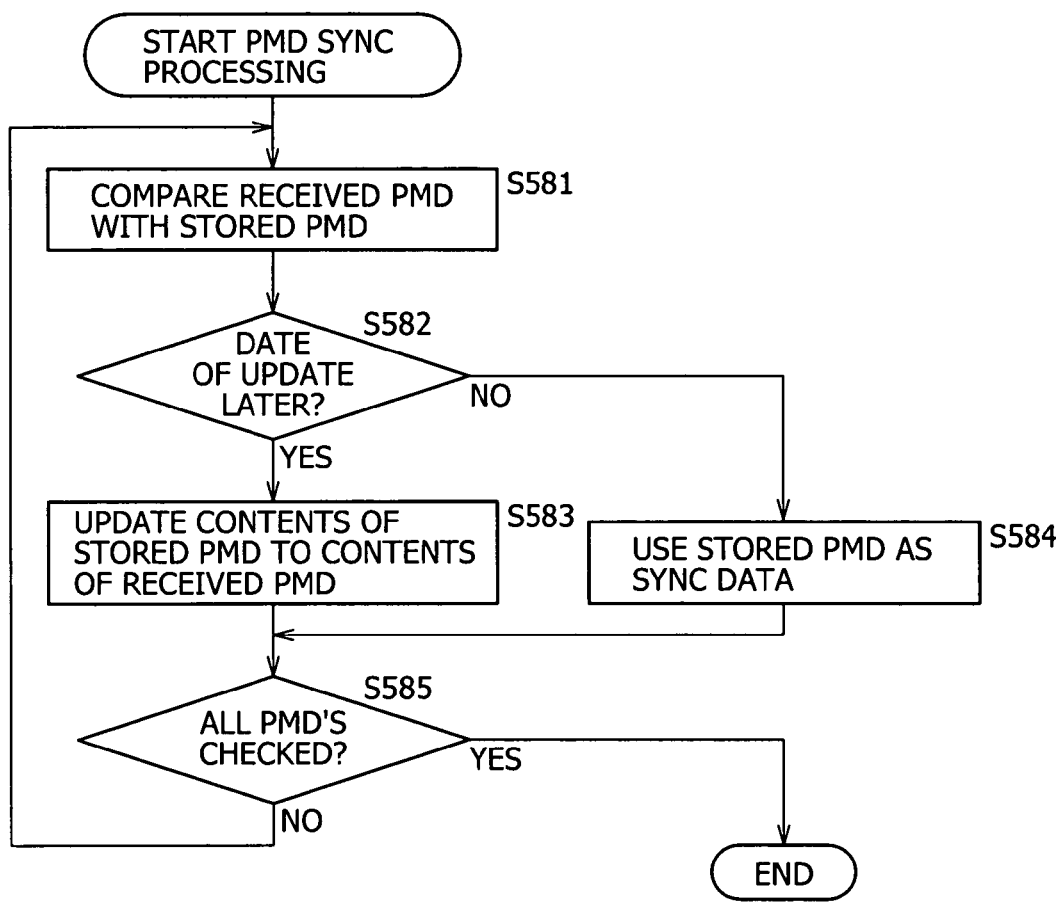
FIG. 26 is a flowchart indicative of PMD synchronization processing.

The following describes the details of the PMD synchronization processing of step S562 shown in FIG. 25, with reference to FIG. 26.

In step S581, the pBase 23 compares the PMD received from the PK 22 in step S561 shown in FIG. 25 with the PMD stored in the pBase 23. Namely, in step S581, the pBase 23 picks up, as an attribute value in attention, any of the attribute values of the attributes of the PMD received from the PK 22 that has not been selected as an attribute value in attention. In addition, in step S581, the pBase 23 reads, from the PMD stored therein, the attribute value corresponding to that attribute value in attention and compares the update time information indicative of the time at which the read attribute value was updated last with update time information of the attribute value in attention.

It is supposed here that the update time information be included in the PMD.

The processing then proceeds from step S581 to step S582. In step S582, the pBase 23 determines on the basis of a result of the comparison executed in step S581 whether or not the update time of the attribute value in attention is later than the attribute value corresponding to the attribute value in attention (the latter hereafter appropriately referred to as a corresponding attribute value).

If the update time of the attribute value in attention is found later than the update time of the corresponding attribute value stored in the pBase 23 in step S582, then the pBase 23 goes to step S583 to update the corresponding attribute value stored therein to the attribute value in attention and goes to step S585.

If the update time of the attribute value in attention is found not later than the update time of the corresponding attribute value in step S582, then the pBase 23 goes to step S584 to make the corresponding attribute value the synchronization data and goes to step S585.

It should be noted that the synchronization data is transmitted to the PK 22 via the public PC 101 in step S563 shown in FIG. 25 after the PMD synchronization processing shown in FIG. 26 has been completed. Then, in step S523 in FIG. 25, the PMD stored in the PK 22 is updated in accordance with the synchronization data.

It should also be noted that, in addition to the corresponding attribute value updated later than the attribute value in attention, the corresponding attribute value having the same update time as that of the attribute value in attention is also handled as the synchronization data; however, only the corresponding attribute value updated later than the attribute value in attention my be handled as the synchronization data.

In step S585, the pBase 23 determines whether or not the update times of all attribute values of the PMD received from the PK 22 have been checked as the attribute value in attention.

If any attribute values are found not yet made the attribute value in attention in step S585, then the pBase 23 returns to step S581 to repeat the above-mentioned processing therefrom.

If all attribute values of the PMD received from the PK 22 are found made the attribute value in attention in step S585, then the PMD synchronization processing ends.

Referring to FIG. 27, there is shown an exemplary configuration of a service providing system practiced as one embodiment of the invention, based on the PK system shown in FIGS. 7 and 23. With reference to FIG. 27, components similar to those previously described with reference to FIGS. 7 and 23 are denoted by the same reference numerals.

Referring to FIG. 27, the service system 24 provides the user carrying the PK 22 with the information personalized for that user.

A service system 24 is connected with an antenna 121 and an output device 122.

The antenna 121 for quasi electrostatic field communication is a conductor sheet, in the proximity of which a quasi electrostatic field is formed. The PK 22 and the service system 24 are able to execute quasi electrostatic field communication within the quasi electrostatic field formed around the surface of the body of the user carrying the PK 22 or the quasi electrostatic field formed in the proximity of the antenna 121.

It should be noted that the antenna 121 can be installed on the floor, for example.

It is supposed here that the thickness (intensity boundary range r described before) of each of the quasi electrostatic field formed around the user's body and that formed in the proximity of the antenna 121 be microscopic. Namely, the quasi electrostatic field communication between the PK 22 and the service system 24 is effected only when a part of the body of the user carrying the PK 22 touches the antenna 121 or gets in the close proximity thereof.

When the PK 22 and the service system 24 are ready to execute quasi electrostatic field communication, the user carrying the PK 22 is identified that the user is at the position of the antenna 121.

The output device 122, constituted by a display device and a speaker, for example, outputs the information supplied from the service system 24 in image or voice.

Referring to FIG. 27, the service system 24 is functionally made up of a user information acquisition module 131, an optimizing engine 132, a content DB (database) 133, and a user DB 134.

The user information acquisition module 131 receives the PMD from the PK 22 by executing quasi electrostatic field communication via the antenna 121 and the body of the user carrying the PK 22 and transmits the information obtained from the content DB to be described later to the PK 22.

In accordance with the PMD received by the user information acquisition module 131 from the PK 22, the optimizing engine 132 recognizes the content (namely, information) optimum to the user of the PK 22 from the contents stored in the content DB 133.

The content DB 133 stores various items of content that is provided outside the service system 24, to the user of the PK 22, for example. In addition, the content DB 133 stores content meta data that is the meta data of the content stored therein.

The user DB 134 stores the data necessary for the communication with the PK 22, such as the user ID of the user of the PK 22, the service password, the PK password, the private key and public key for use in encryption and decryption based on public key, and the common key for use in encryption and decryption based on common key. The information stored in the user DB 134 is updated by the user information acquisition module 131, for example.

It should be noted that the content DB 133 and the user DB 134 may be on the network 21 independently of the service system 24, namely without being installed on the service system 24.

Figure 28:
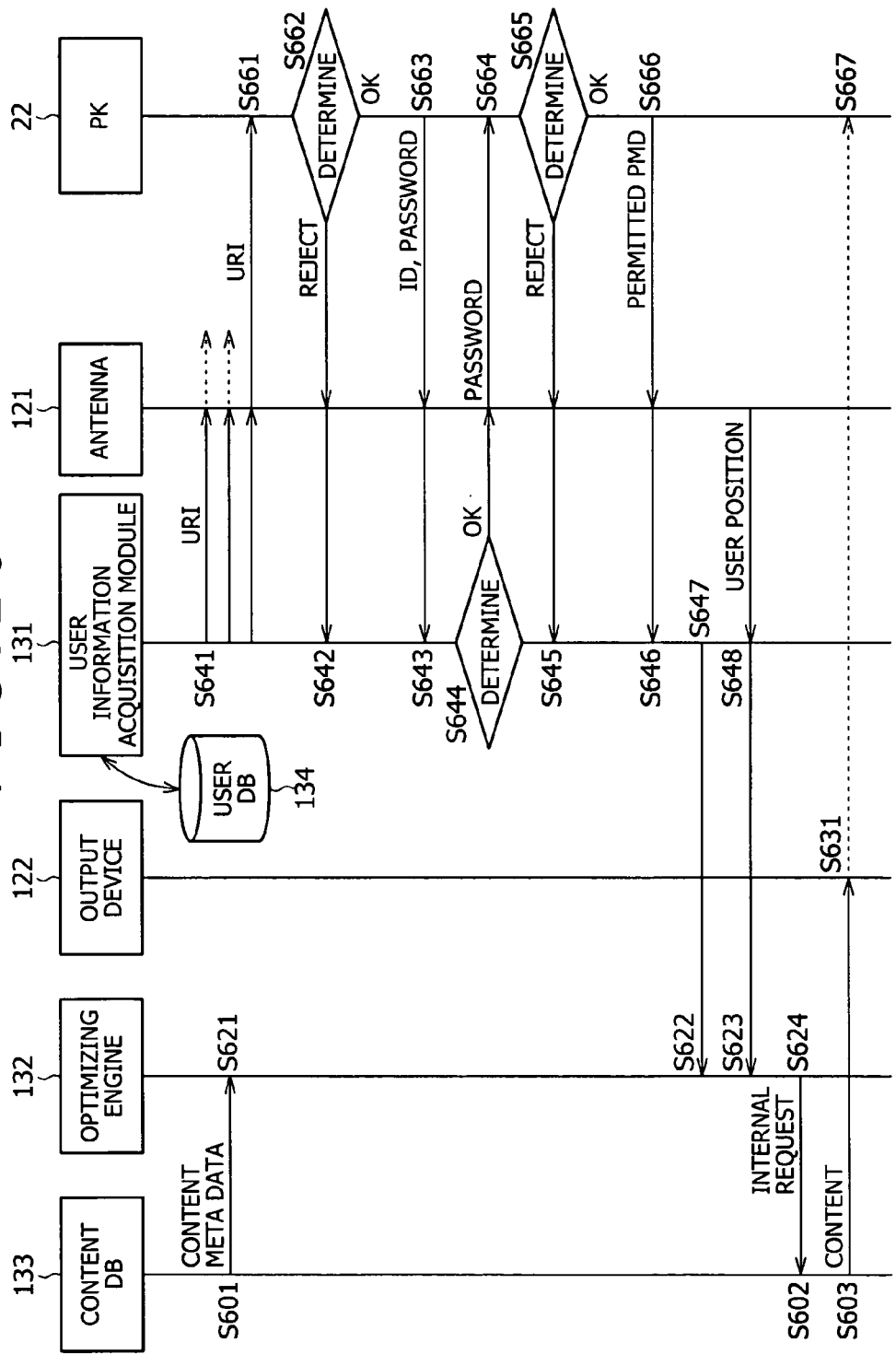
FIG. 28 is a flowchart indicative of processing by the PK and a service system that form the service providing system.

The following describes the processing to be executed by the PK 22 and the service system 24 with reference to FIG. 28.

In step S641, the user information acquisition module 131 transmits, via quasi electrostatic field communication, the URI that is the service ID of itself (namely, the service ID that is the information for identifying a service provided by the service system 24) at certain time intervals through the antenna 121.

It should be noted that the transmission of the URI can be executed by the broadcasting based on IP (Internet Protocol), for example.

When the user carrying the PK 22 passes over the antenna 121 or stands above the antenna 121 for example, the PK 22 and the service system 24 get ready for executing quasi electrostatic field communication via the antenna 121 and the body of the user of the PK 22. In step S661, the PK 22 receives the URI transmitted by the user information acquisition module 131 of the service system 24 via the antenna 121 and goes to step S662.

In step S662, the PK 22 determines whether the service ID that is the URI received from the service system 24 is registered in the PMDB 72 (FIG. 10).

If the service ID that is the URI received from the service system 24 is found not registered in the PMDB 72 in step S662, then the PK 22 transmits a rejection signal indicative of the rejection of the service provision by the service system 24, by means of quasi electrostatic field communication.

The rejection signal transmitted by the PK 22 is received by the user information acquisition module 131 via the antenna 121 in step S642.

If the rejection signal is received, the service system 24 does not provide services to the PK 22.

On the other hand, if the service ID that is the URI received from the service system 24 is found registered in the PMDB 72 in step S662, then the PK 22 goes to step S663 to transmit the above-mentioned PK password and the user ID stored as related with that service ID, by means of quasi electrostatic field communication.

It should be noted that the transmission of the PK password and the user ID is targeted to the service system 24, by single cast based on IP, for example. This holds the same with the subsequent communication that is executed in the PK 22.

The communication to be executed subsequently in the service system 24 is also targeted to the PK 22 by single cast based on IP.

The PK password and the user ID transmitted by the PK 22 are received by the user information acquisition module 131 via the antenna 121 in step S643.

In step S644, the user information acquisition module 131 reads the PK password related with the user ID received from the PK 22 from the user DB 134 and determines whether the read PK password matches the PK password received from the PK 22.

If a mismatch is found between the PK password stored as related with the user ID received from the PK 22 and the PK password received from the PK 22 in step S644, it indicates that the PK 22 is possibly spoofing, upon which the user information acquisition module 131 ends the processing.

In this case, the service system 24 does not provide services to the PK 22.

On the other hand, if there is a match between the PK password stored as related with the user ID received from the PK 22 and the PK password received from the PK 22 in step S644, the user information acquisition module 131 reads the service password related with the user ID received from the PK 22 from the user DB 134 and transmits this service password by means of quasi electrostatic field communication via the antenna 121.

The service password transmitted by the service system 24 (namely, the user information acquisition module 131 thereof) is received by the PK 22 in step S664.

The PK 22 then goes to step S665. In step S665, the PK 22 reads the service password stored as related with the service ID of the service system 24 from the PMDB 72 (FIG. 10) and determines whether there is a match between the service password stored as related with the service ID of the service system 24 and the service password received from the service system 24.

If there is a mismatch between the service password stored as related with the service ID of the service system 24 and the service password received from the service system 24 in step S665, it indicates that the service system 24 is possibly spoofing, upon which the PK 22 transmits a rejection signal indicative of the rejection of the service provision from the service system 24, by means of quasi electrostatic field communication.

The rejection signal transmitted by the PK 22 is received by the user information acquisition module 131 via the antenna 121 in step S645.

In this case, the service system 24 does not provide services to the PK 22.

On the other hand, if a match is found between the service password stored as related with the service ID of the service system 24 and the service password received from the service system 24 in step S665, it indicates that mutual authentication between the PK 22 and the service system 24 is successful. Next, in step S666, the PK 22 reads, from the PMDB 72, the PMD (the permission information) permitted for provision to the service system 24 from among the PMDs stored as related with the service ID of the service system 24 and transmits the PMD to the service system 24 by means of quasi electrostatic field communication.

It should be noted that the communication between the PK 22 and the service system 24 after the successful mutual authentication between the PK 22 and the service system 24 is executed in a secure manner by use of SSL, for example.

The PMD transmitted by the PK 22 is received by the user information acquisition module 131 via the antenna 121 in step S646. The user information acquisition module 131 then goes to step S647. In step S647, the user information acquisition module 131 transfers the PMD received from the PK 22 to the optimizing engine 132. In step S622, the optimizing engine 132 receives this PMD.

In step S648, the user information acquisition module 131 recognizes the installation position of the antenna 121 used for the quasi electrostatic field communication with the PK 22 as the position at which the user carrying the PK 22 stands (the user position) for example and transmits this user position to the optimizing engine 132. In step S623, the optimizing engine 132 receives the user position from the user information acquisition module 131.

On the other hand, the content DB 133 supplies the content meta data stored therein to the optimizing engine 132 in step S601. In step S621, the optimizing engine 132 receives the meta data from the content DB 133 and recognizes the content (the contents thereof) stored in the content DB 133 by the received meta data.

In step S624, the optimizing engine 132 identifies (or recognizes) the content optimum for the user carrying the PK 22 from the content recognized in step S621 in accordance with the PMD received from the PK 22 and the user position of the user carrying the PK 22 and supplies a request signal for requesting that content to the content DB 133.

In step S602, the content DB 133 receives the request signal from the optimizing engine 132 and goes to step S603.

In step S603, the content DB 133 searches the contents stored therein for (or selects) the content requested by the request signal received from the optimizing engine 132 and supplies the retrieved content (hereafter appropriately referred to as optimum content) to the output device 122.

In step S631, the output device 122 receives the optimum content from the content DB 133 and displays the received content, for example.

It should be noted that the processing by use of the password method is executed in FIG. 28 as spoofing prevention processing; it is also practicable to execute this processing on the basis of the public key method or the common key method.

It should also be noted that the execution of spoofing prevention processing is not essential to the present invention. Namely, if one or both of the user carrying the PK 22 and the service provider providing the service system 24 agree that spoofing prevention is unnecessary, the above-mentioned spoofing prevention processing may be skipped. To be more specific, the demand for executing spoofing prevention is low if the user carrying the PK 22 is male or female for example, which is not so important a PMD for the user information. In such a case, the spoofing prevention processing may be skipped without problem. If this is done, the processing time of the entire system may be shortened.

In FIG. 28, user's PMD is provided from the PK 22 to the service system 24; it is also practicable that user's PMD is provided from the pBase 23 (FIG. 27) for example. Namely, for example, it is practicable that the PK 22 supplies the URI of the pBase 23 to the service system 24 as the PMD and, if PMD received from the PK 22 is the URI, the service system 24 accesses the pBase 23 indicated by the received URI via the network 21, getting the PMD of the user of the PK 22 from the pBase 23. In this case, it is desirable that the communication between the pBase 23 and the service system 24 be executed in a secure manner.

Further, in FIG. 28, the optimum content is supplied from the content DB 133 to the output device 122 in step S603; it is also practicable in step S603 that the content DB 133 transmits the optimum content to the PK 22 by means of quasi electrostatic field communication via the antenna 121 as indicated by dashed line shown in FIG. 28.

In this case, the PK 22 receives the optimum content in step S667 and outputs (or displays) or stores the received optimum content.

The following further describes the processing by the service system 24 shown in FIG. 27 with reference to the flowchart shown in FIG. 29.

When, in the service system 24, the mutual authentication with the PK 22 is successful, the user information acquisition module 131 receives the PMD from the PK 22 by means of quasi electrostatic field communication in step S681 and transfers the received PMD to the optimizing engine 132, going to step S682.

In step S682, the user information acquisition module 131 gets the user position at which the user carrying the PK 22 stands and transfers the user position to the optimizing engine 132, going to step S683.

In step S683, the optimizing engine 132 identifies the content optimum for the provision to the user carrying the PK 22 in accordance with the PMD and user position received from the user information acquisition module 131 and makes the content DB 133 select the optimum content from those stored in the content DB 133, going to step S684.

In step S684, the content DB 133 supplies the optimum content to the output device 122 to output the optimum content or transmits the optimum content to the PK 22 by means of quasi electrostatic field communication via the antenna 121, thereby ending the processing.

the following further describes the processing by the PK 22 shown in FIG. 27 with reference to the flowchart shown in FIG. 30.

When mutual authentication with the service system 24 is successful, the PK 22 reads the PMD permitted for provision to the service system 24 from among the PMDs stored in the PMDB 72 (FIG. 10) in step S701 and goes to step S702.

In step S702, the PK 22 transmits the PMD obtained in step S701 to the service system 24 by means of quasi electrostatic field communication.

If the optimum content comes from the service system 24 by means of quasi electrostatic field communication, the PK 22 goes to step S703 to receive that optimum content, going to step S704.

In step S704, the PK 22 stores the optimum content received in step S703 or outputs in image or voice, thereby ending the processing.

As described and according to the service providing system shown in FIG. 27, in the PK 22, only the PMD permitted by the user for the provision to the service system 24 among the PMDs stored in the PMDB 72 (FIG. 10) is transmitted to the service system 24 by means of the quasi electrostatic field communication that is controlled by the range between the user's body and the antenna 121. On the other hand, in the service system 24, the optimum content to be provided to the user is selected from the content DB 133 in accordance with the PMD received from the PK 22 and the retrieved optimum content is supplied to the user. Consequently, the information optimum to the user can be surely provided to the user.

Namely, in the communication such as RF communication, in which multiple paths occur, the mechanism for identifying user positions is complicated, thereby requiring the device setting or calibration for identifying user positions in an environment in which each service system is installed.

In contrast, quasi electrostatic field communication is used in the service providing system shown in FIG. 27, so that only installing a conductor sheet that is the antenna 121 at a position for detecting the user allows the simple and correct detection of the user position, thereby surely providing optimum information to the user standing at that user position.

In addition, from the PK 22 to the service system 24, only the PMD permitted by the user is provided and the service system 24 provides information to the user in accordance with that PMD, the user can get services without worrying that the user is always monitored by the system.

Further, allowing the provision of the PMD such as user's credit card number or band account number only to a service system that executes charging processing for example prevents such PMD from being leaked to any service systems that do not execute charging processing.

Still further, because the user position can be correctly grasped, the content optimum to that user can be displayed on the portion near the user on the screen of the output device 122, for example.

The number of antennas 121 that can be installed is not limited to one. Therefore, if a plurality of antennas 121 are installed, a plurality of user positions can be identified at the same time. This configuration allows the optimum content to be simultaneously displayed for the users in the plurality of user positions at portions near these positions on the screen of the output device 122.

The above-mentioned service providing system (FIG. 27) is applicable to a situated information presentation (the transmission of information based on display output or voice output or the transmission of digital information) system, for example. In this case, the information presentation system presents information optimum to different users rather than presenting same information to all users.

The presentation of information can be made by use of situated displays and speakers, terminals such as user's PDA (Personal Digital Assistant), and so on.

Also, the presentation of information can be made depending on whether the user is standing at a certain distance from the information presentation system or depending on where (position or range) the user is standing.

Also, the presentation of information can be made depending on whether the user is standing at a certain distance from the information presentation system or depending on where (position or range) the user is standing.

Further, in the presentation of information depending on the distance between the user and the information presentation system, the degree of the detail of content as information, the character size, the degree of the abridgement of text, and the loudness of voice signal for example can be varied as required.

Besides, the presentation of information can be made by transferring information to the PK 22 and other devices owned by the user. In this case, it is practicable to optimize the displaying of information or the contents of information that is outputted in voice on each device owned by the user.

In addition, providing the proper PMD to the information presentation system, the user can get the information presentation that is significant to the user everywhere the user goes.

Namely, for the PMD, the program preference information shown in FIGS. 19 to 21, other user preference information, user schedule information, gender, nationality, age, physical disability information, health data, keywords indicative of objects of interest, and others can be used. Such a PMD can be provided from the PK 22 to the information presentation system.

When provided with user's nationality information for example from the PK 22, the information presentation system is able to present information in the user's mother language, for example.

When provided with the information indicative that the user is visually handicapped for example from the PK 22, the information presentation system can present information in an audible manner.

When provided with schedule information from the PK 22 for example, the information presentation system can recognize, from the received schedule information, a destination to which the user goes now and present a guide message, for example. The presentation of such a message may be used for guiding people to particular locations in comparatively large buildings and guiding people to train change platforms in railway stations, for example.

When provided with a keyword from the PK 22 for example, the information presentation system can present the information indicated by the provided keyword. To be more specific, if the provided keyword is a brand name, the information presentation system can present the product information associated with that brand.

In this case, the user can gather the product information about brands of user's liking without being aware thereof.

To be more specific, when window-shopping in a department store for example, the user approaches a display window to check products arranged therein. Arranging the information presentation system such that quasi electrostatic field communication starts when the user approaches each display window and brand names of user's liking are provided from the PK 22 to the information presentation system allows the information presentation system to present the product information about the brand products of user's liking from among the products arranged in the display window. In this case, by storing the product information to be presented by the information presentation system into the PK 22, the user can gather only the product information about the brands of his linking while doing window shopping.

In the above-mentioned embodiments of the invention, quasi electrostatic field communication is executed between the PK 22 and the service system 24. It is also practicable to execute other types of communication between the PK 22 and the service system 24. In any case, it is desirable to execute communication in a human-body vicinity manner.

In the above-mentioned embodiments of the invention, the user carries the PK 22 and receives the provision of services from the service system 24 by means of the PK 22. It is apparent that the user can carry any device as long as it has the same function as that of the PK 22. Namely, the device carried by the user may be a mobile phone having the function of the PK 22, for example.

It should be noted herein that the steps for describing each program recorded in recording media include not only the processing operations which are sequentially executed in a time-dependent manner but also the processing operations which are executed concurrently or discretely (for example, parallel processing or object processing).

The program according to the present invention may be executed either by one computer or by a plurality of computers in a distributed manner. In addition, the program according to the present invention may be transferred to a remote computer for execution.

As described and according to the invention, the information optimum to users is surely provided to them.

While preferred embodiments of the present invention have been described using specific terms, such description is for illustrative purpose only, and it is to be understood that changes and variations may be made without departing from the spirit or scope of the following claims.

What is claimed is:

1. An information processing system, comprising:
a first processing apparatus including
  a personal information storage unit configured to store first personal information associated with a user,
  a permission information acquisition unit configured to acquire permission information in said first personal information, said permission information being permitted for provision to a second processing apparatus, and
  a communication unit configured to communicate with said second processing apparatus, said communication unit configured to transfer an electrostatic charge to a body of the user to generate at least a first signal and a second signal of a quasi electrostatic field produced by the electrostatic charge on the user body, the first signal and the second signal having a first frequency and a second frequency respectively, said communication unit configured to receive a location data from the second processing apparatus determined by the second processing apparatus based on the first and second signals and to transmit said permission information to said second processing apparatus depending upon the location data; and
the second processing apparatus including
  a reception unit having an antenna for quasi electrostatic communication and configured to communicate with the communication unit of the first processing apparatus using the electrostatic charge on the user body,
  a user position acquisition unit configured to determine the location data based on the first signal and second signals, the location data including a distance between the antenna and the electrostatic charge on the user body,
  an information acquisition unit configured to acquire second personal information to be provided to said user from a third processing apparatus in accordance with said permission information, and
  a provision unit configured to provide said second personal information acquired by said information acquisition unit to said user.

2. An information processing apparatus for executing communication with another apparatus, comprising:
  a personal information storage unit configured to store first personal information associated with a user;
  a permission information acquisition unit configured to acquire permission information in said first personal information, said permission information being permitted for provision to said another apparatus, said another apparatus having an antenna;
  a transmitting unit configured to transfer electrostatic charge to a body of the user to generate at least a first signal and a second signal of a quasi electrostatic field, the first signal and the second signal having a first frequency and a second frequency respectively;
  the transmission unit configured to transmit said permission information to said another apparatus by transferring electrostatic charge to the body of the user, said transferring of the electrostatic charge triggered by location data, the location data indicating a distance from the body to the antenna and being determined by the another apparatus based on the first and second signals; and
  a reception unit configured to receive, in accordance with said permission information, second personal information and the location data received from said another apparatus through said communication triggered by the location data.

3. The information processing apparatus according to claim 2, further comprising:
an output unit configured said second personal information received by said reception unit.

4. The information processing apparatus according to claim 2, further comprising:
an authentication unit configured to execute authentication with said another apparatus, wherein, if said authentication is successful, said permission information is transmitted to said another apparatus.

5. An information processing method by a first apparatus for executing communication between the first apparatus and a second apparatus, comprising:
transferring an electrostatic charge from the first apparatus to a user's body to generate at least a first signal and a second signal of a quasi electrostatic field, the first signal and the second signal having a first frequency and a second frequency respectively;
acquiring permission information in first personal information stored in a personal information storage unit, said permission information being permitted for provision to said second apparatus;
transmitting said permission information to said second apparatus through communication triggered when a distance from the user's body to an antenna connected to the second apparatus is within a defined range of distance, the distance being calculated based on the antenna measuring the strength of the first and second signals produced by the electrostatic charge; and
receiving, in accordance with said permission information, second personal information from said second apparatus through said communication triggered when said distance is within the defined range of distance.

6. A non-transitory computer readable medium including computer executable instructions, wherein the instructions, when executed by a processor as part of a first apparatus, cause the processor to perform a method to communicate between the first apparatus and a second apparatus comprising:
transferring an electrostatic charge from the first apparatus to a user's body to generate at least a first signal and a second signal of a quasi electrostatic field, the first signal and the second signal having a first frequency and a second frequency respectively;
acquiring permission information in first personal information stored in the first apparatus, said permission information being permitted for provision to said second apparatus;
transmitting said permission information to said second apparatus through communication triggered when a distance from the user's body to an antenna connected to the second apparatus is within a defined range of distance, the distance is calculated based on the antenna measuring the strength of the first and second signals a quasi electrostatic field produced by the electrostatic charge; and
receiving, in accordance with said permission information, second personal permission information from a third apparatus through said communication triggered when said distance is within the defined range of distance.

7. A non-transitory recording medium recording a program to be executed by a computer as part of a first apparatus for executing communication with a second apparatus, said program comprising the steps of:
transferring an electrostatic charge from the first apparatus to a user's body to generate at least a first signal and a second signal of a quasi electrostatic field, the first signal and the second signal having a first frequency and a second frequency respectively;
acquiring permission information in first personal information stored in the first apparatus, said permission information being permitted for provision to said second apparatus;
transmitting said permission information to said second apparatus through communication triggered when a distance from the user's body to an antenna connected to the second apparatus is within a defined range of distance, the distance is calculated based on the antenna measuring the strength of the first and second signals a quasi electrostatic field produced by the electrostatic charge; and
receiving, in accordance with said permission information, second personal information from a third apparatus through said communication triggered when said distance is within the defined range of distance.

8. An information processing method used by a first apparatus for executing communication between the first apparatus and a second apparatus, comprising:
measuring a strength of a quasi electrostatic field using an antenna connected to the first apparatus, the quasi electric field being produced by an electrostatic charge transferred by the second apparatus to a body of a user having the second apparatus to generate at least a first signal and a second signal of the quasi electrostatic field, the first signal and the second signal having a first frequency and a second frequency respectively;
calculating a distance from the body of the user having the second apparatus to the antenna based on the first and second signals;
comparing the calculated distance to a range of allowable distances and if the calculated distance is within the range of allowable distances, then receiving permission information in personal information associated with the user of the second apparatus transmitted from said second apparatus, said permission information being permitted for provision to said first apparatus;
acquiring information to be provided to said user in accordance with said permission information, said information being selected from information to be provided from a third apparatus; and
providing said information acquired by said information acquisition step to said user.

9. A non-transitory computer readable medium including computer executable instructions, wherein the instructions, when executed by a processor, cause the processor in a first apparatus to perform a method to communicate with a second apparatus comprising:
measuring a strength of a quasi electrostatic field using an antenna connected to the first apparatus, the quasi electric field produced by an electrostatic charge transferred by the second apparatus to a body of a user having the second apparatus to generate at least a first signal and a second signal of the quasi electrostatic field, the first signal and the second signal having a first frequency and a second frequency respectively;
calculating a distance from the body of the user having the second apparatus to the antenna based on the first and second signals strength of the quasi electrostatic field;
comparing the calculated distance to a range of allowable distances and if the calculated distance is within the range, then receiving permission information in personal information associated with the user of the second apparatus transmitted from said second apparatus, said permission information being permitted for provision to said first apparatus;

acquiring information to be provided to said user in accordance with said permission information, said information being selected from information to be provided from a third apparatus; and providing said information acquired by said information acquisition step to said user.

10. A non-transitory recording medium recording a program to be executed by a computer as part of a first apparatus for executing communication with a second apparatus, said program comprising the steps of:

measuring a strength of a quasi electrostatic field using an antenna connected to the first apparatus, the quasi electric field being produced by an electrostatic charge transferred by the second apparatus to a body of a user having the second apparatus to generate at least a first signal and a second signal of the quasi electrostatic field, the first signal and the second signal having a first frequency and a second frequency respectively;

calculating a distance from the body of the user having the second apparatus to the antenna based on the first and second signals strength of the quasi electrostatic field;

comparing the calculated distance to a range of allowable distances and if the calculated distance is within the range, then receiving permission information in personal information associated with the user of the second apparatus transmitted from said second apparatus, said permission information being permitted for provision to said information processing apparatus;

acquiring information to be provided to said user in accordance with said permission information, said information being selected from information to be provided from a third apparatus; and providing said information acquired by said information acquisition step to said user.

11. The information processing system of claim 1, wherein the provision unit includes a display device configured to display a first portion of the second personal information to the user, the display device also configured to provide a personalization of the display of the first portion of the second personal information according to the location data and a second portion of the second personal information, and wherein the personalization of the display includes a customized adjustment of each factor included in a group of display factors, the group of display factors including:

a degree of an abridgement of text of the second personal information based on the distance between the antenna and the electrostatic change on the user body, character size of the second personal information based on the distance between the antenna and the electrostatic change on the user body, and loudness of sound based on the distance between the antenna and the electrostatic change on the user body.

12. The information processing system of claim 1, wherein the second processing apparatus is further configured to transmit the second personal information to the first processing apparatus using radio frequency communication, and the first processing apparatus is configured to receive the second personal information as a radio frequency communication from the second processing apparatus.

13. The information processing system of claim 1, wherein the second processing apparatus is further configured to optically transmit the second personal information to the first processing apparatus, and the first processing apparatus is configured to optically receive the second personal information from the second processing apparatus.

* * * * *